(12) United States Patent
Anderson et al.

(10) Patent No.: US 7,959,043 B2
(45) Date of Patent: Jun. 14, 2011

(54) TEA KETTLE WITH SAFETY FEATURES

(75) Inventors: Luke Anderson, Lancaster, PA (US); J. Dwight Anderson, Lancaster, PA (US)

(73) Assignee: Anderson Associates, Lancaster, PA (US)

( * ) Notice: Subject to any disclaimer, the term of this patent is extended or adjusted under 35 U.S.C. 154(b) by 880 days.

(21) Appl. No.: 11/299,929

(22) Filed: Dec. 12, 2005

(65) Prior Publication Data
US 2007/0131723 A1   Jun. 14, 2007

(51) Int. Cl.
*A47G 19/14* (2006.01)
(52) U.S. Cl. .................. 222/465.1; 222/472; 222/475.1; 222/478; 222/566; 222/572; 220/731; 220/86.1
(58) Field of Classification Search ............... 222/465.1, 222/475.1, 470, 472, 473, 475, 566, 572, 222/478, 481, 482; 220/731, 86.1
See application file for complete search history.

(56) References Cited

U.S. PATENT DOCUMENTS

| | | | | |
|---|---|---|---|---|
| 754,046 A * | 3/1904 | Bulmer | ........................ | 222/192 |
| 1,092,101 A * | 3/1914 | Hansen | ........................ | 222/473 |
| 1,214,716 A * | 2/1917 | Root | ............................ | 222/472 |
| 1,402,517 A * | 1/1922 | Kuno | ........................ | 222/465.1 |
| 2,004,883 A * | 6/1935 | Wolcott | ........................ | 99/295 |
| 2,501,142 A * | 3/1950 | Reichart | ....................... | 126/344 |
| 5,490,616 A | 2/1996 | Stowell et al. | | |
| 6,736,295 B2 * | 5/2004 | Lin et al. | .................... | 222/475.1 |
| 2003/0226859 A1 * | 12/2003 | Takagawa | ..................... | 222/470 |

OTHER PUBLICATIONS

"OXO Good Grips Tea Kettle," from http://www.dexigner.com/product/gallery-g161.html Printed on Jan. 18, 2006.

\* cited by examiner

*Primary Examiner* — J. Casimer Jacyna
(74) *Attorney, Agent, or Firm* — Volpe and Koenig, PC

(57) ABSTRACT

A tea kettle with a spout and a handle extends from a body, wherein the handle and spout are offset from one another such that when the body is tilted during pouring of a hot liquid contained therein, hot vapor from the liquid substantially is diverted away from the handle.

2 Claims, 69 Drawing Sheets

TEA KETTLE WITH SAFETY FEATURES

FIELD OF INVENTION

Figure 1:
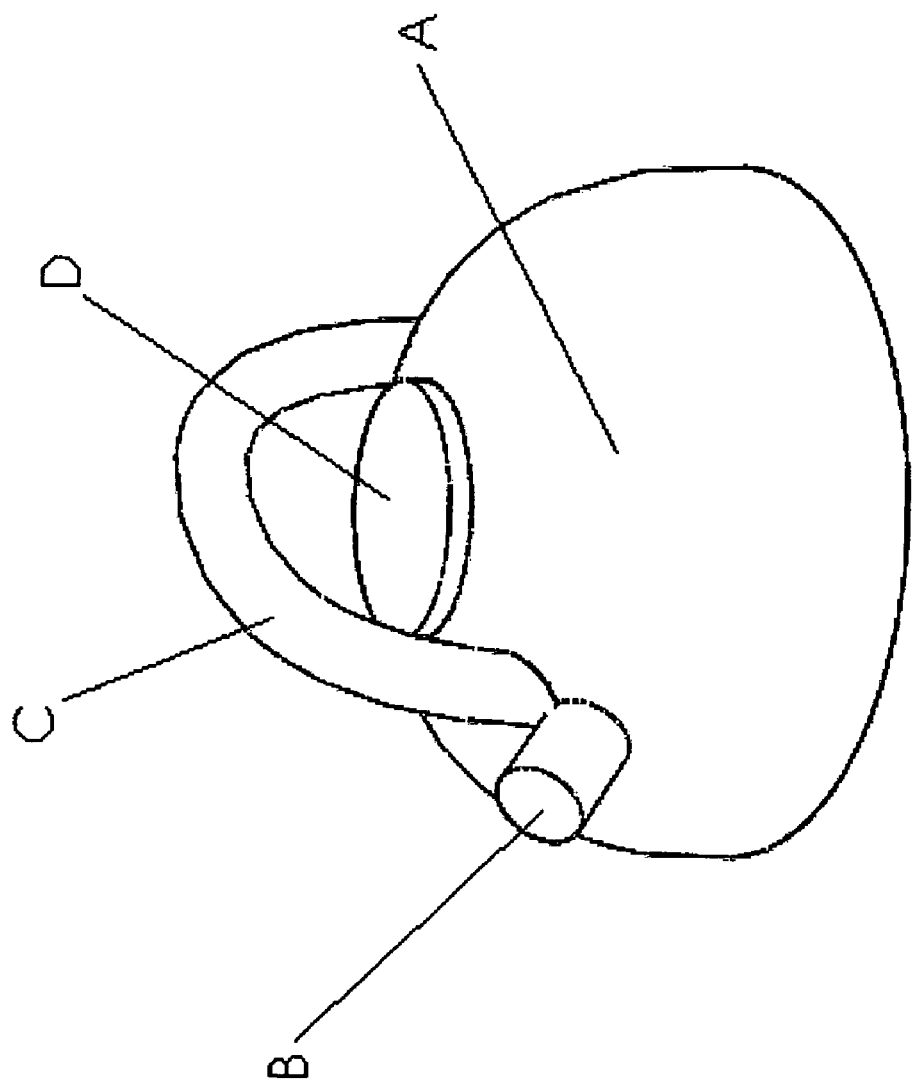

The field of invention is tea kettles.

BACKGROUND

When pouring hot water from a tea kettle such as the traditional kettle shown in FIGS. 1-4, everyone has encountered the problem where, during pouring the hot water from the spout, the steam rising from the hot water burns the hand holding the kettle handle. What is needed are solutions to this common problem.

SUMMARY

For this simple problem, the invention described herein offers several solutions. The first is a tea kettle with a spout and a handle that extend from a body, wherein the handle and spout are offset from one another such that when the body is tilted during filling and pouring of a hot liquid contained therein, hot vapor from the liquid substantially passes to a side of the handle and should not burn a hand holding the handle.

The second solution involves locating the handle and terminal end of the spout at such a distance from each other that vapor rising from the spout during pouring does not contact the handle.

The third solution involves using a tube or shield to redirect vapor rising from the spout away from the handle.

These solutions will be discussed in further detail below.

BRIEF DESCRIPTION OF THE DRAWING(S)

Figure 2:
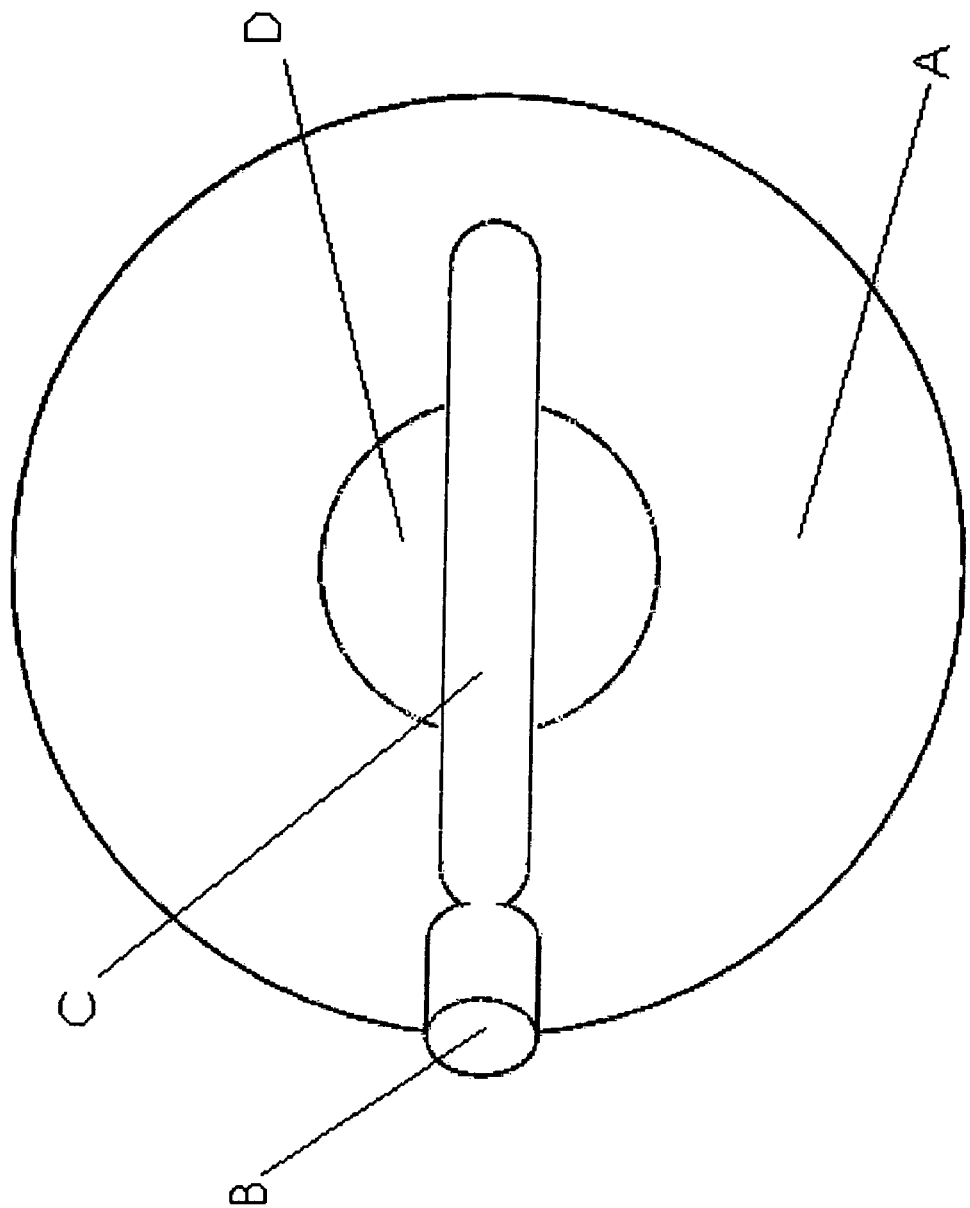
Figure 3:
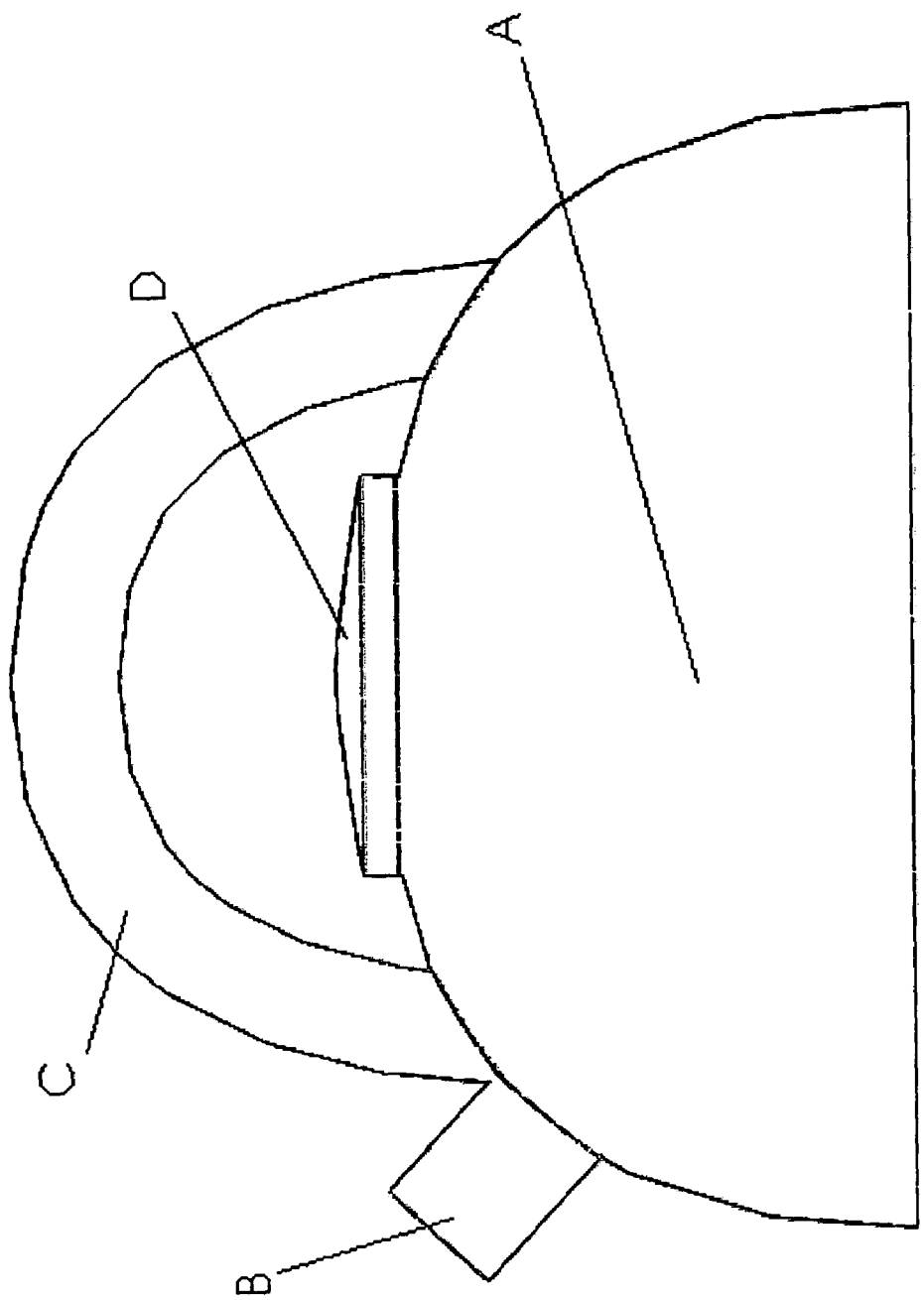
Figure 4:
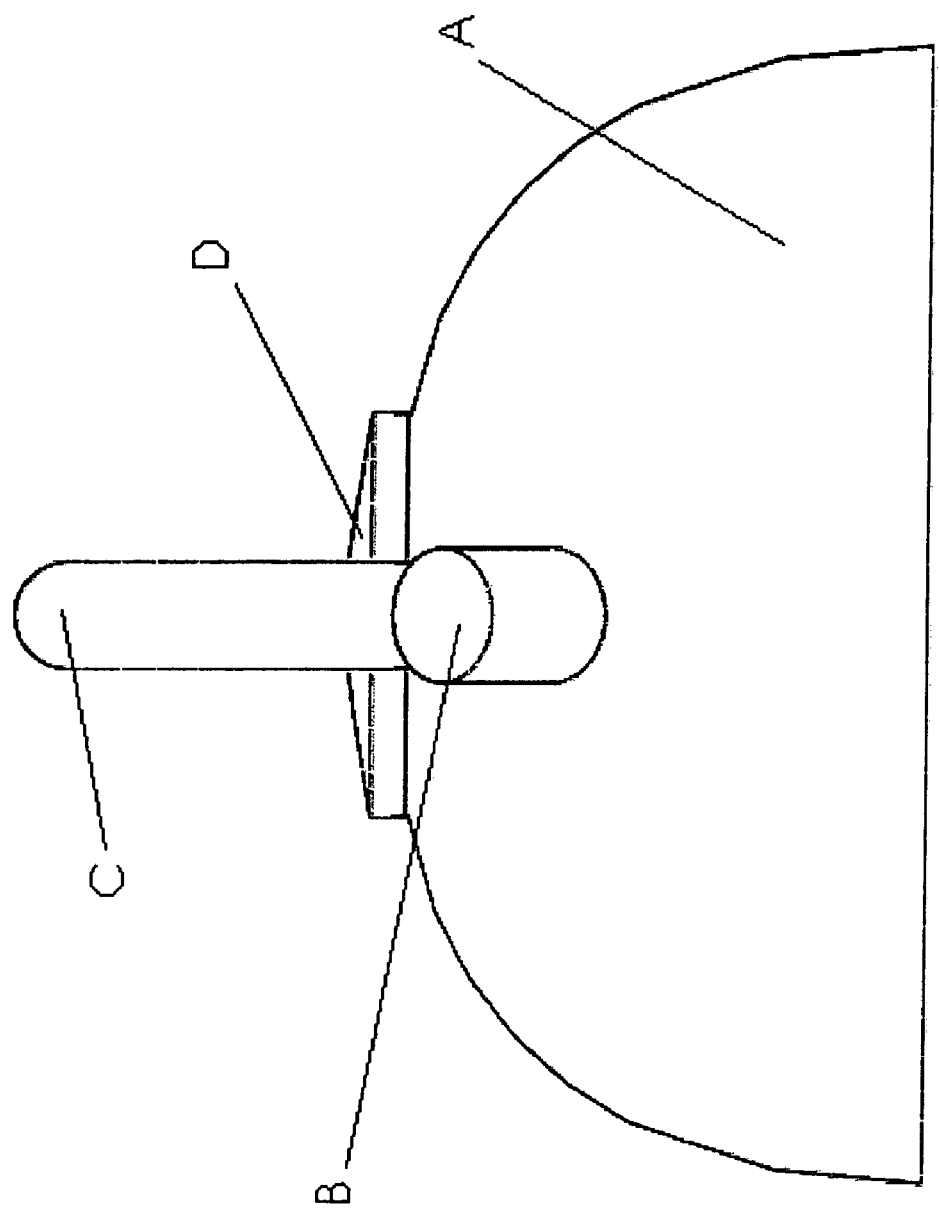
Figure 5:
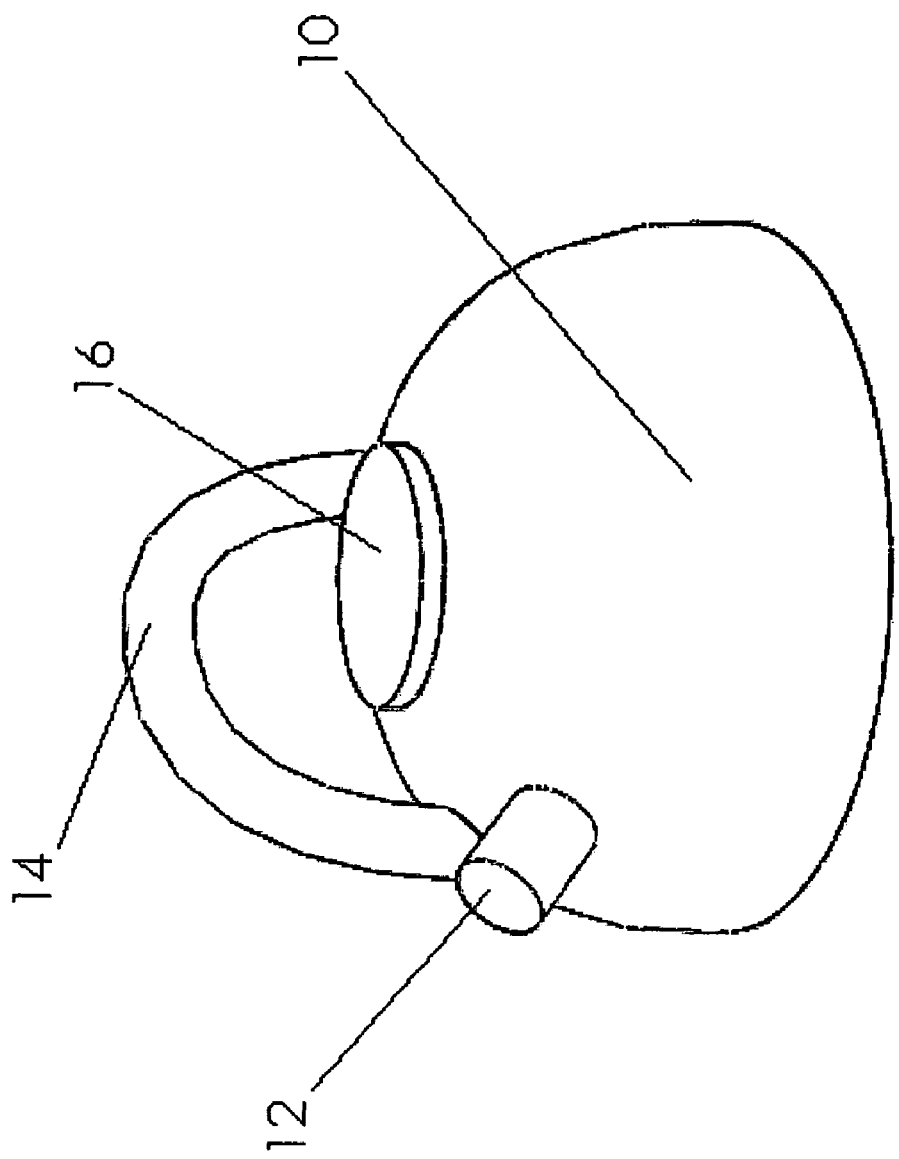
Figure 6:
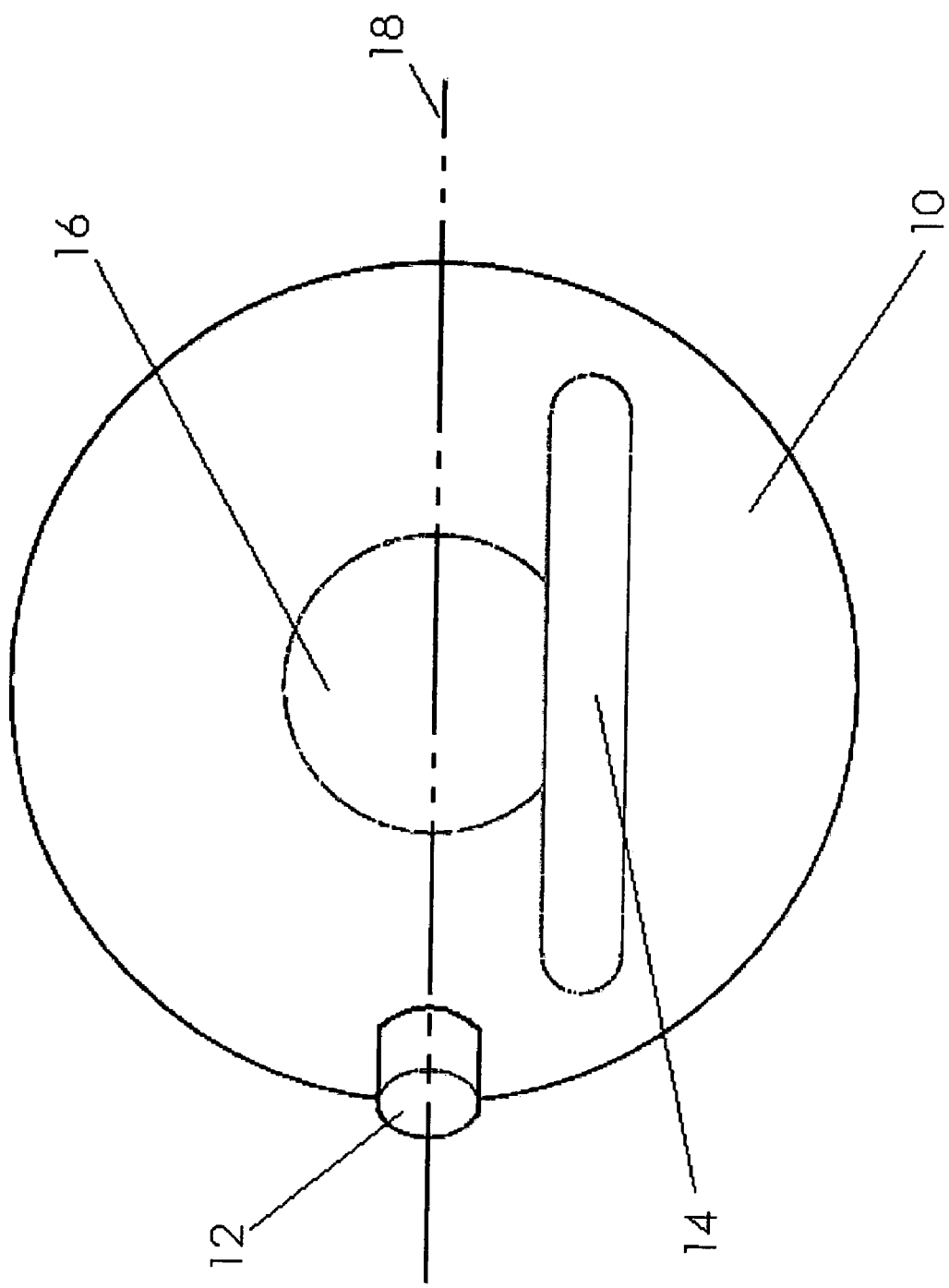
Figure 7:
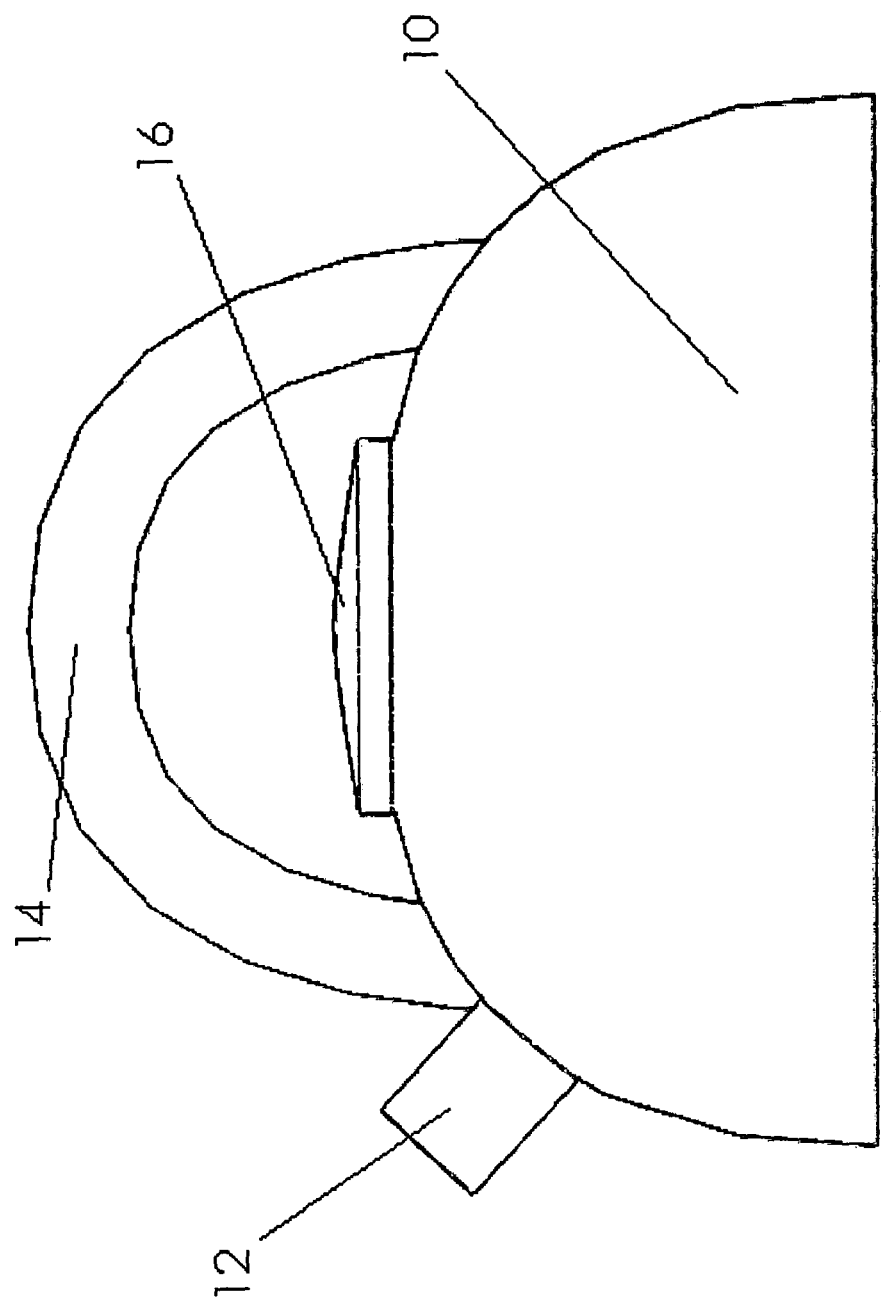
Figure 8:
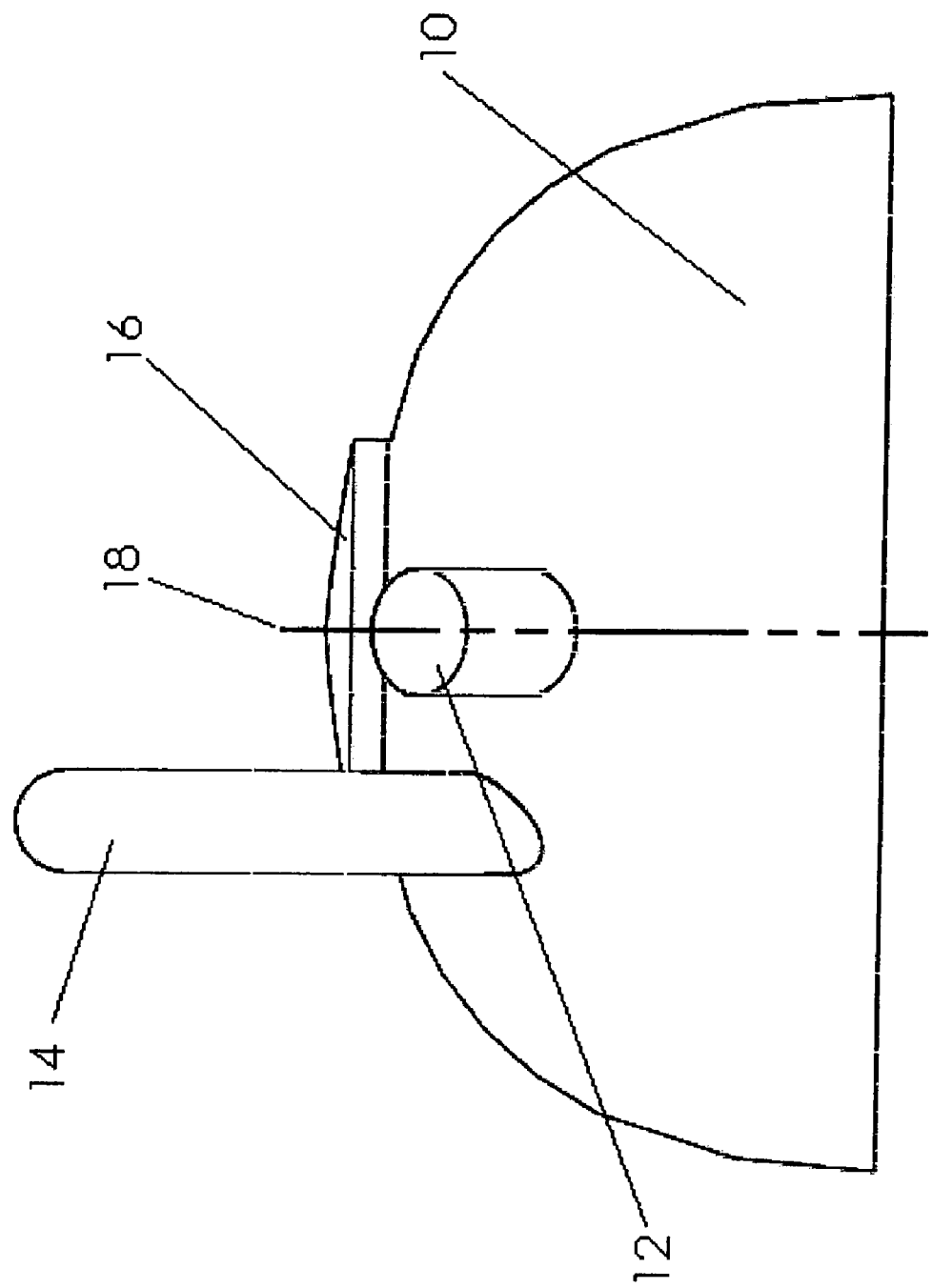
Figure 9:
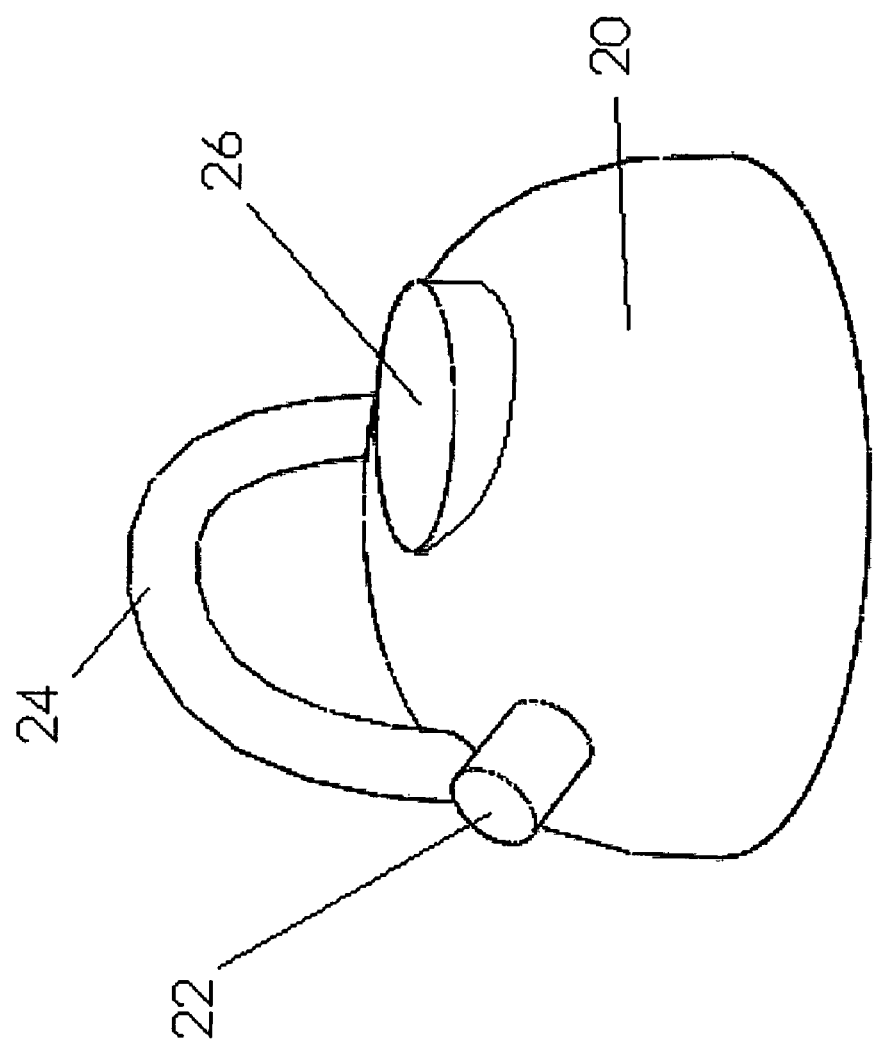
Figure 10:
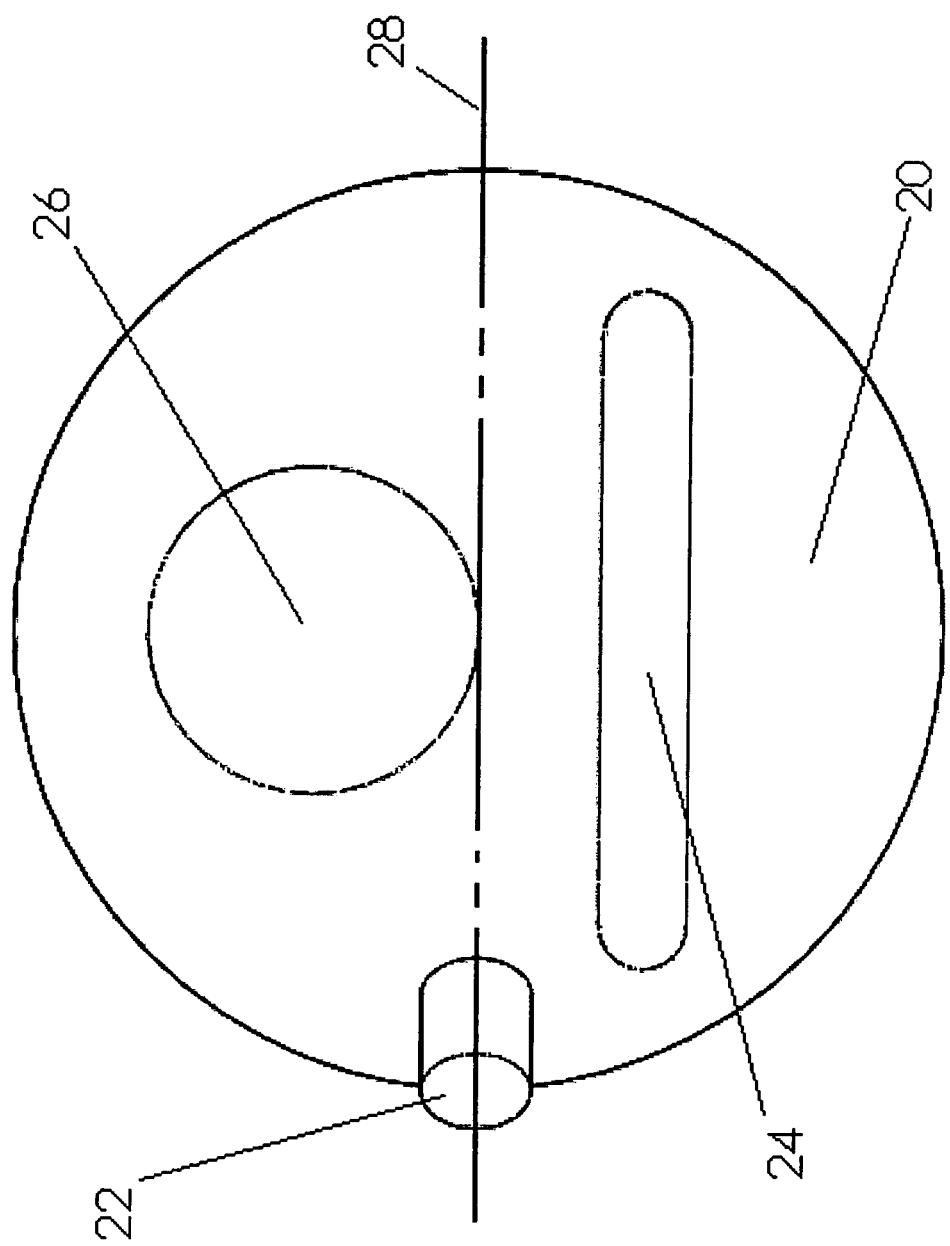
Figure 11:
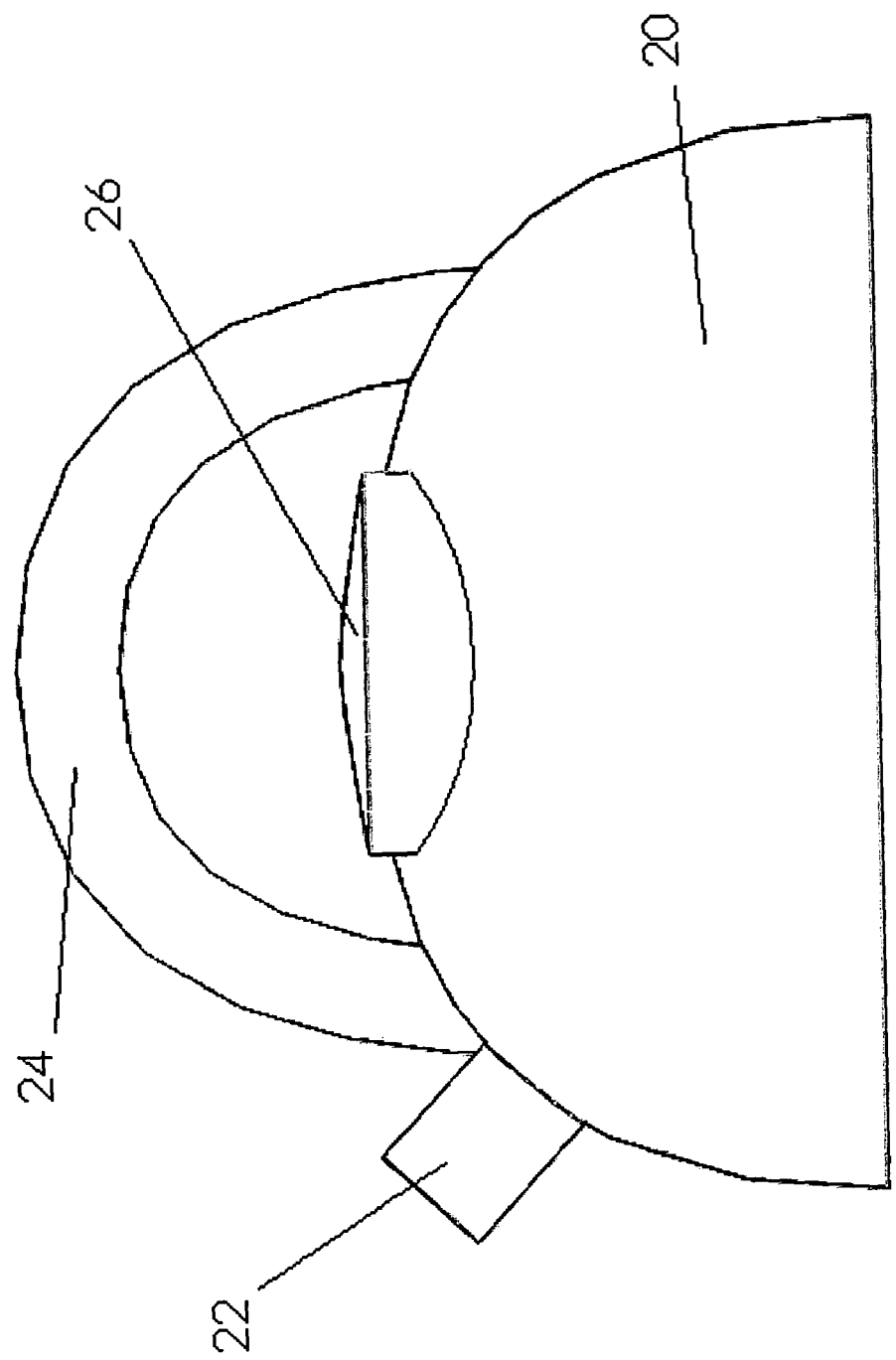
Figure 12:
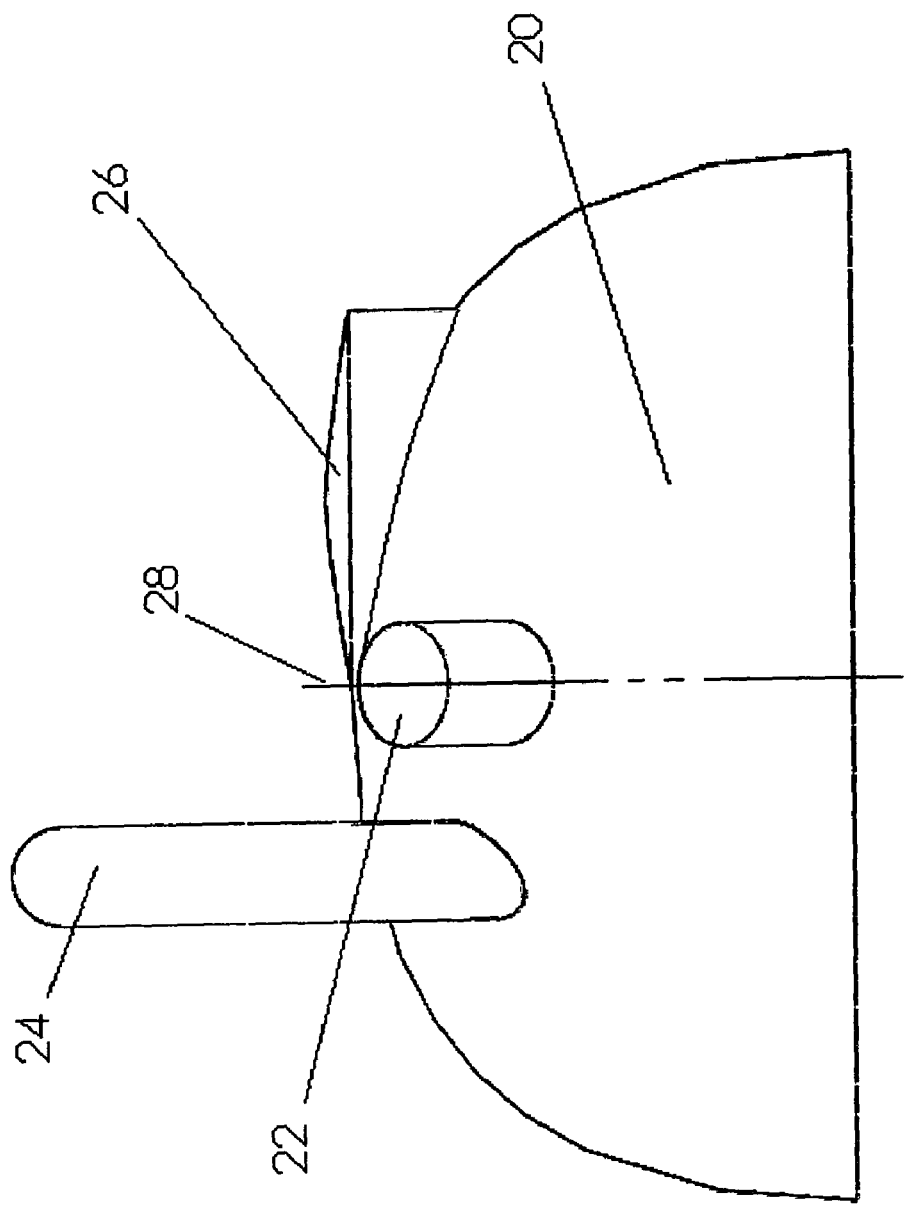
Figure 13:
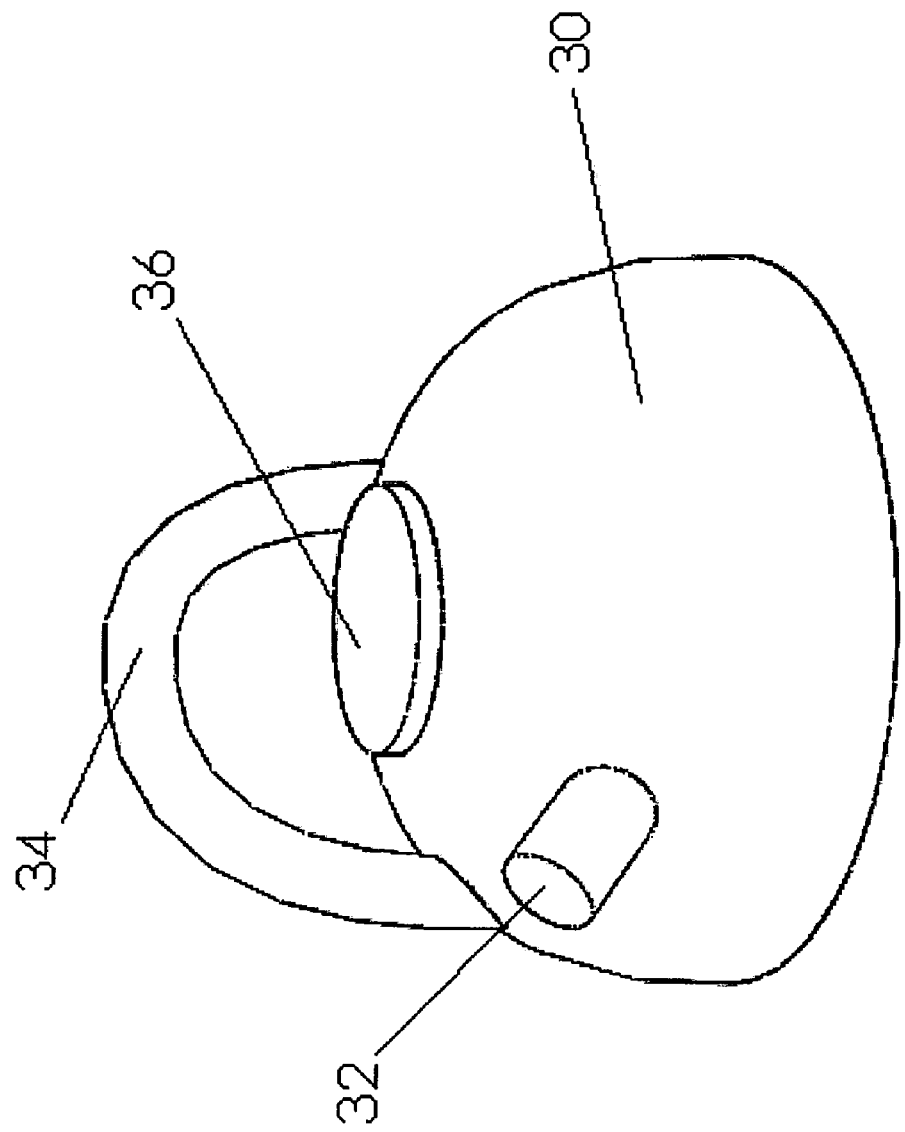
Figure 14:
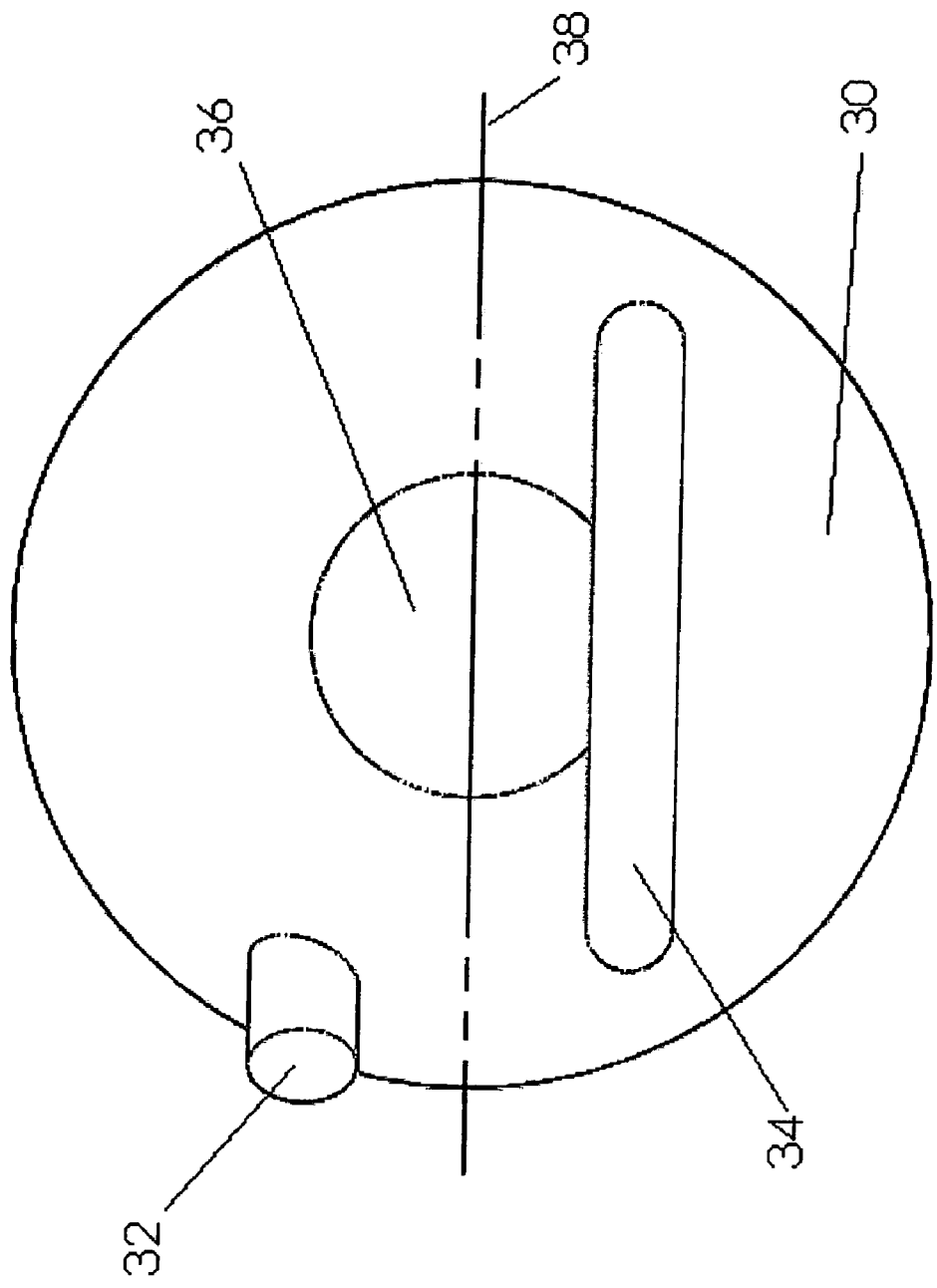
Figure 15:
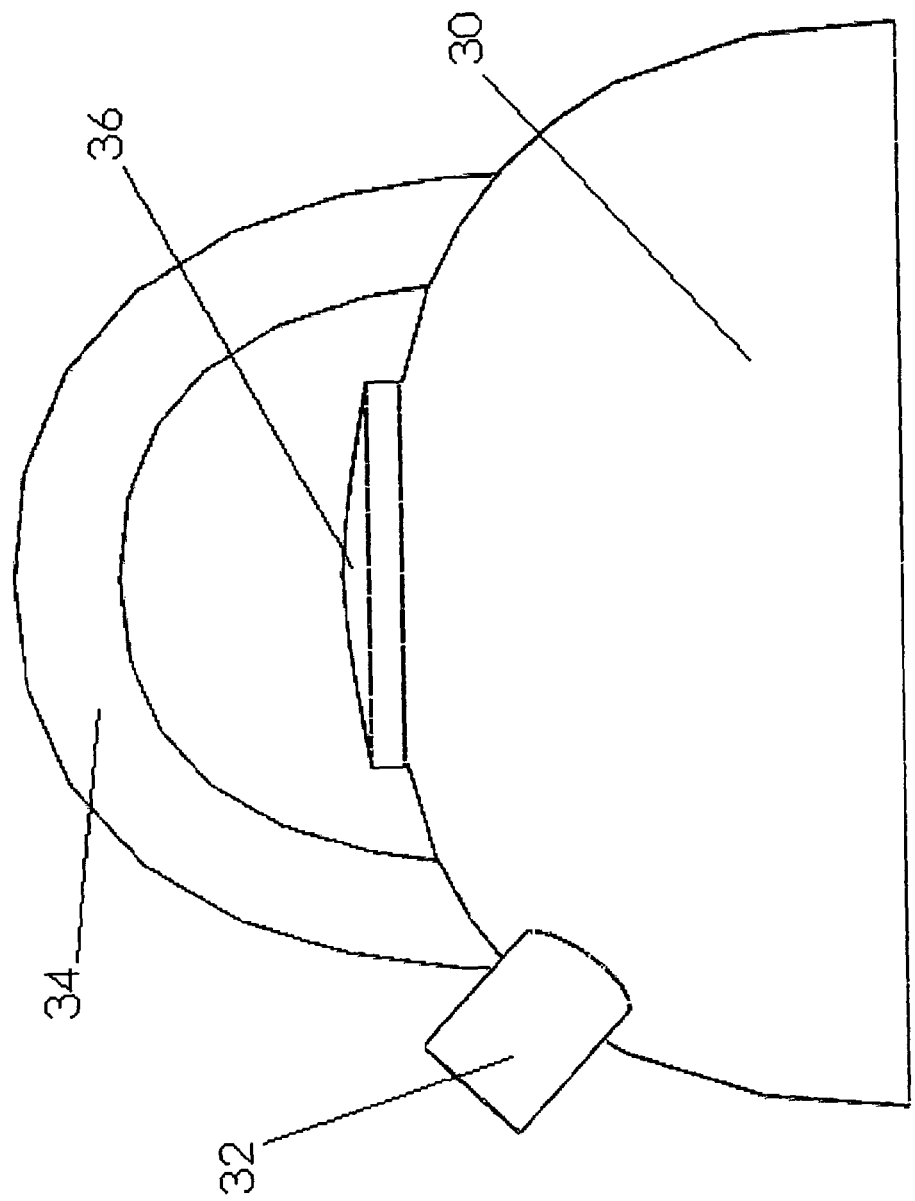
Figure 16:
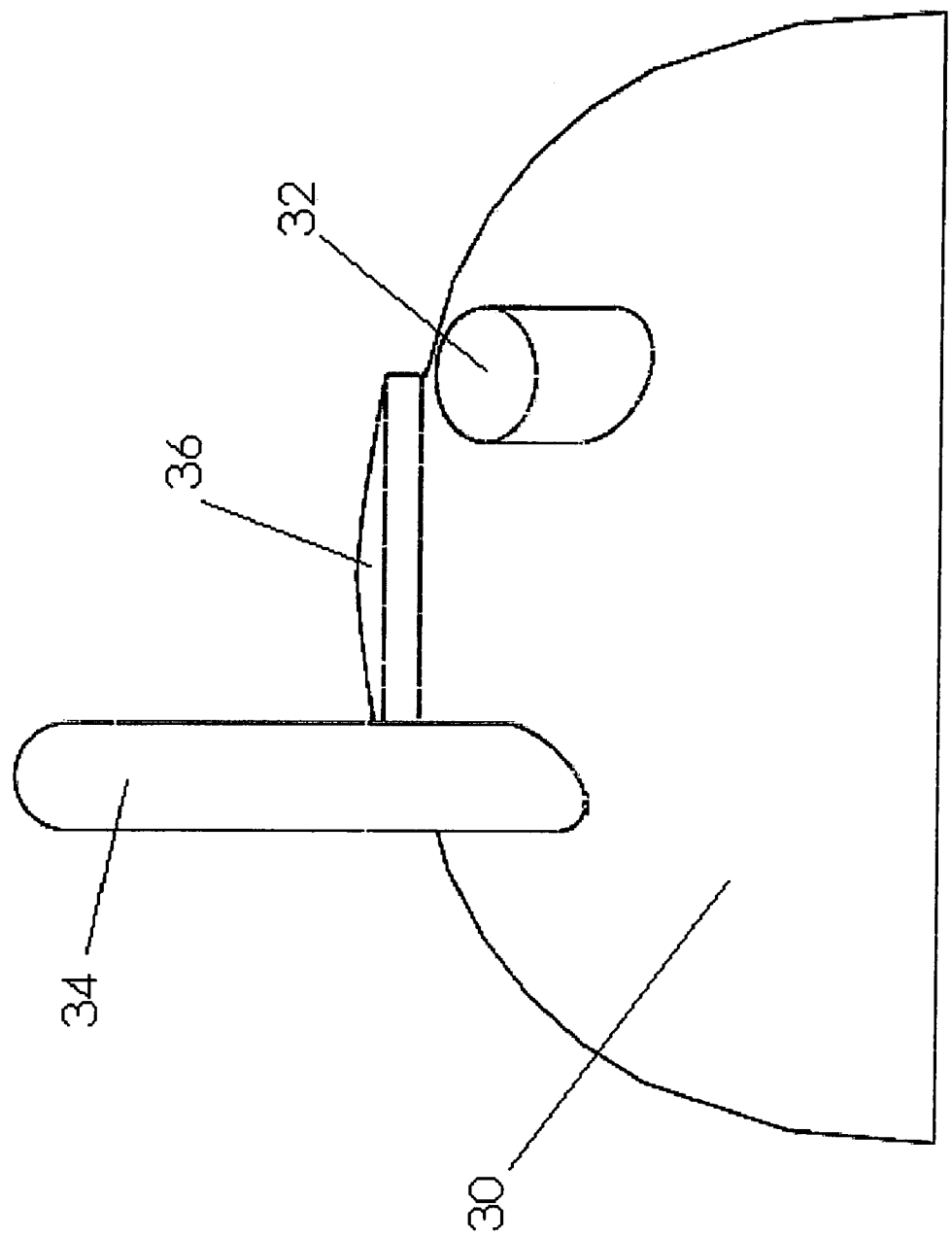
Figure 17:
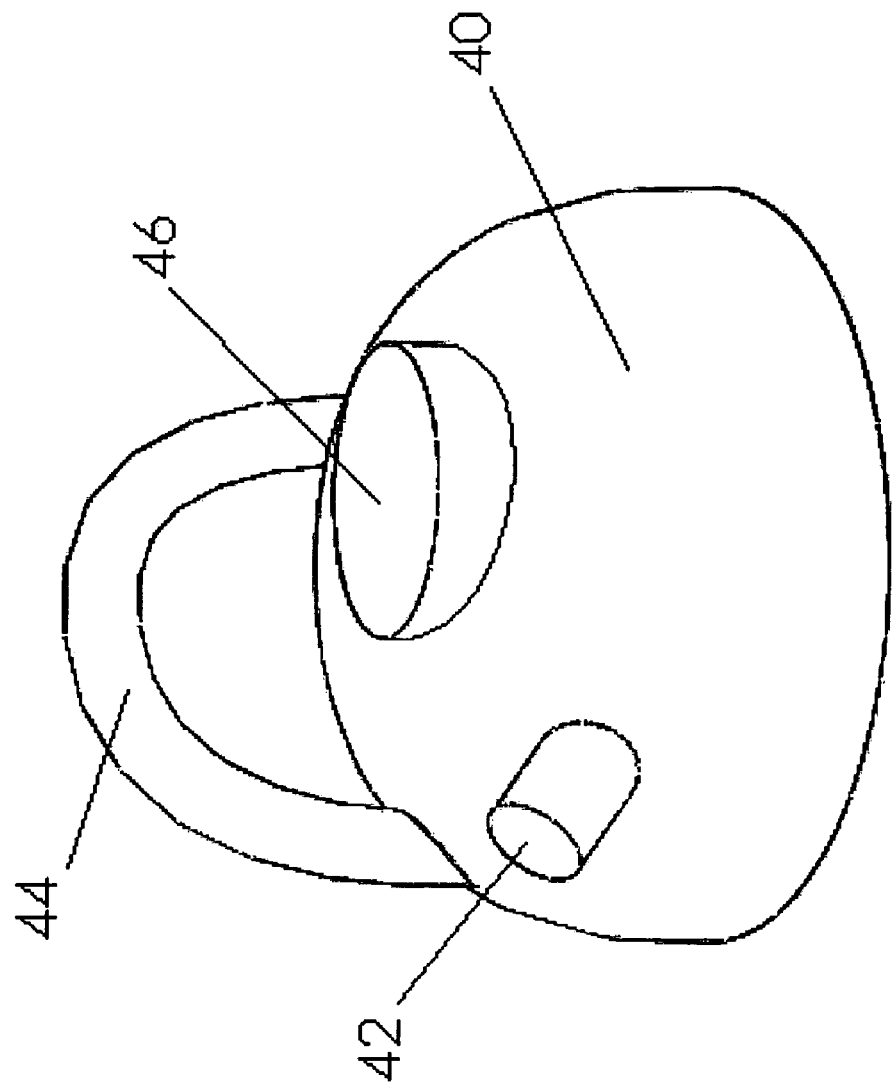
Figure 18:
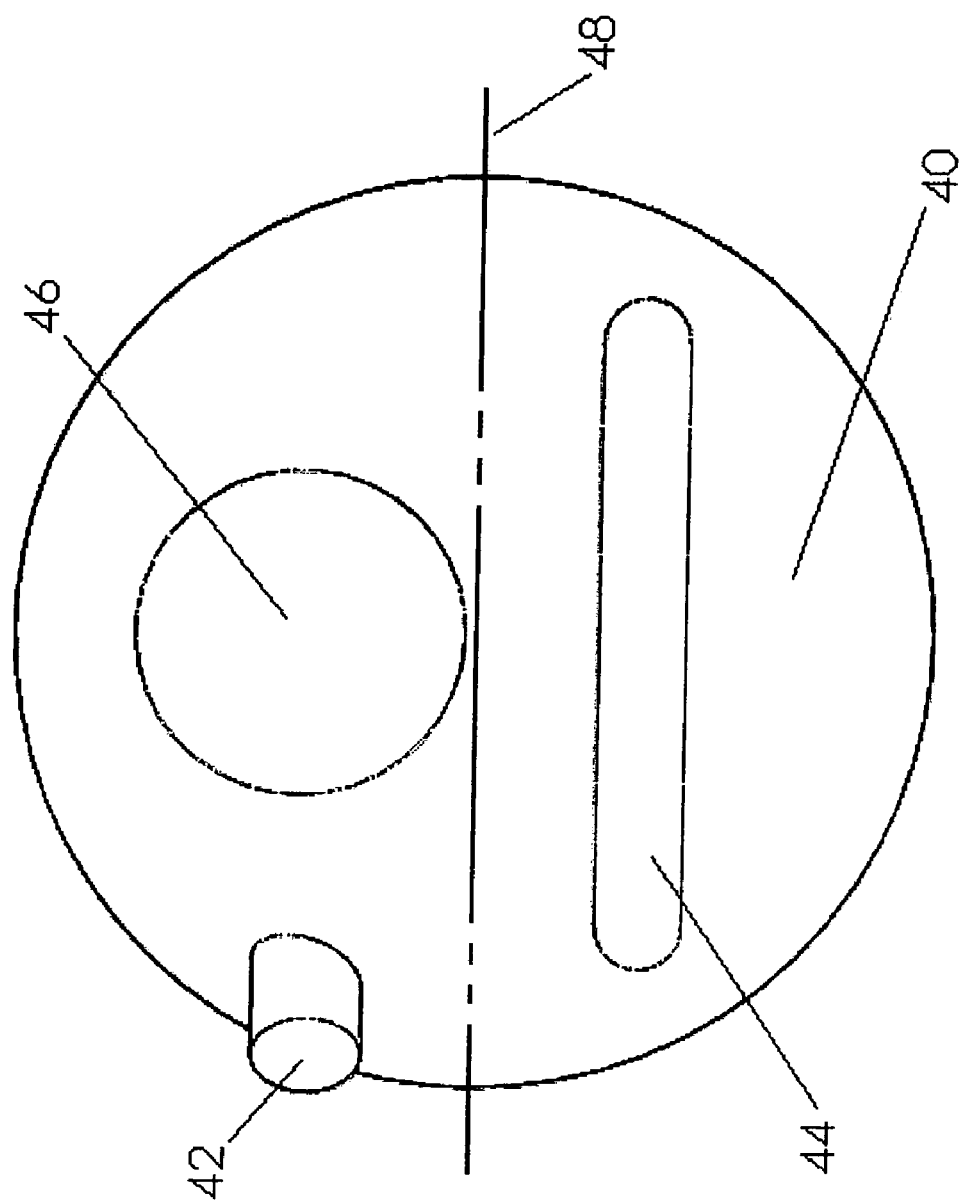
Figure 19:
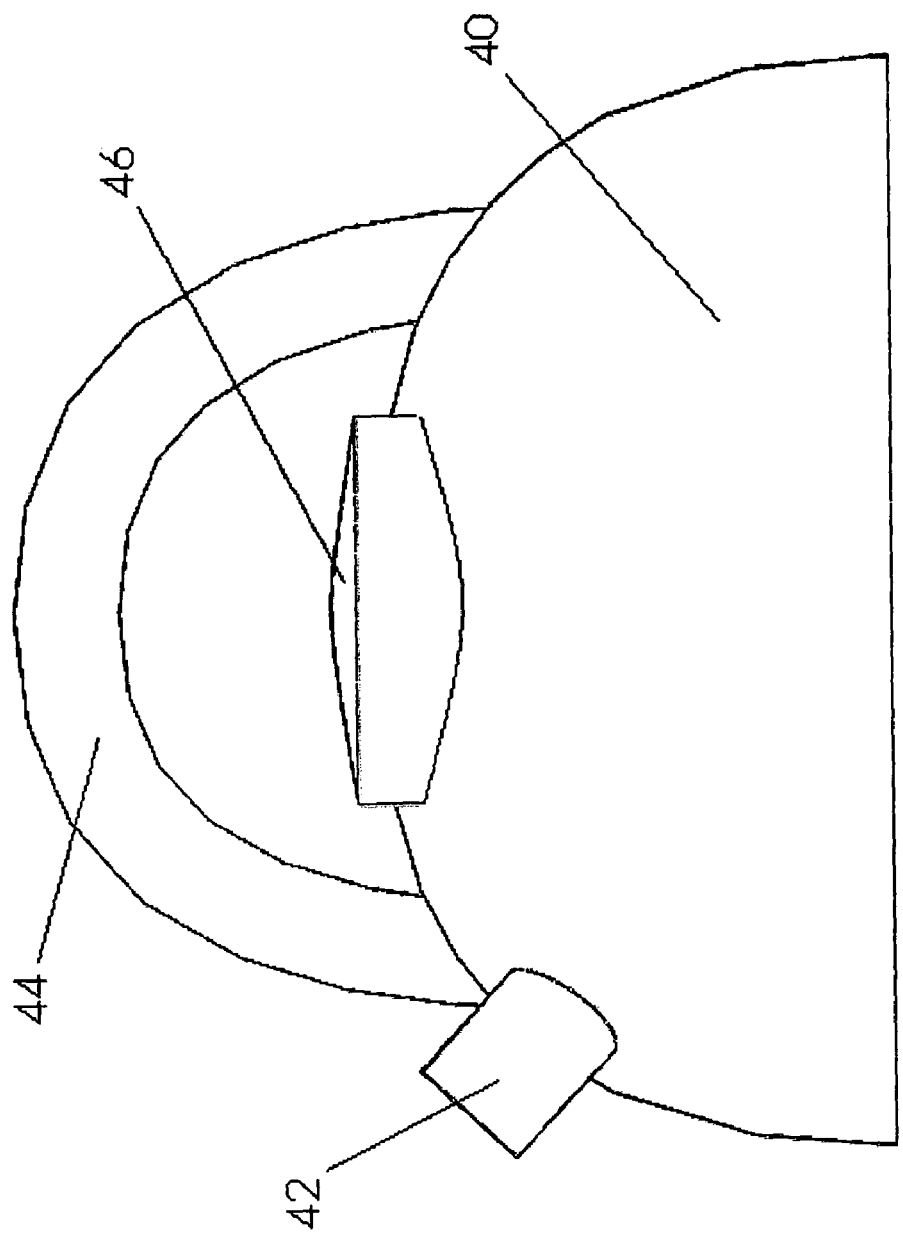
Figure 20:
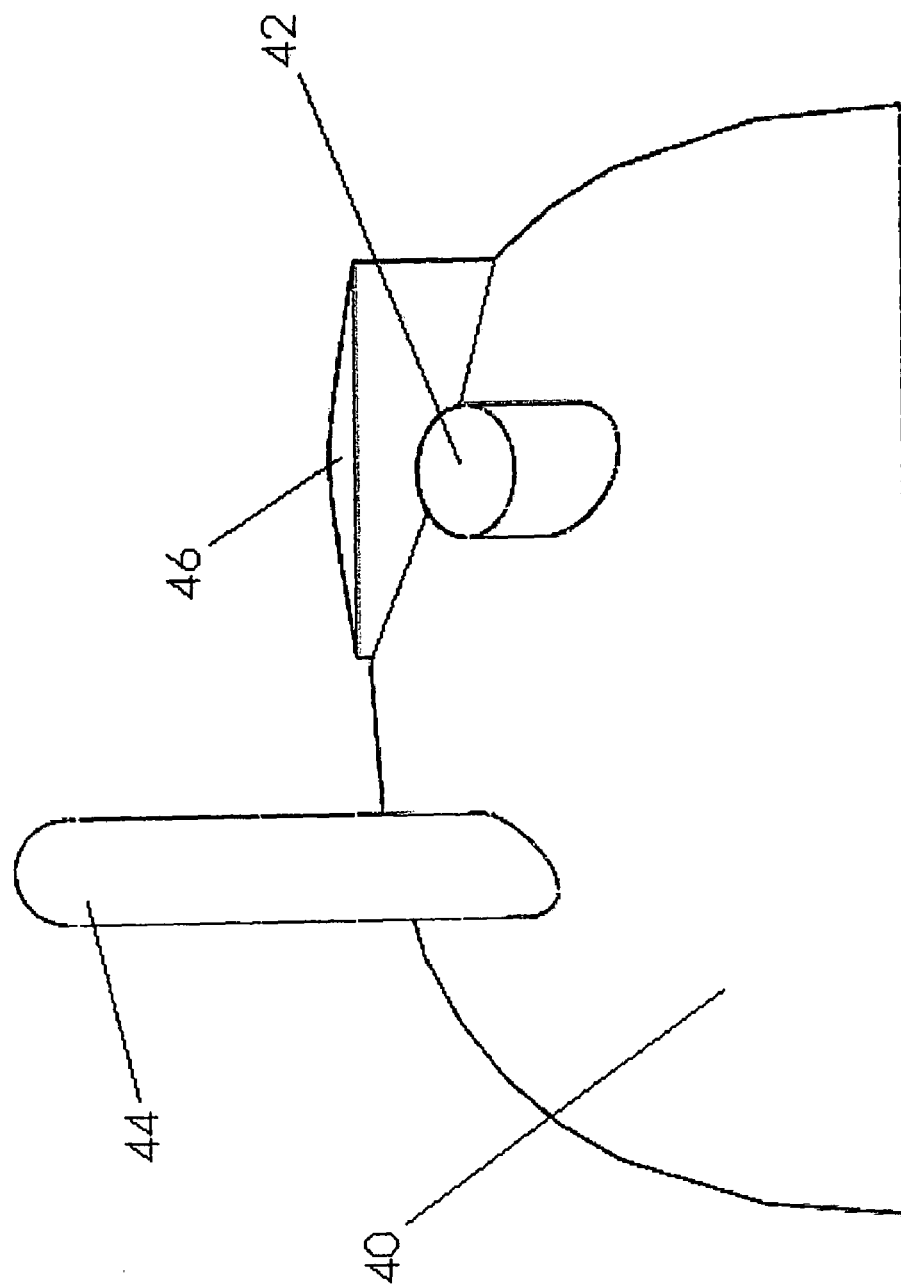
Figure 21:
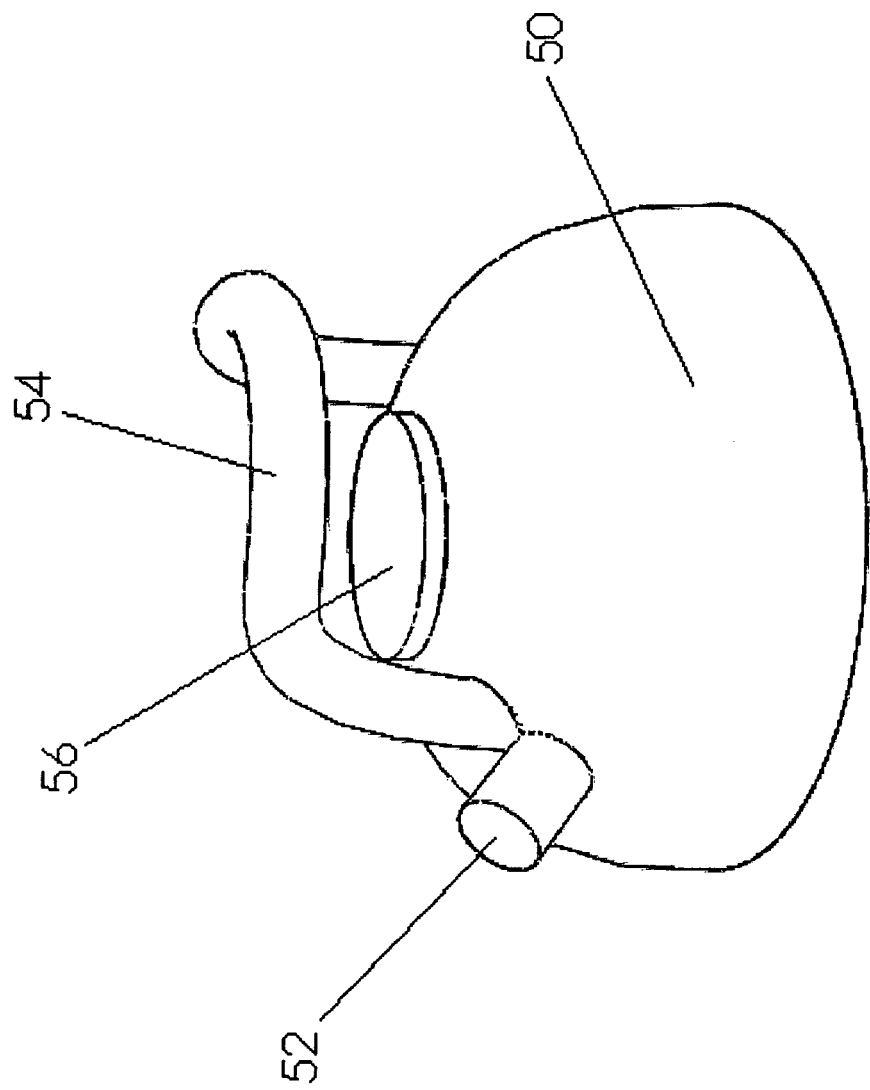
Figure 22:
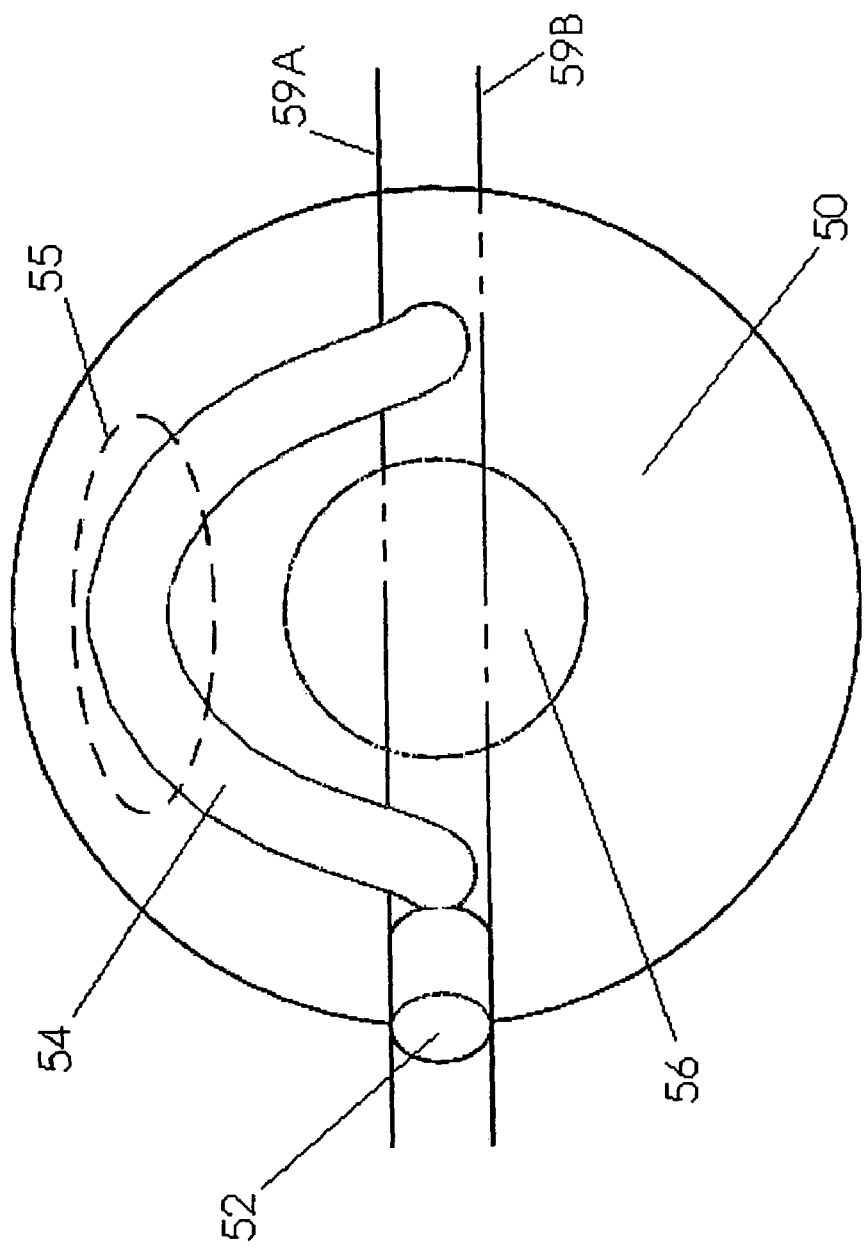
Figure 23:
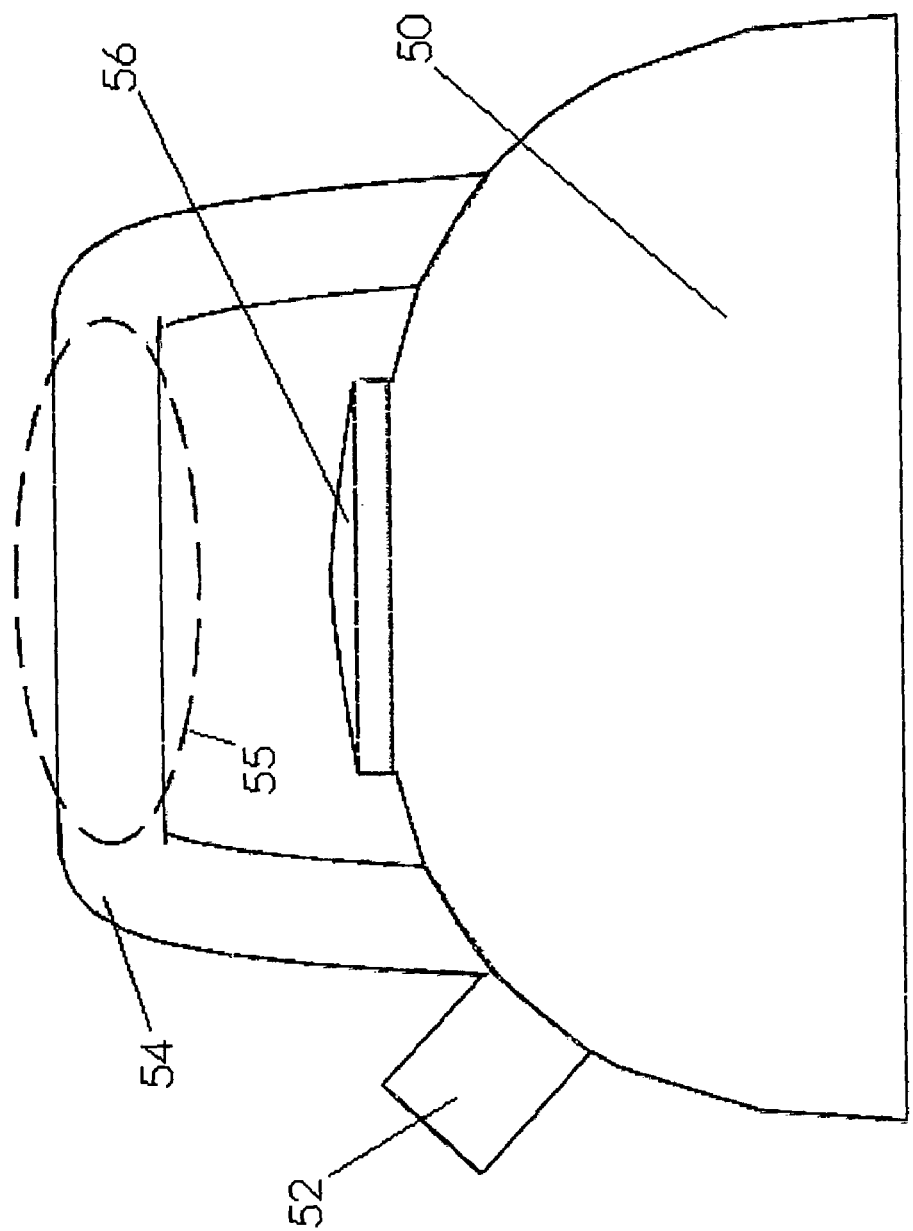
Figure 24:
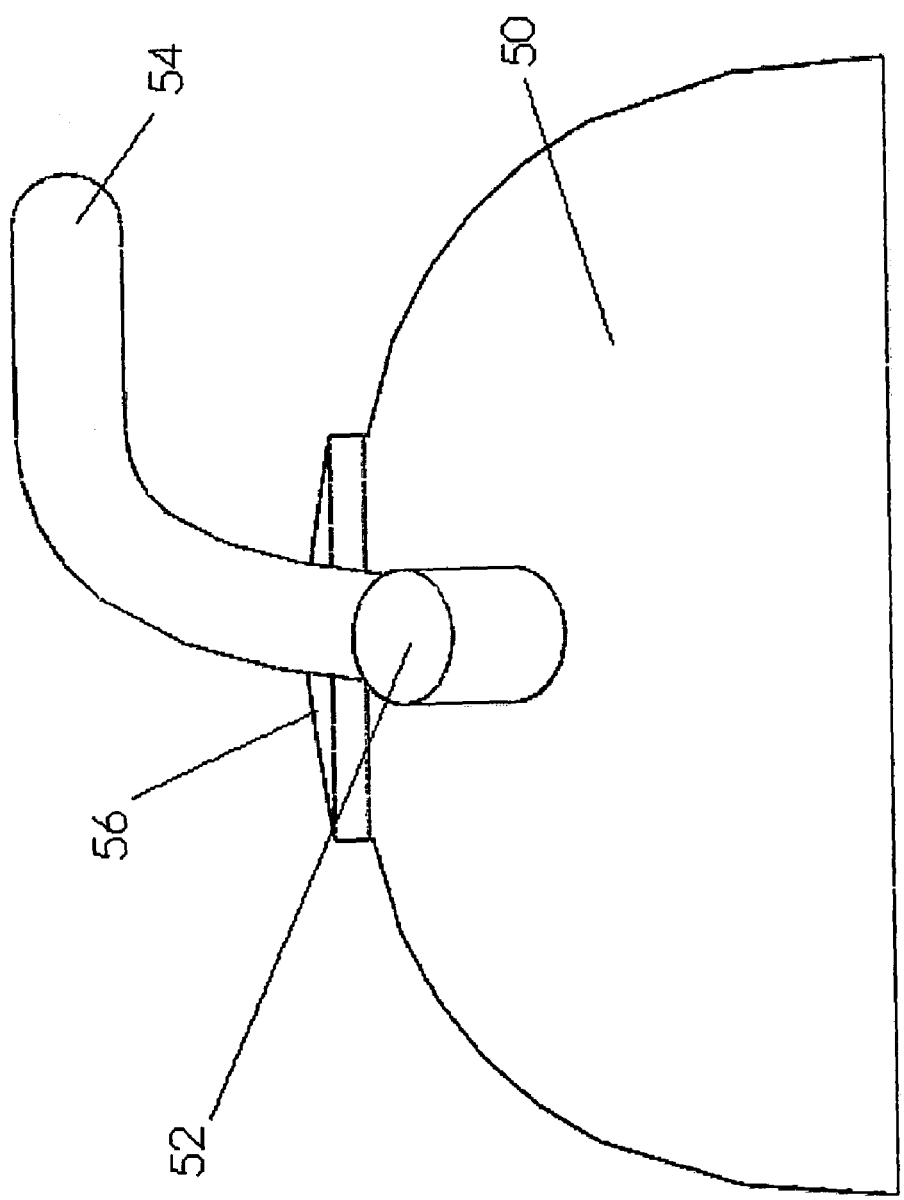
Figure 25:
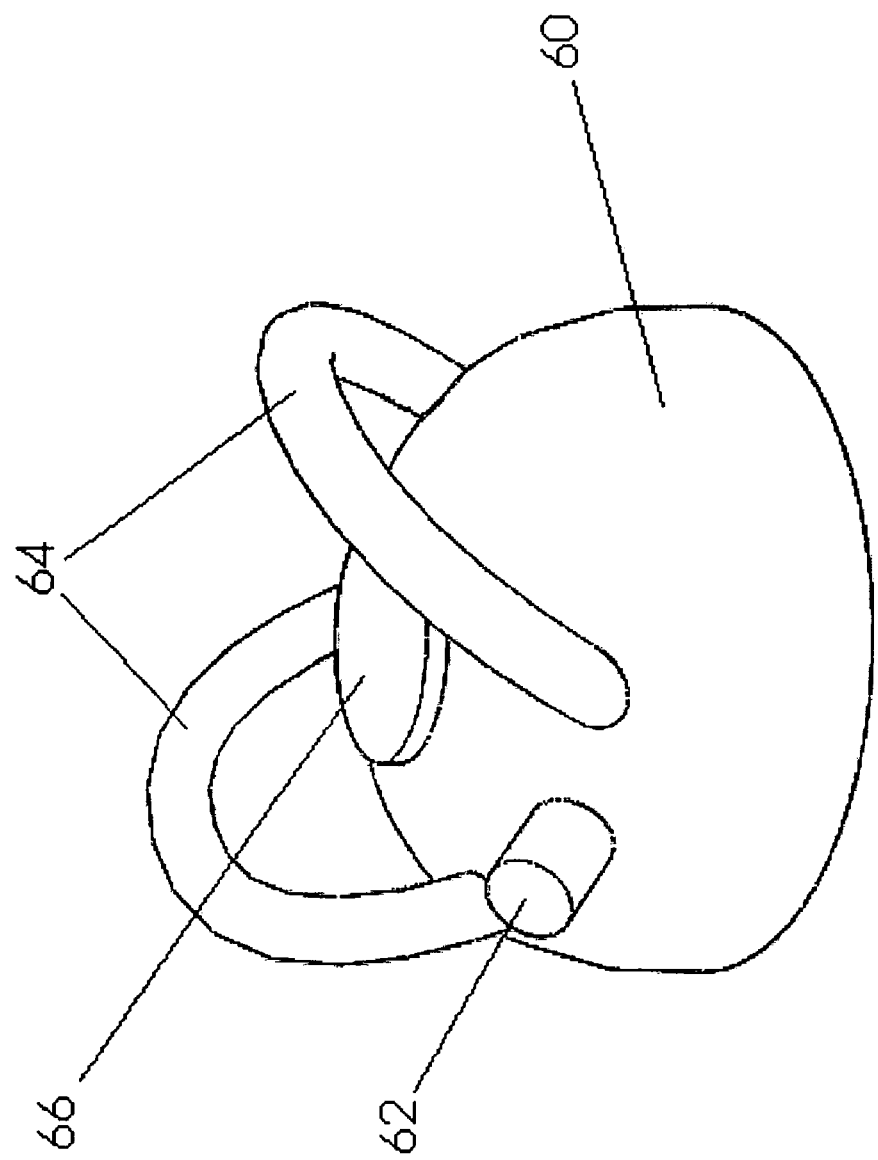
Figure 26:
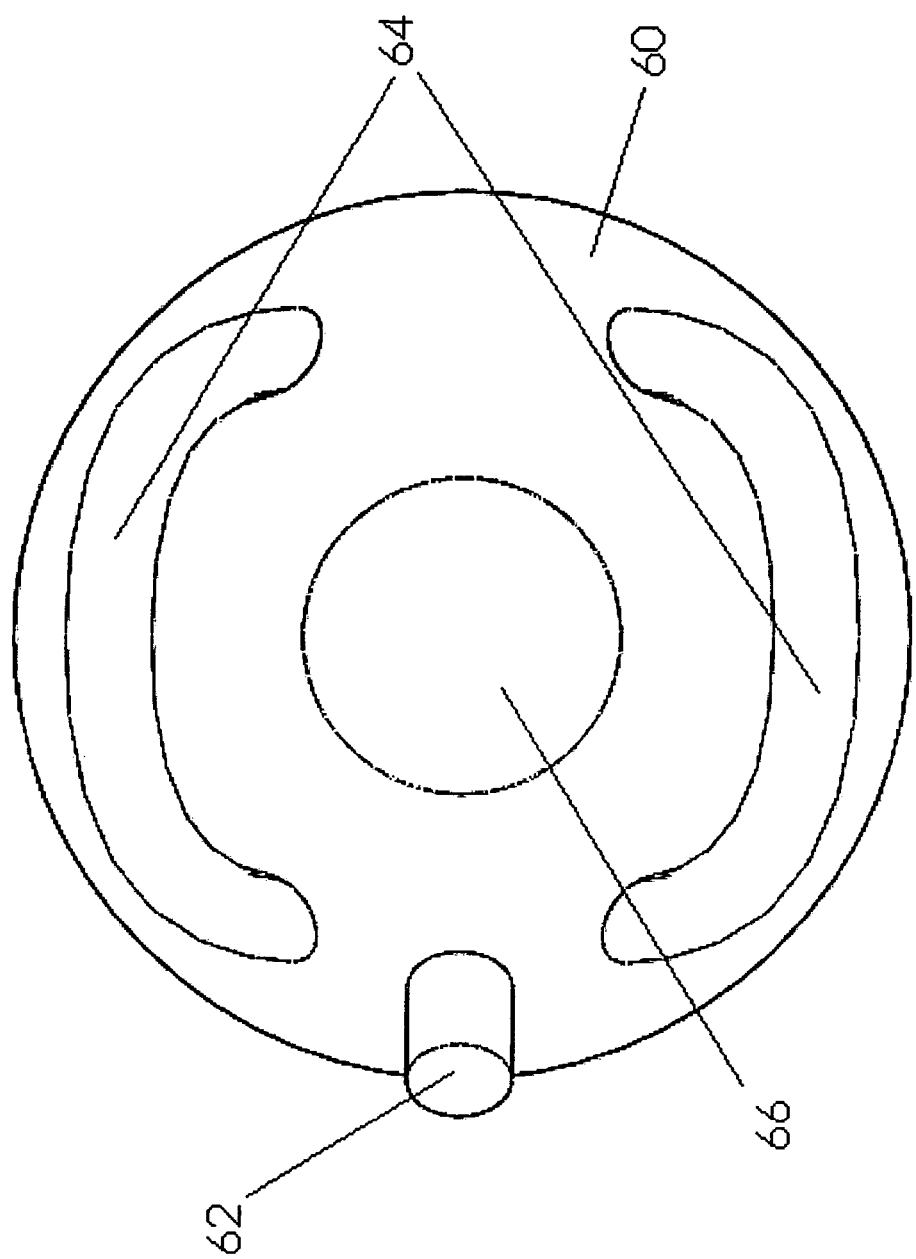
Figure 27:
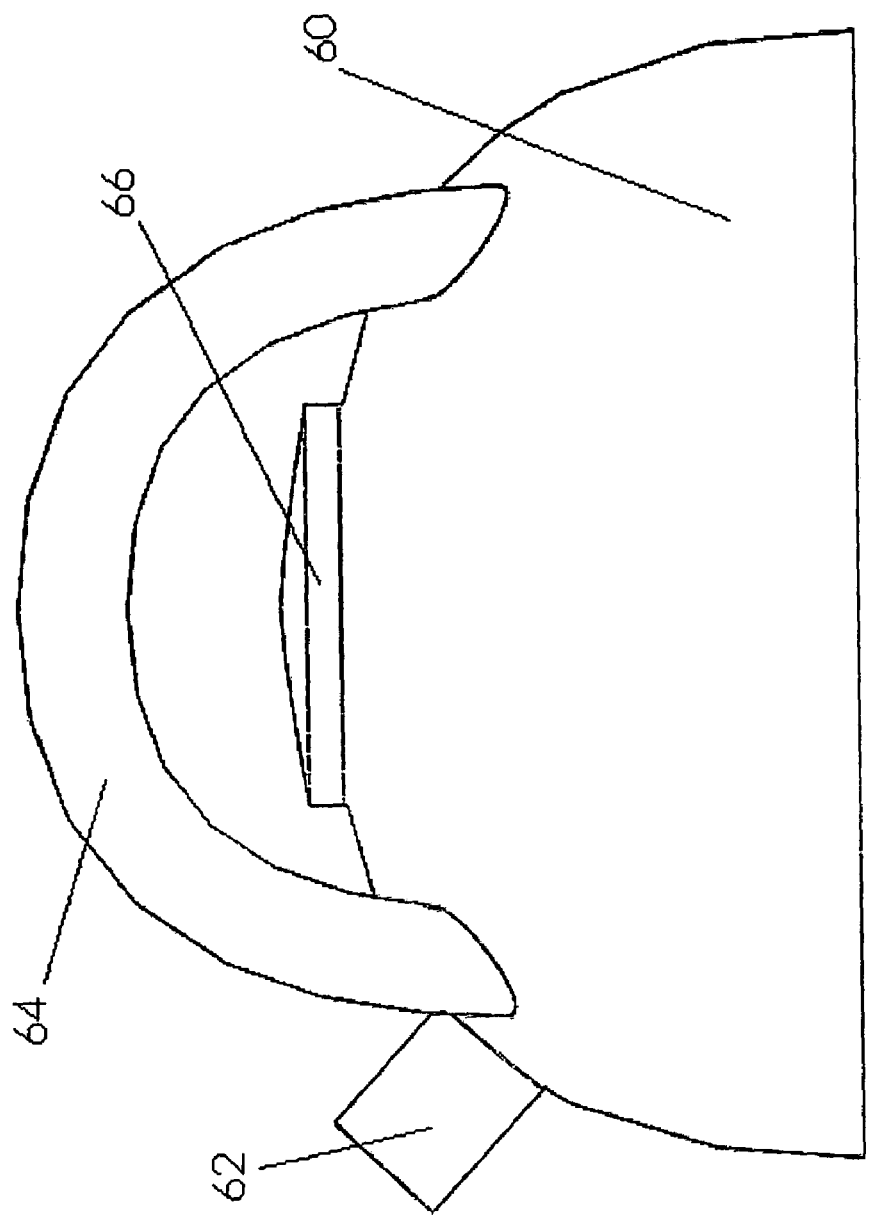
Figure 28:
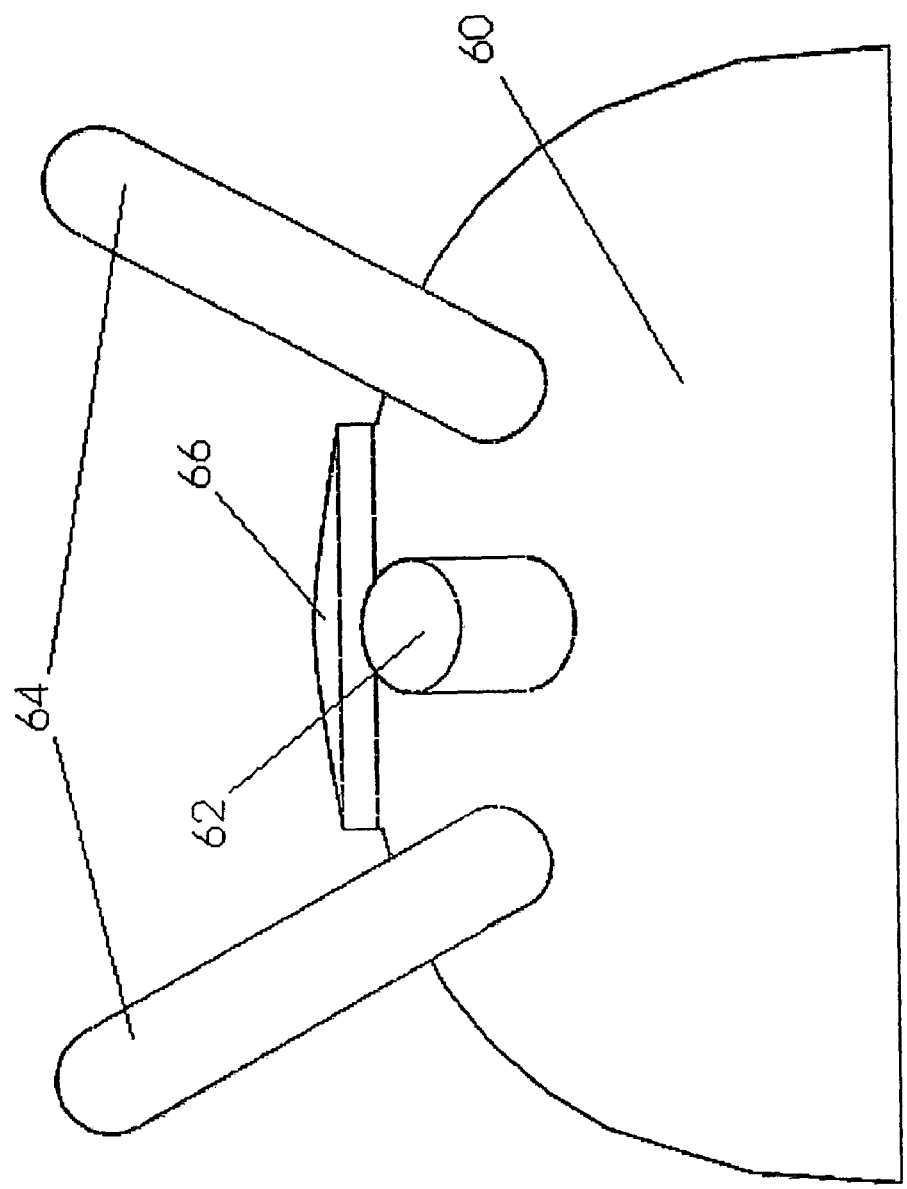
Figure 29:
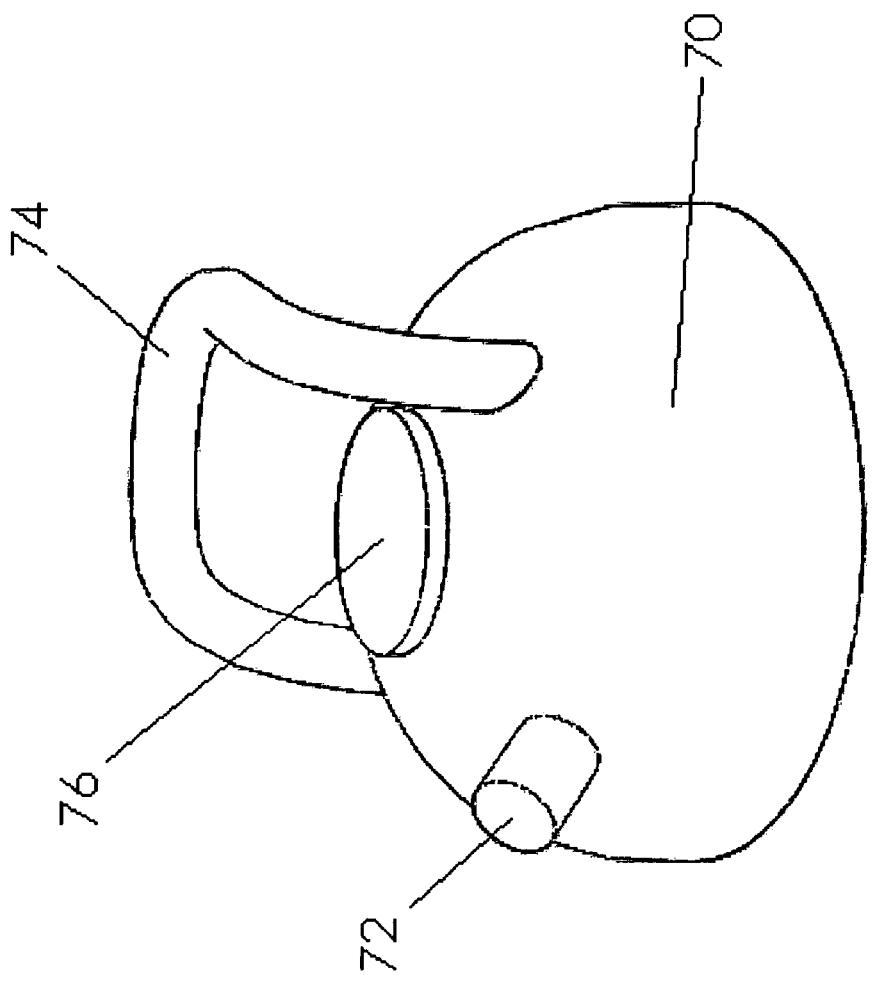
Figure 30:
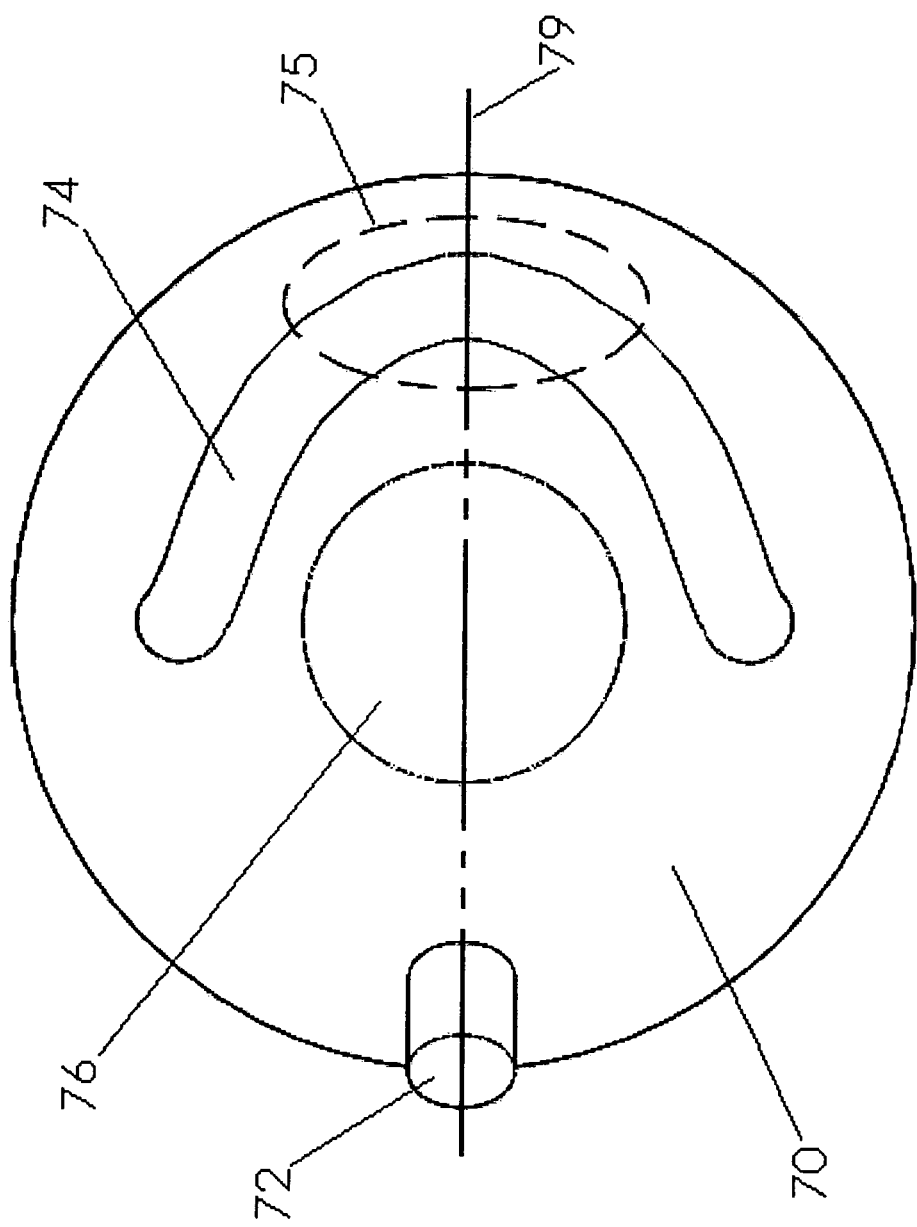
Figure 31:
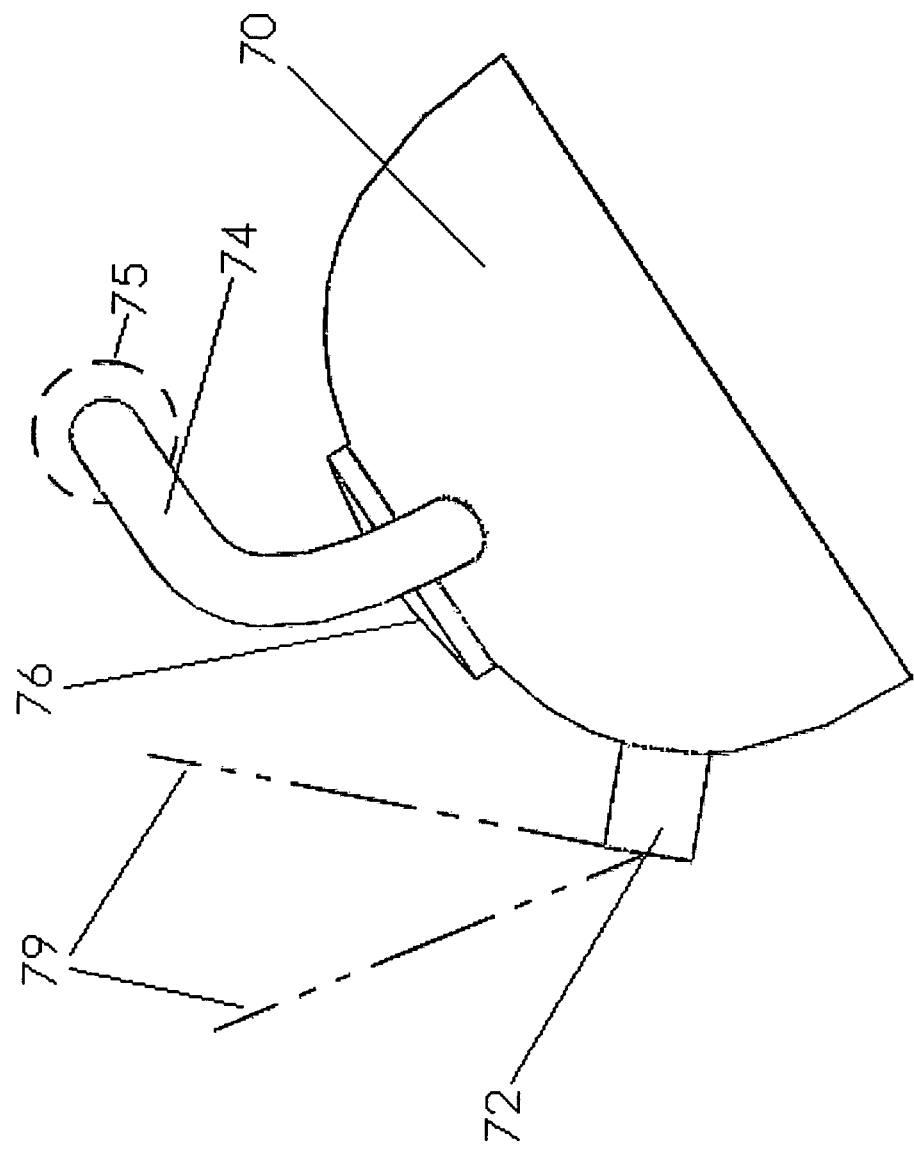
Figure 32:
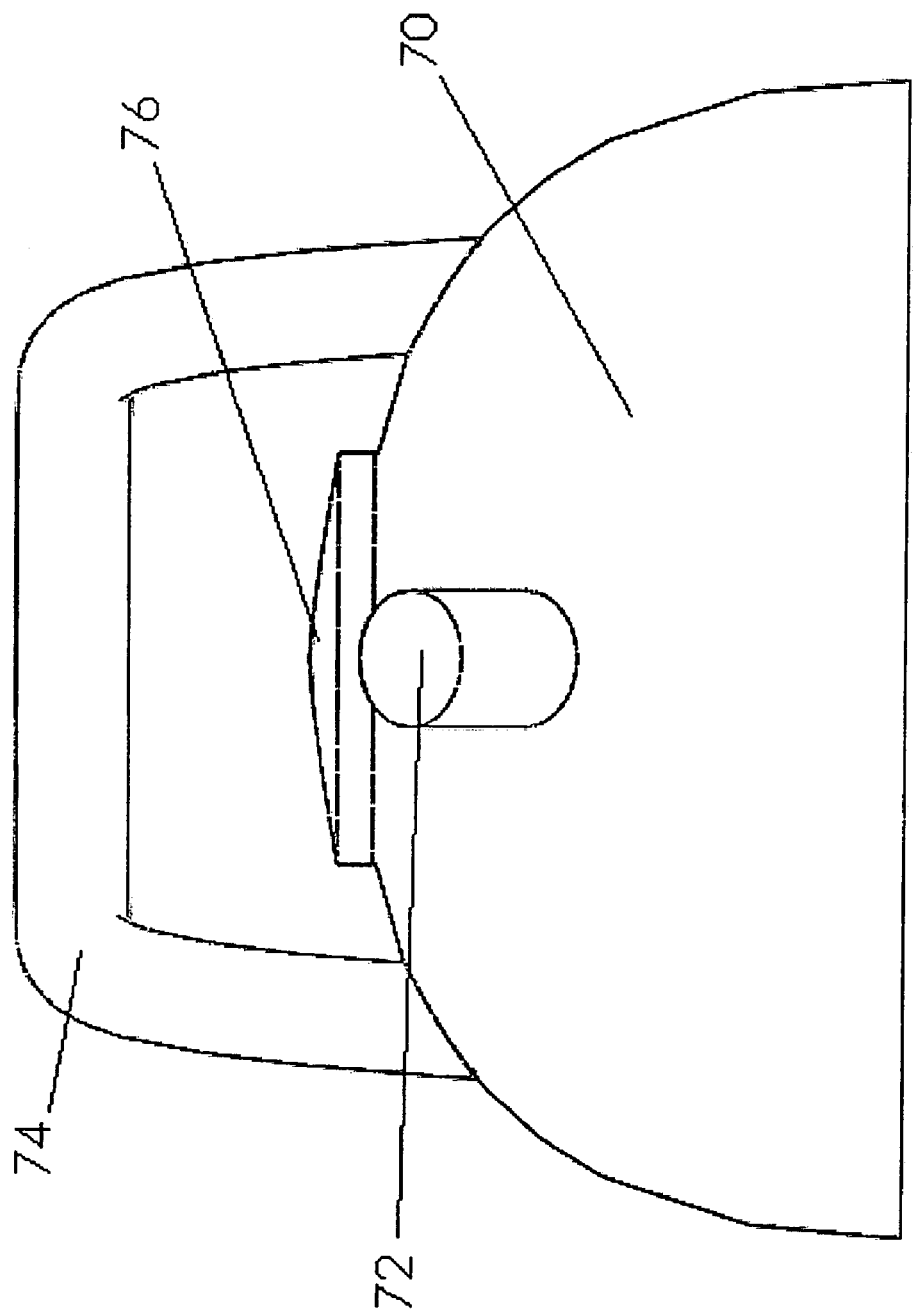
Figure 33:
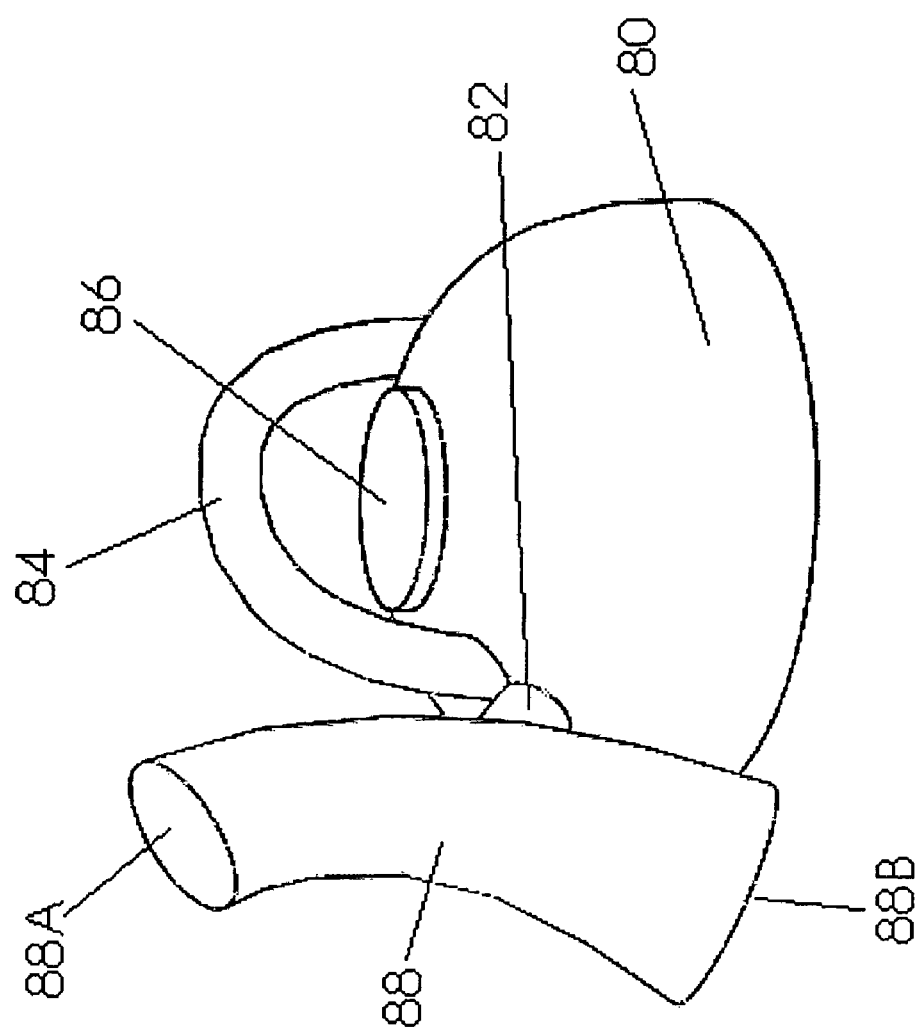
Figure 34:
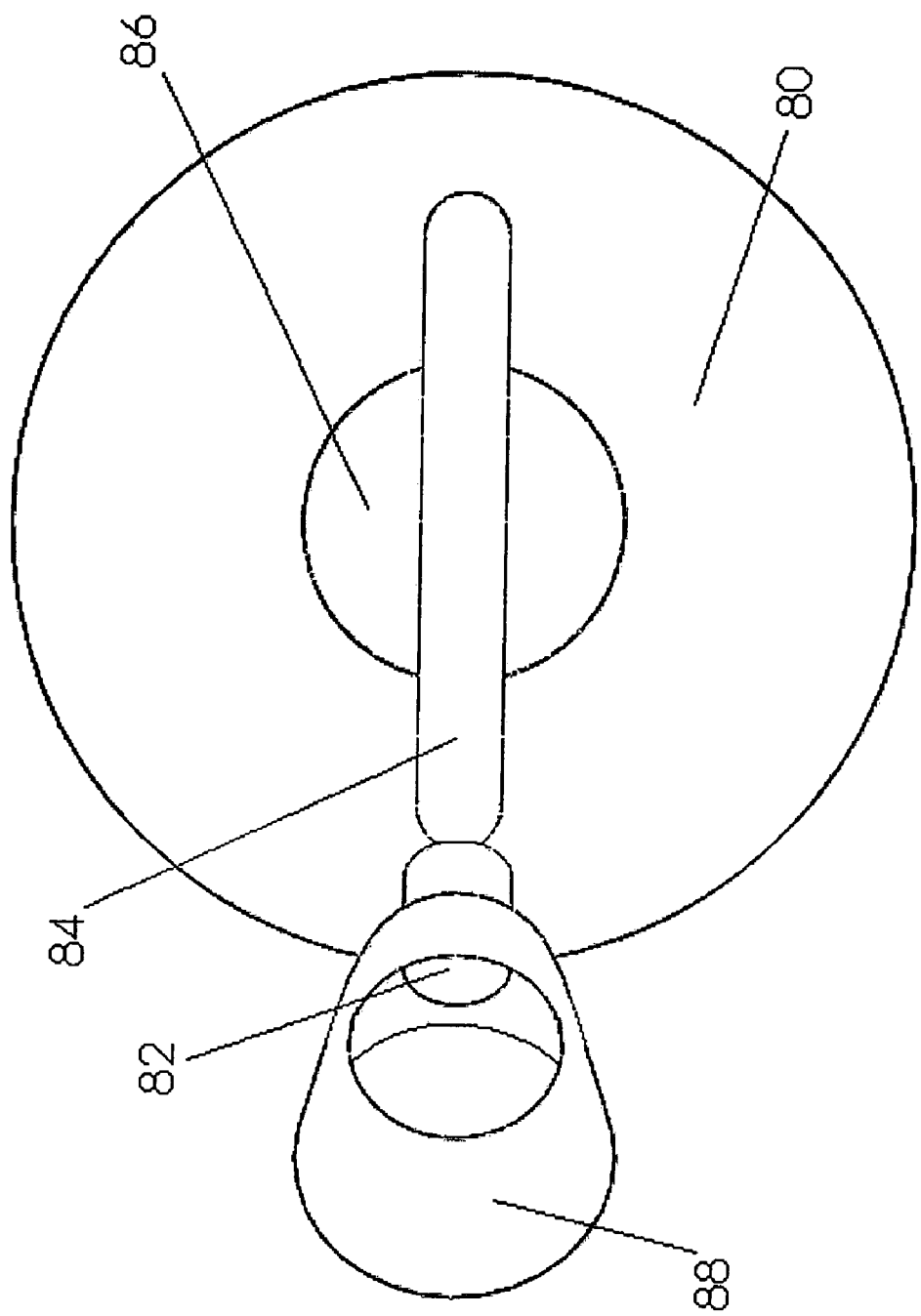
Figure 35:
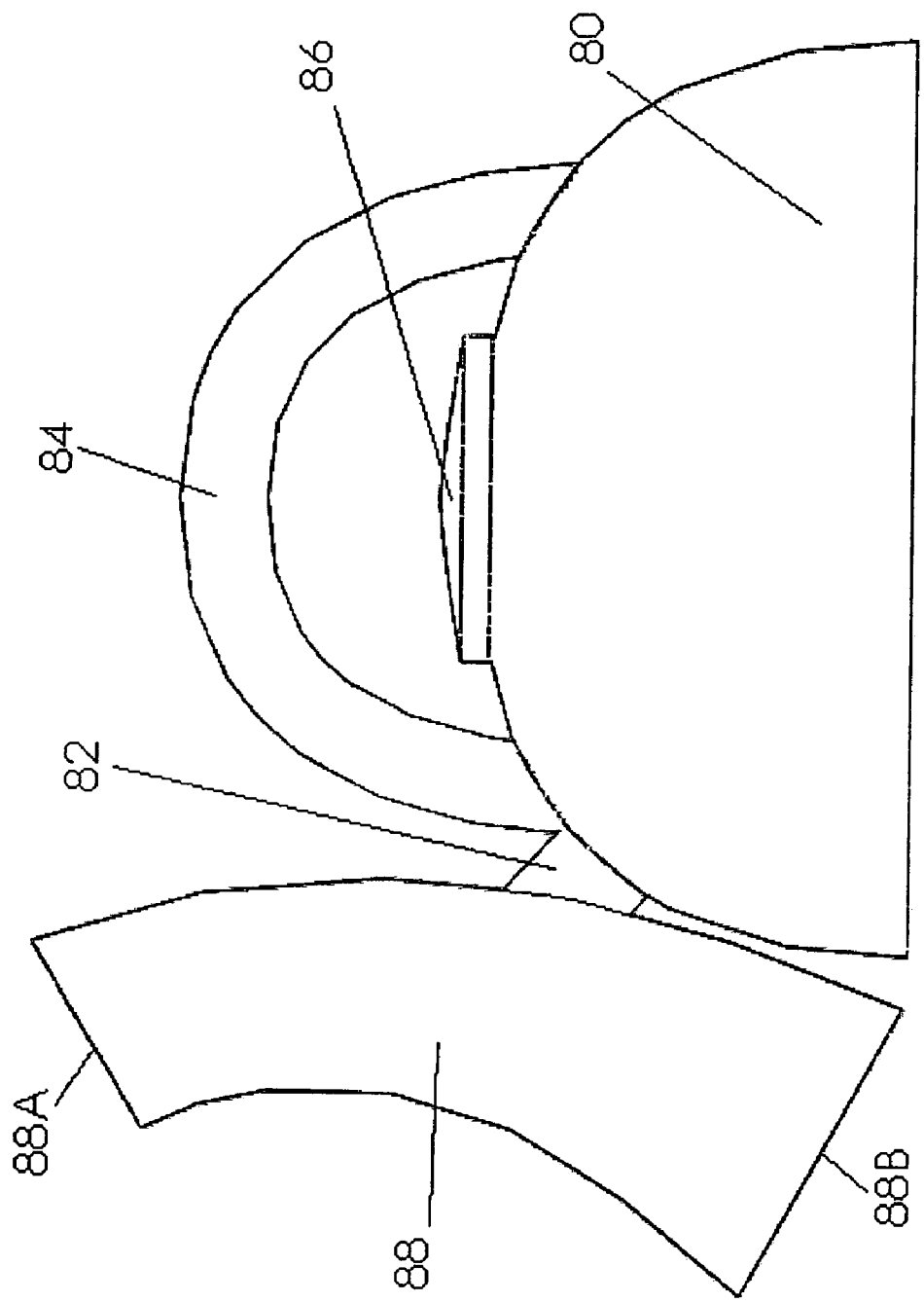
Figure 36:
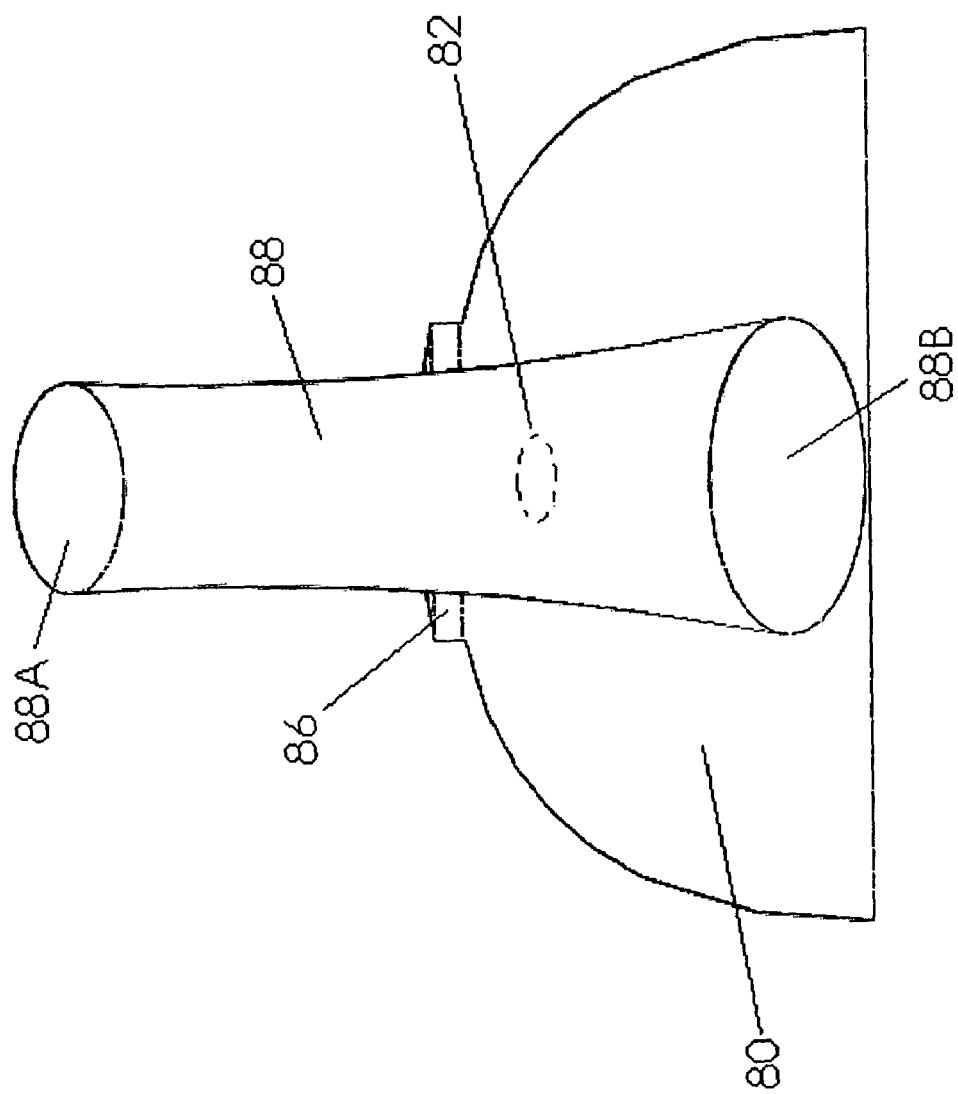
Figure 37:
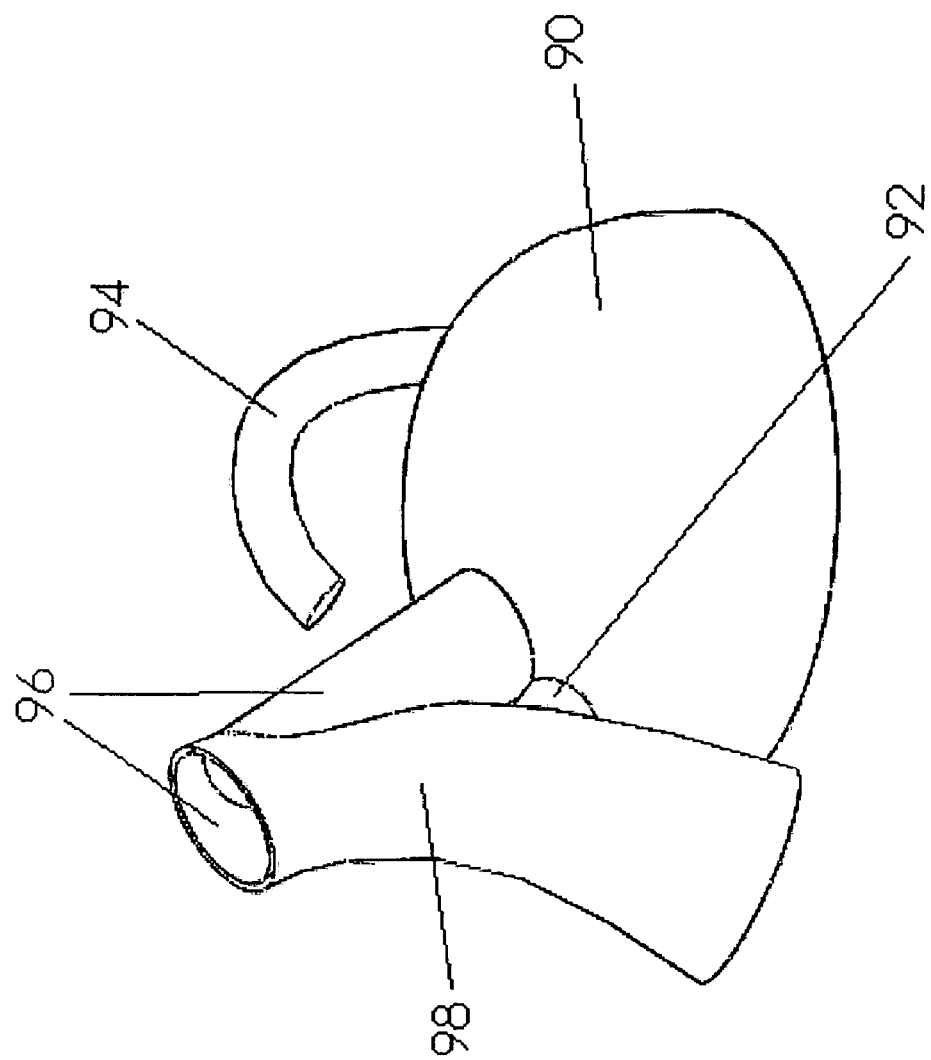
Figure 38:
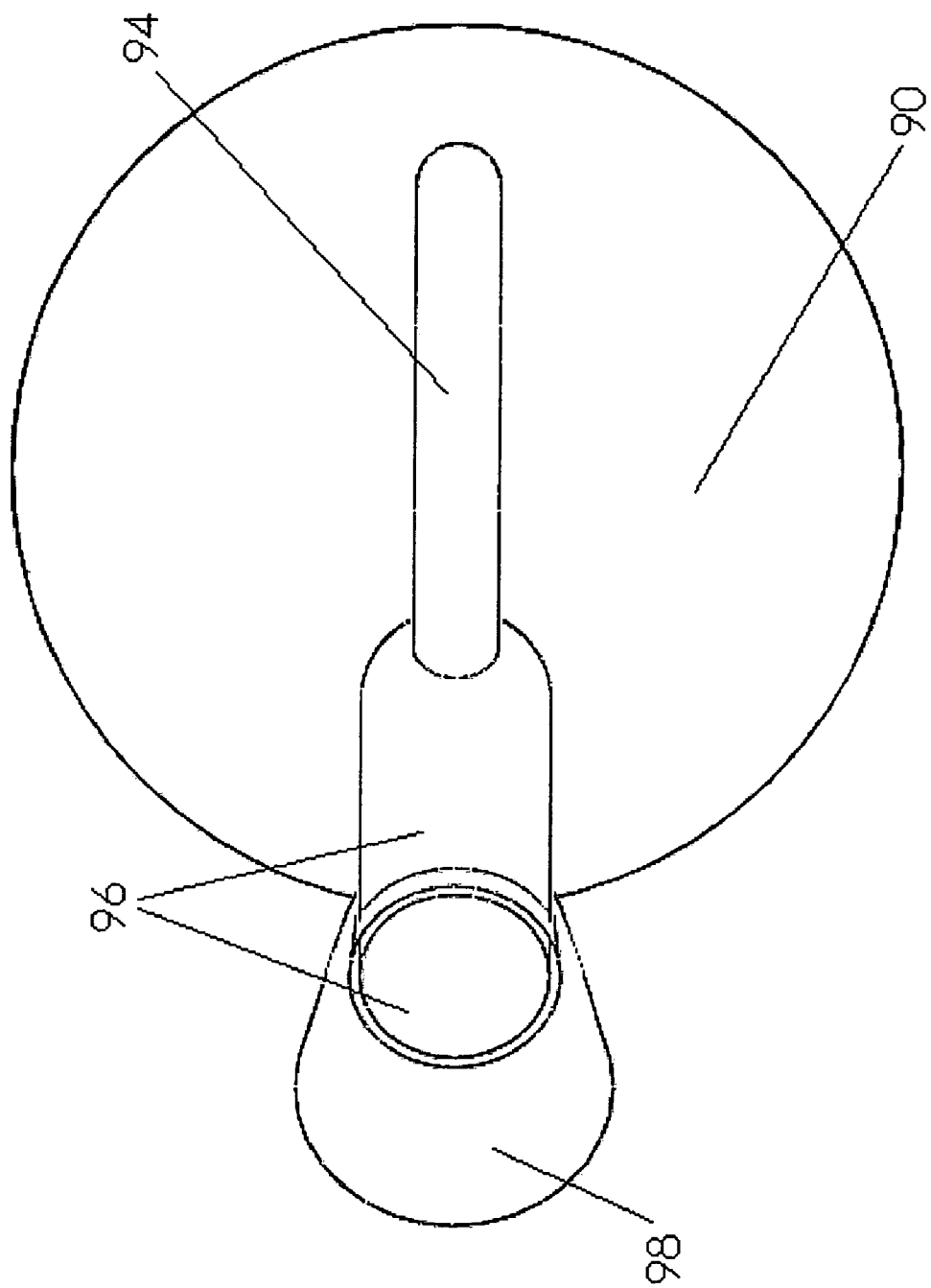
Figure 39:
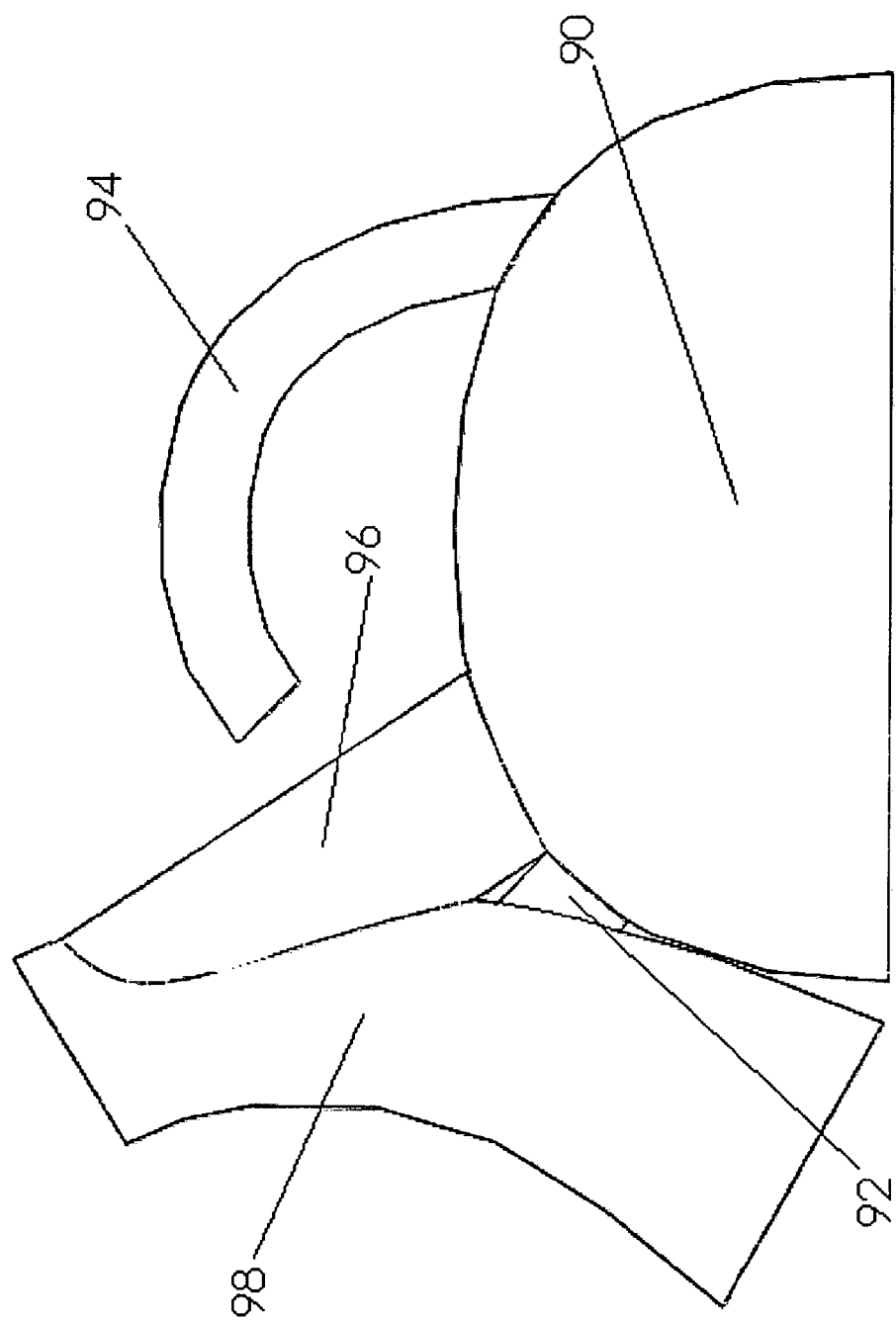
Figure 40:
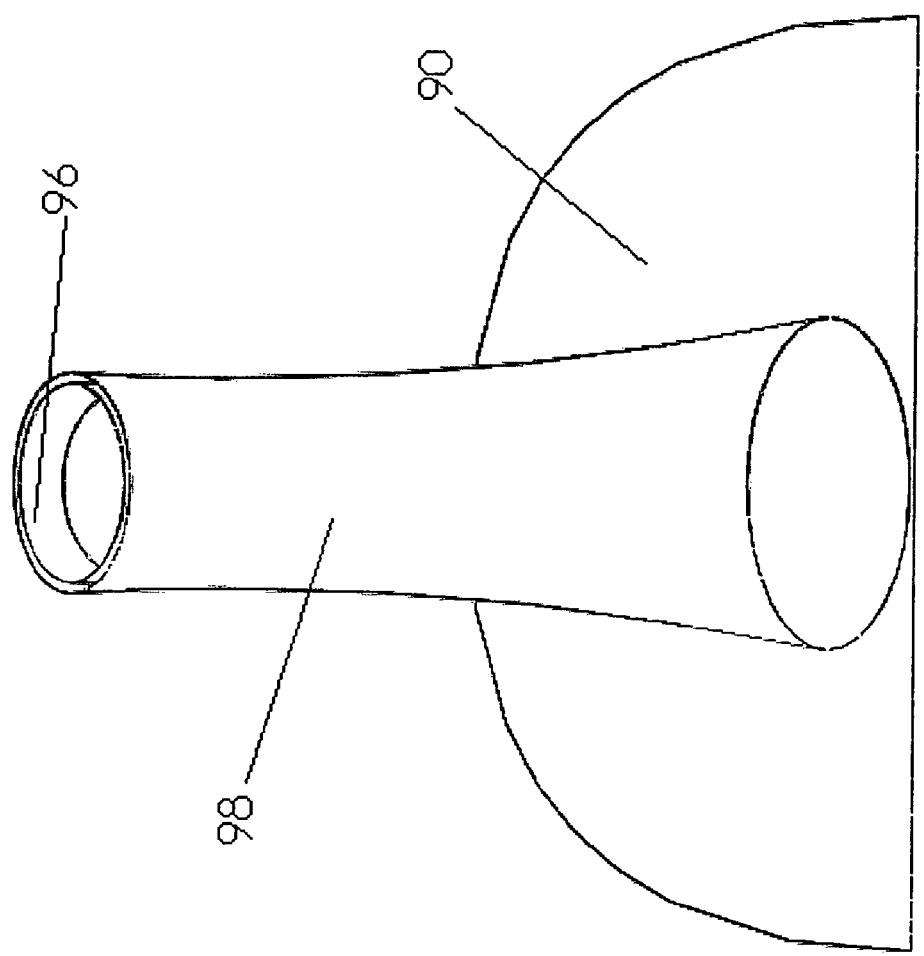
Figure 41:
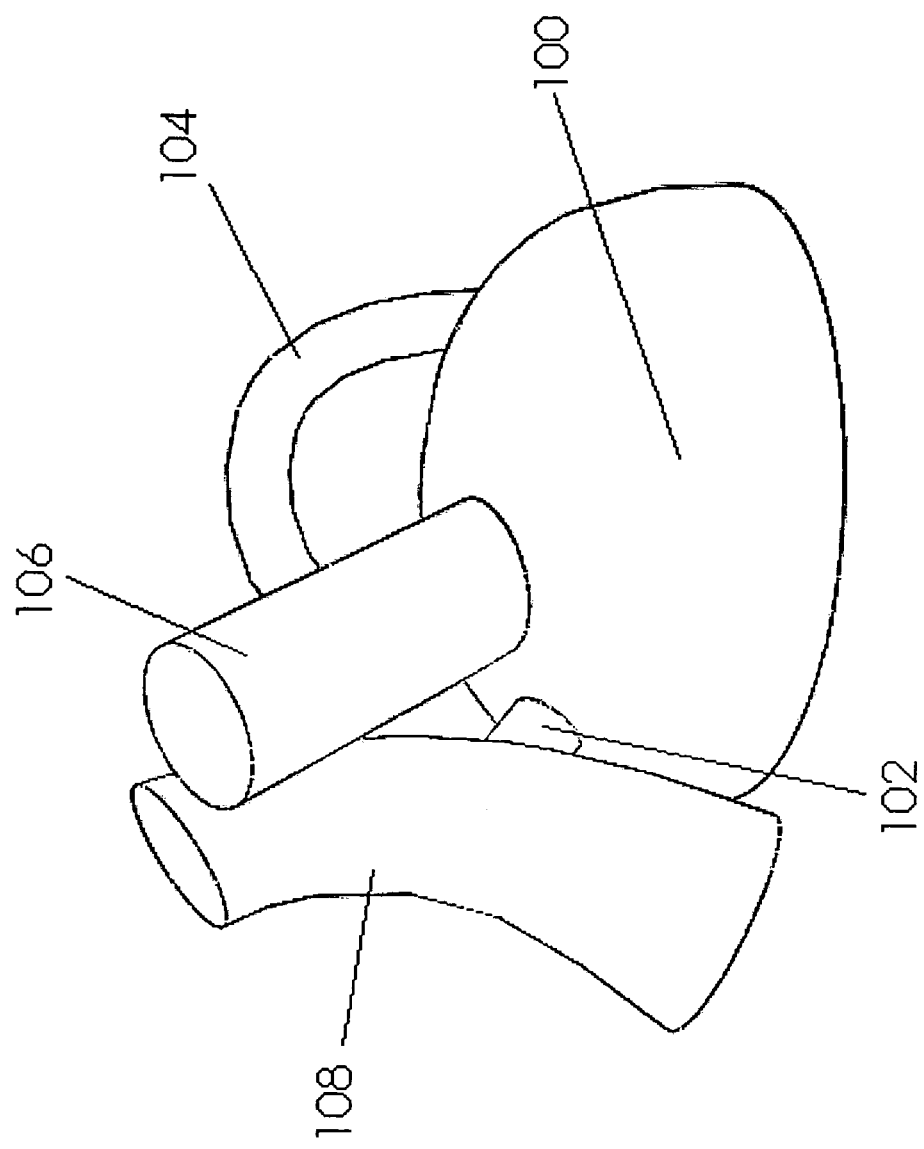
Figure 42:
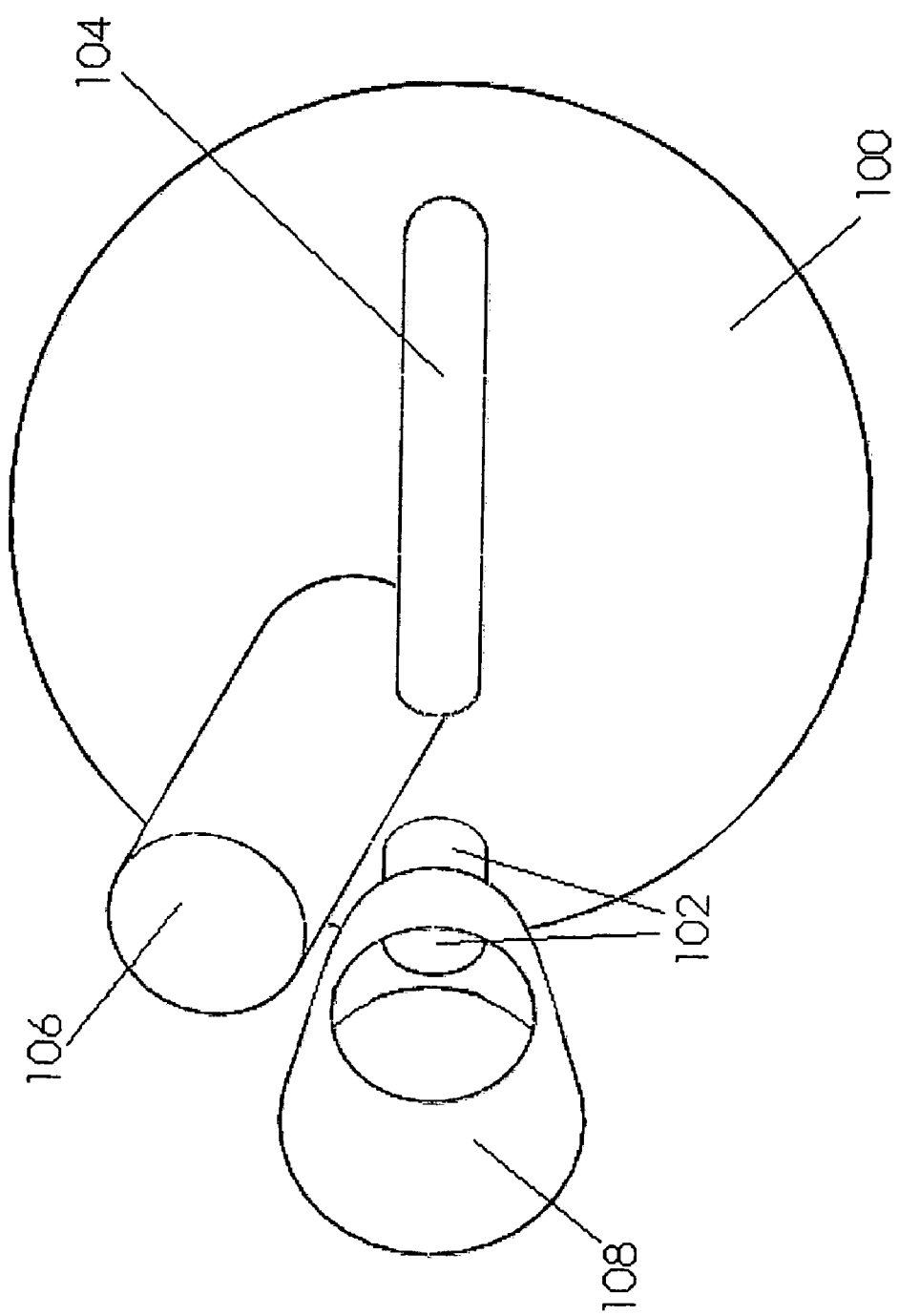
Figure 43:
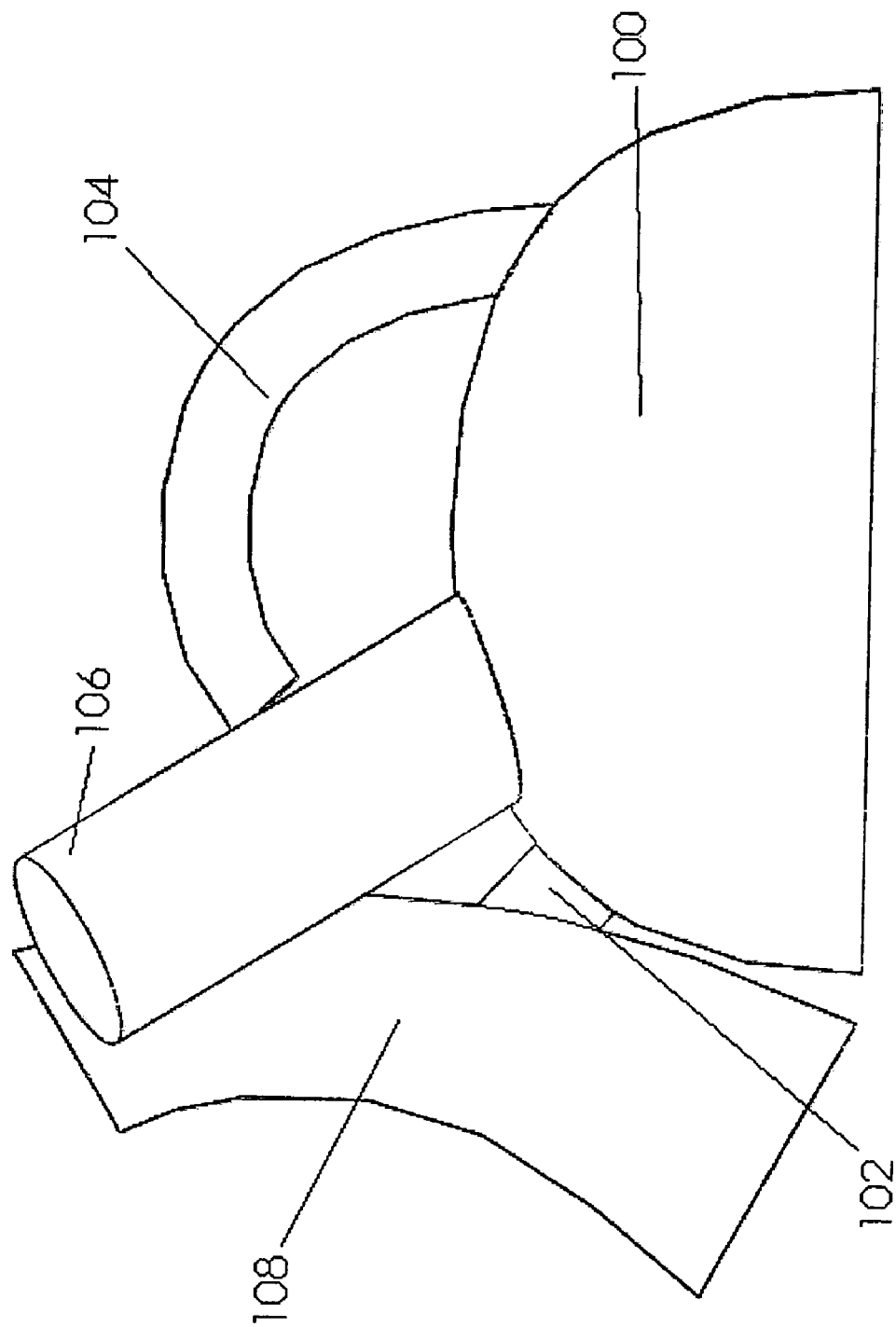
Figure 44:
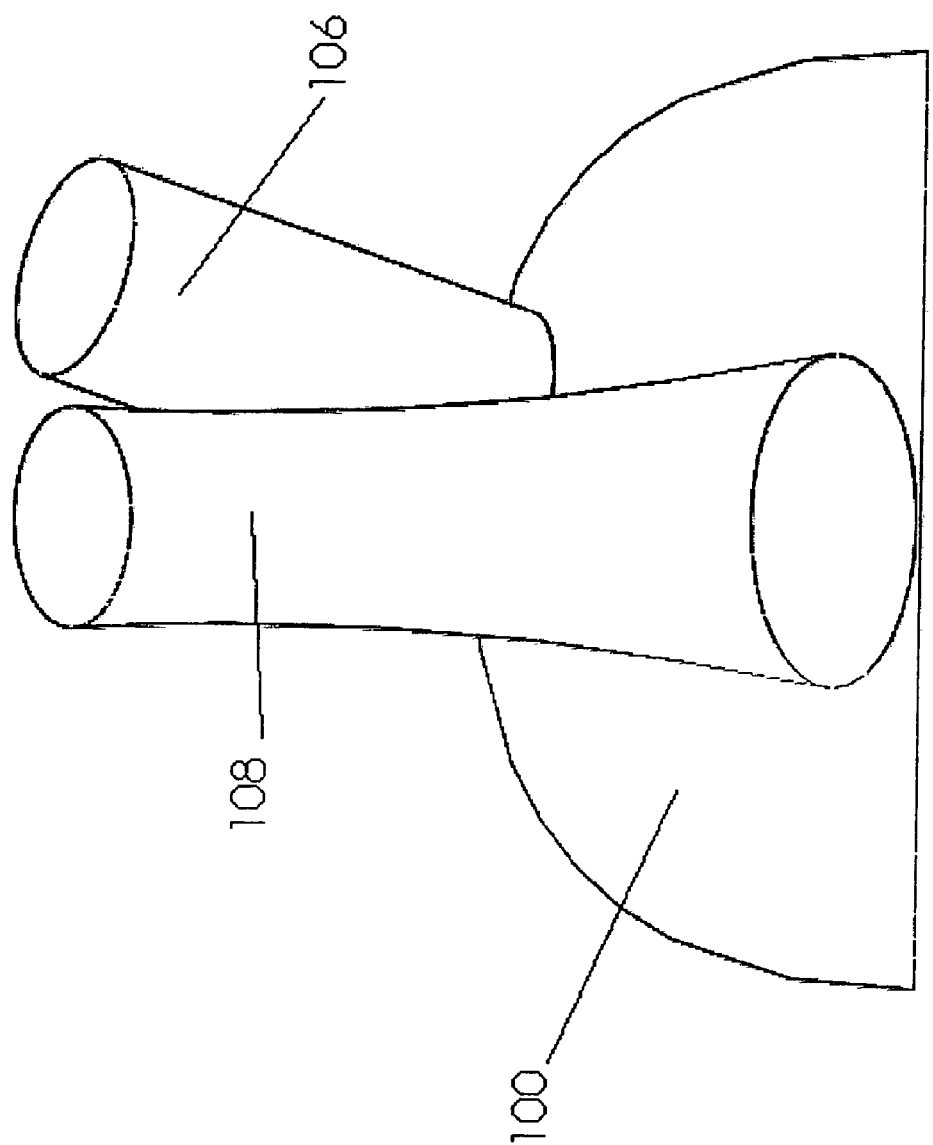
Figure 45:
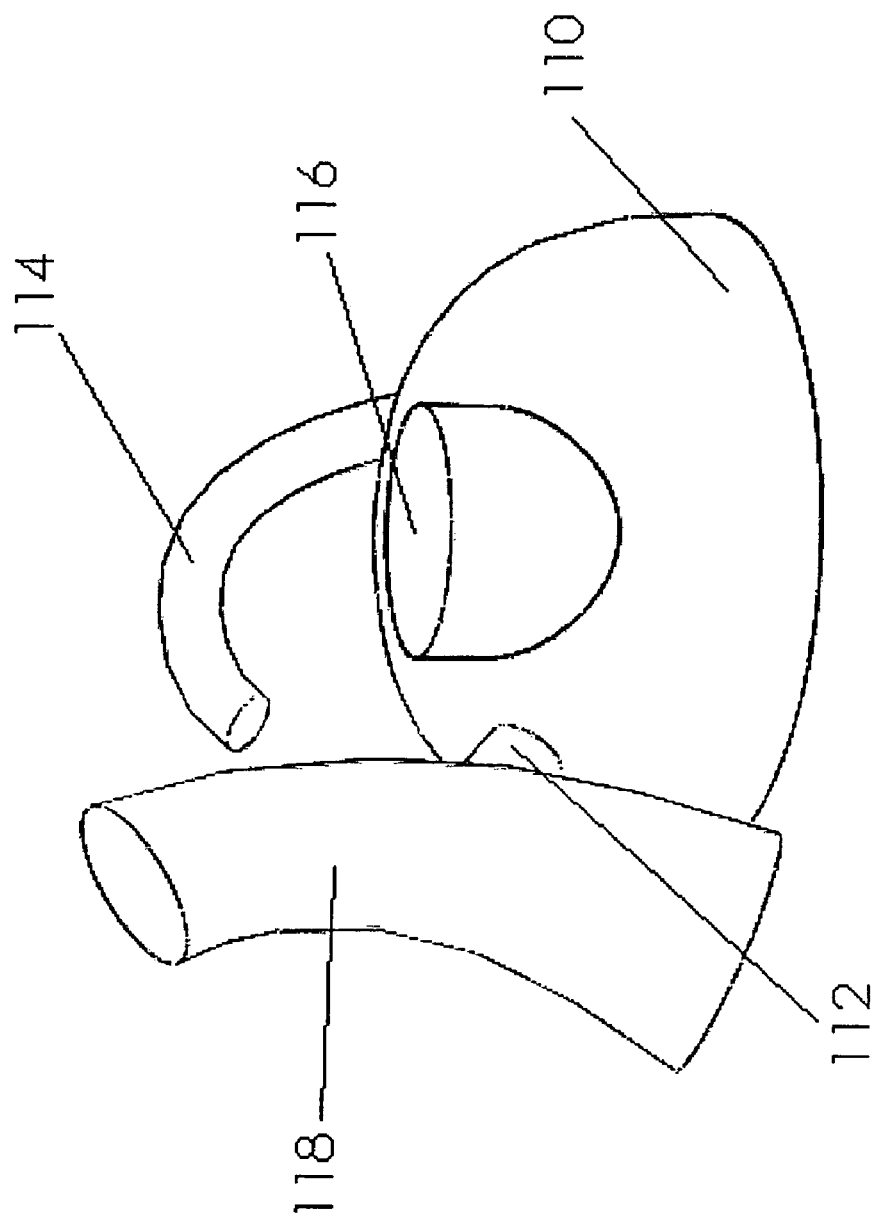
Figure 46:
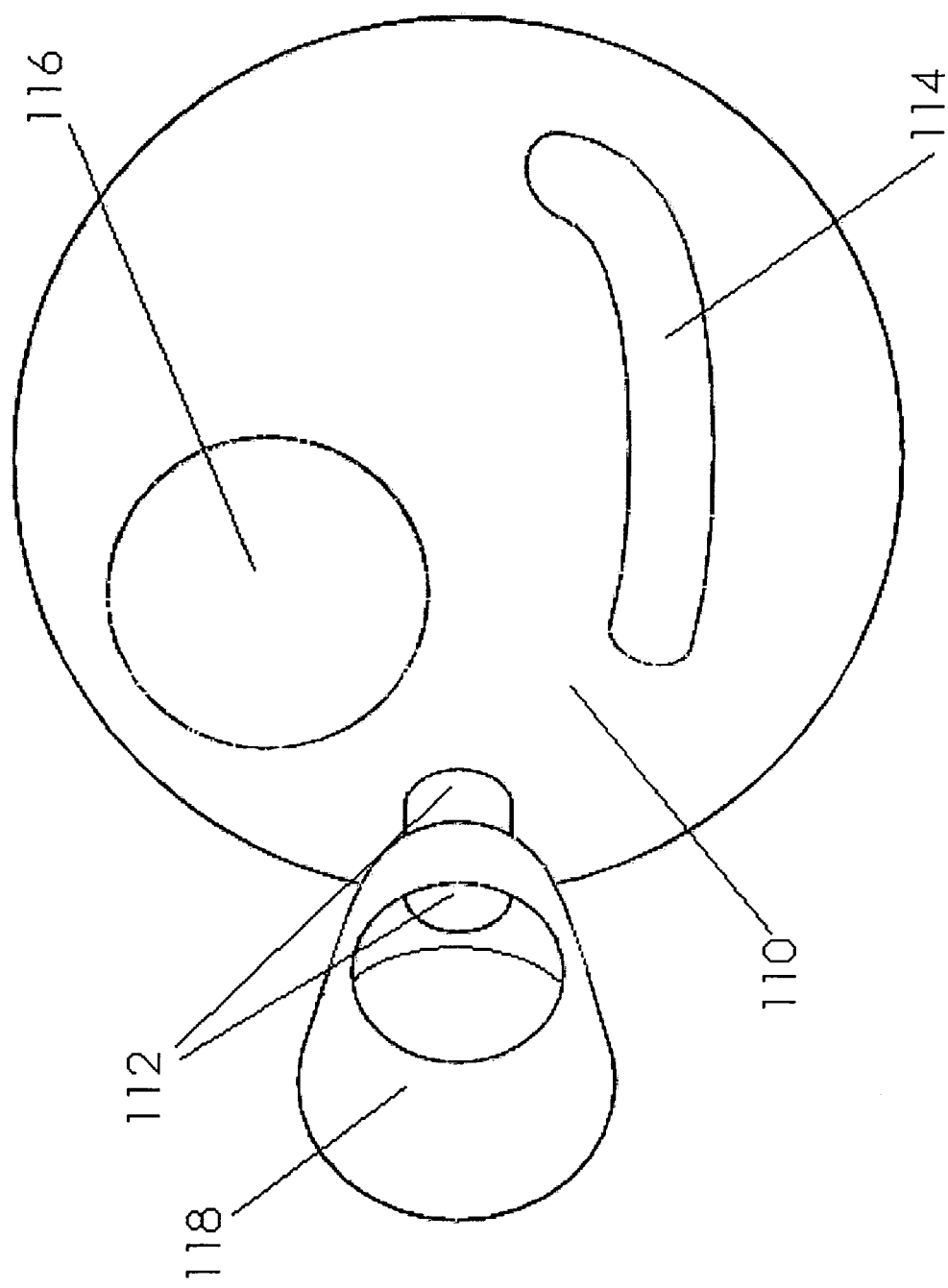
Figure 47:
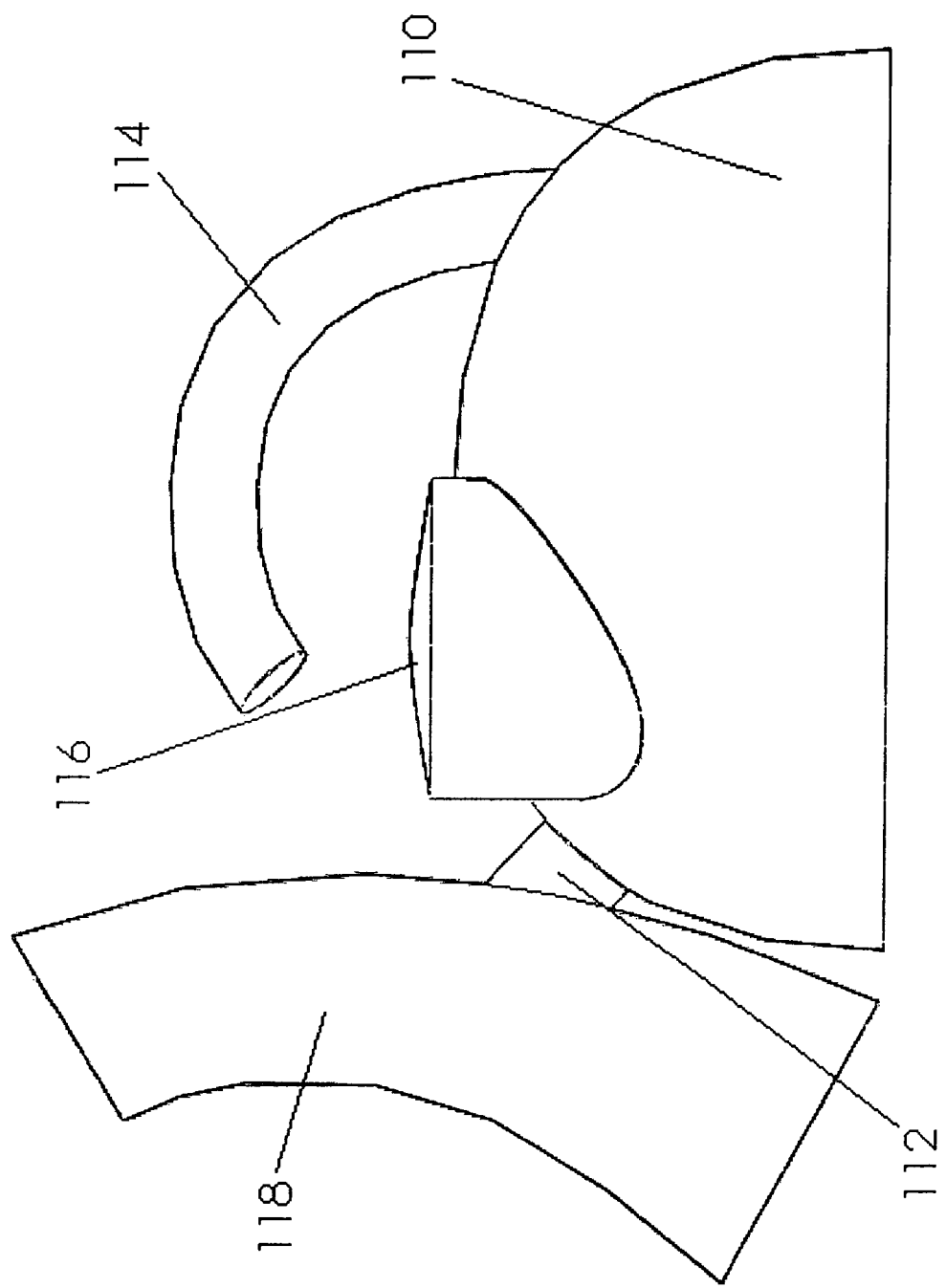
Figure 48:
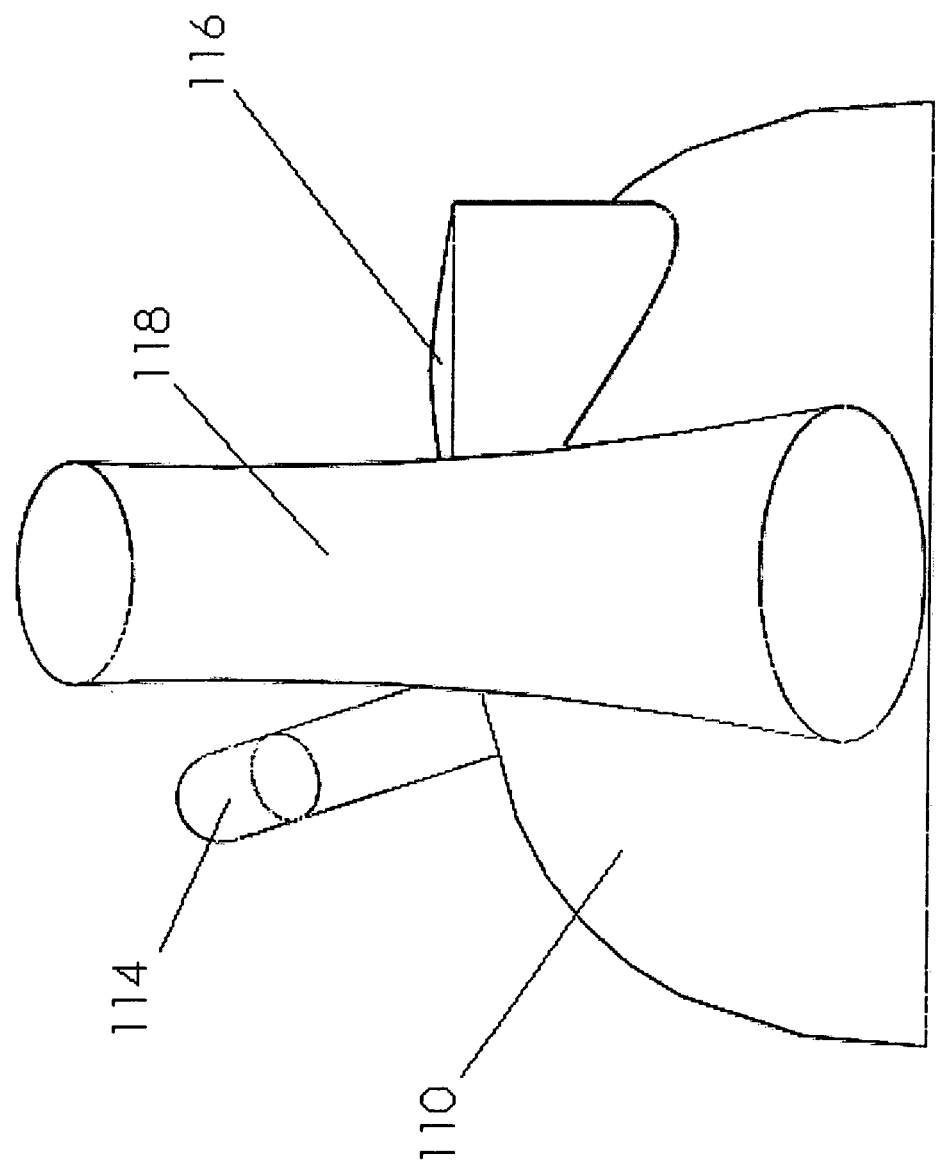
Figure 49:
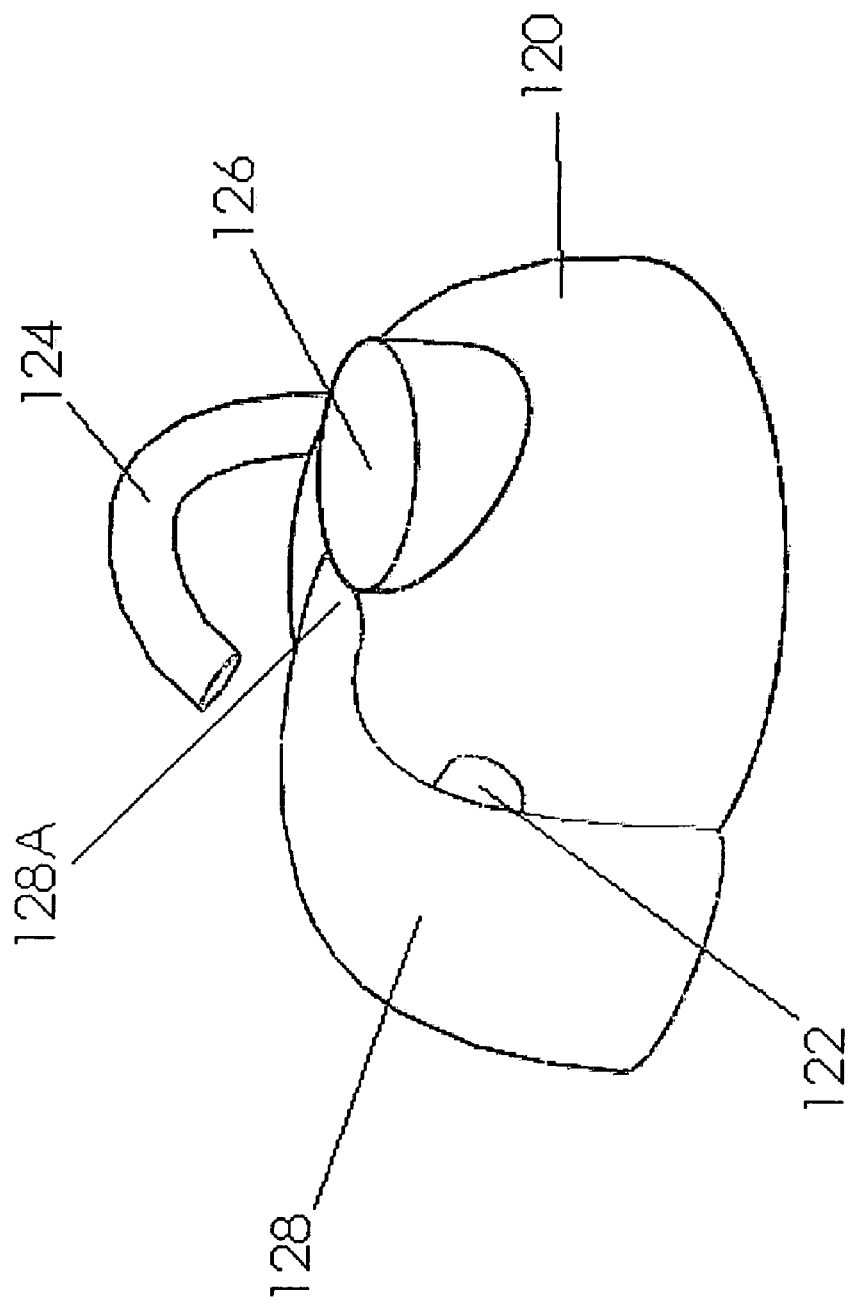
Figure 50:
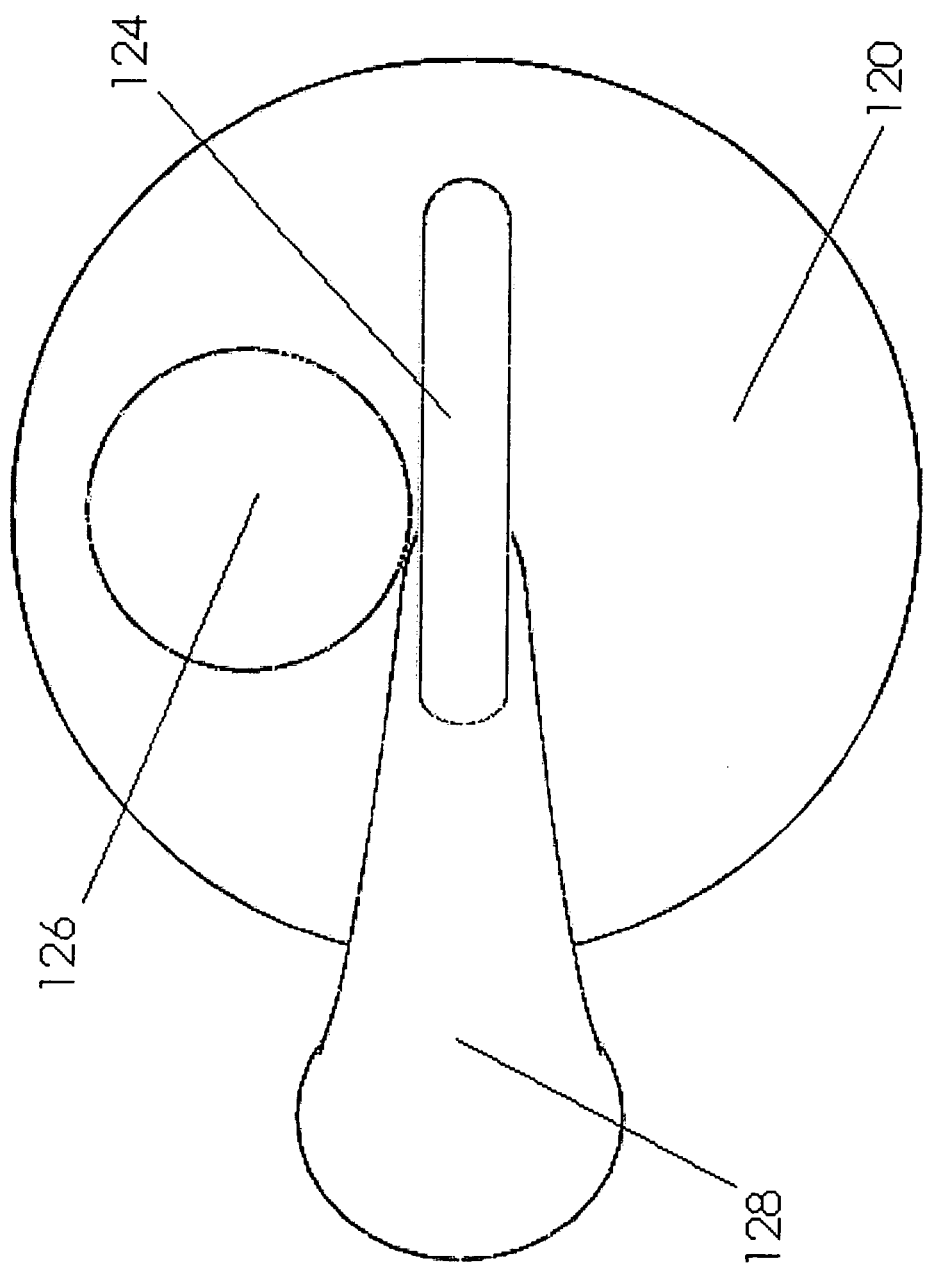
Figure 51:
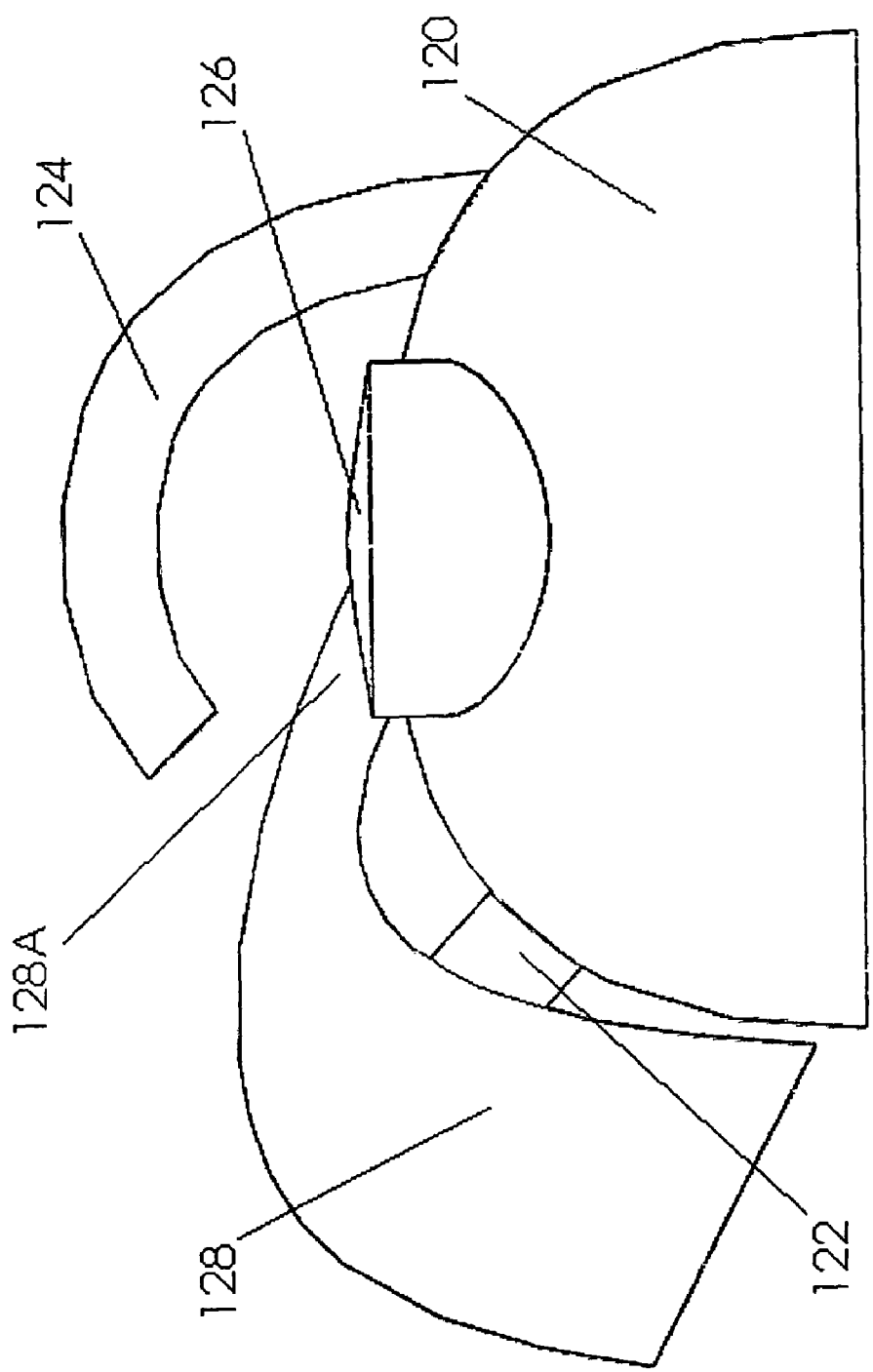
Figure 52:
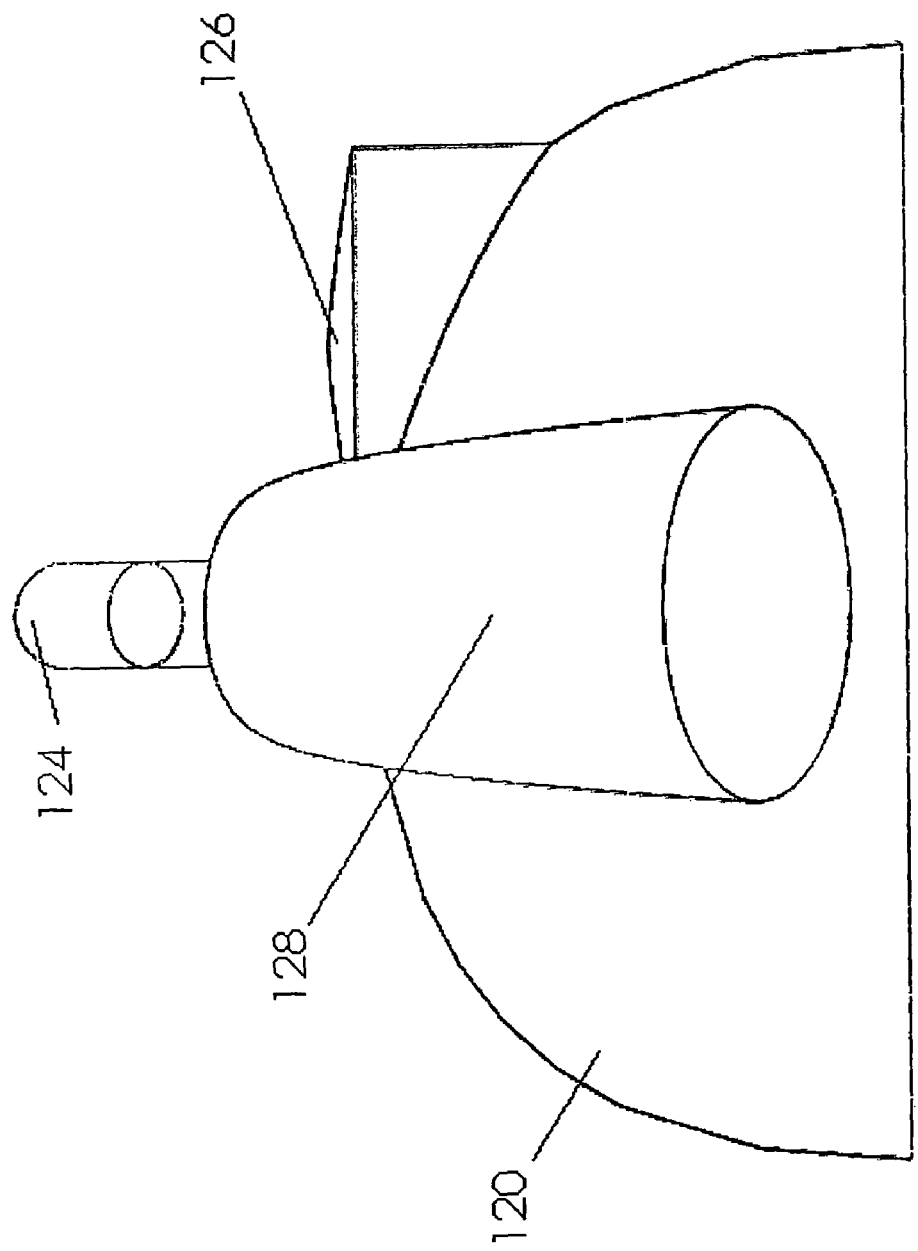
Figure 53:
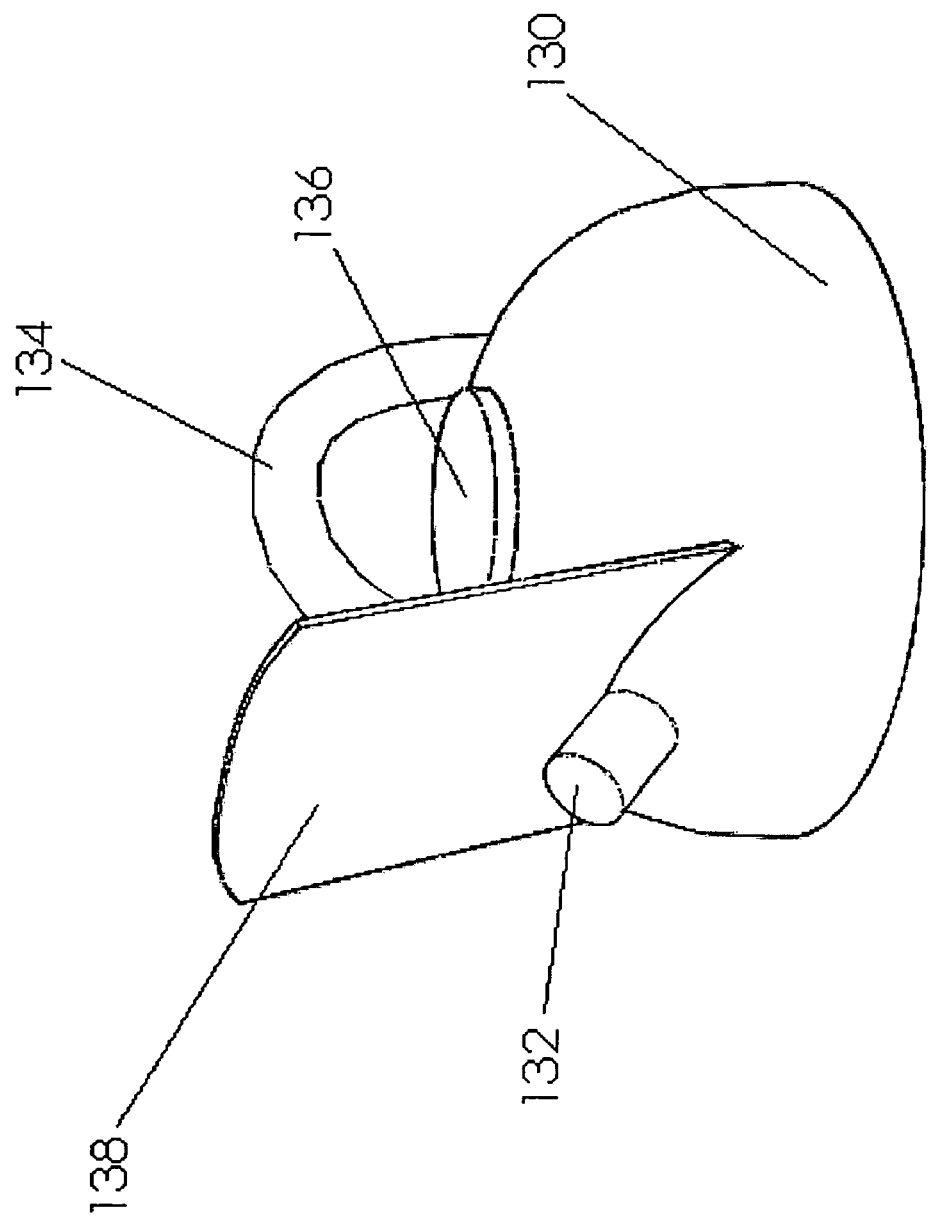
Figure 54:
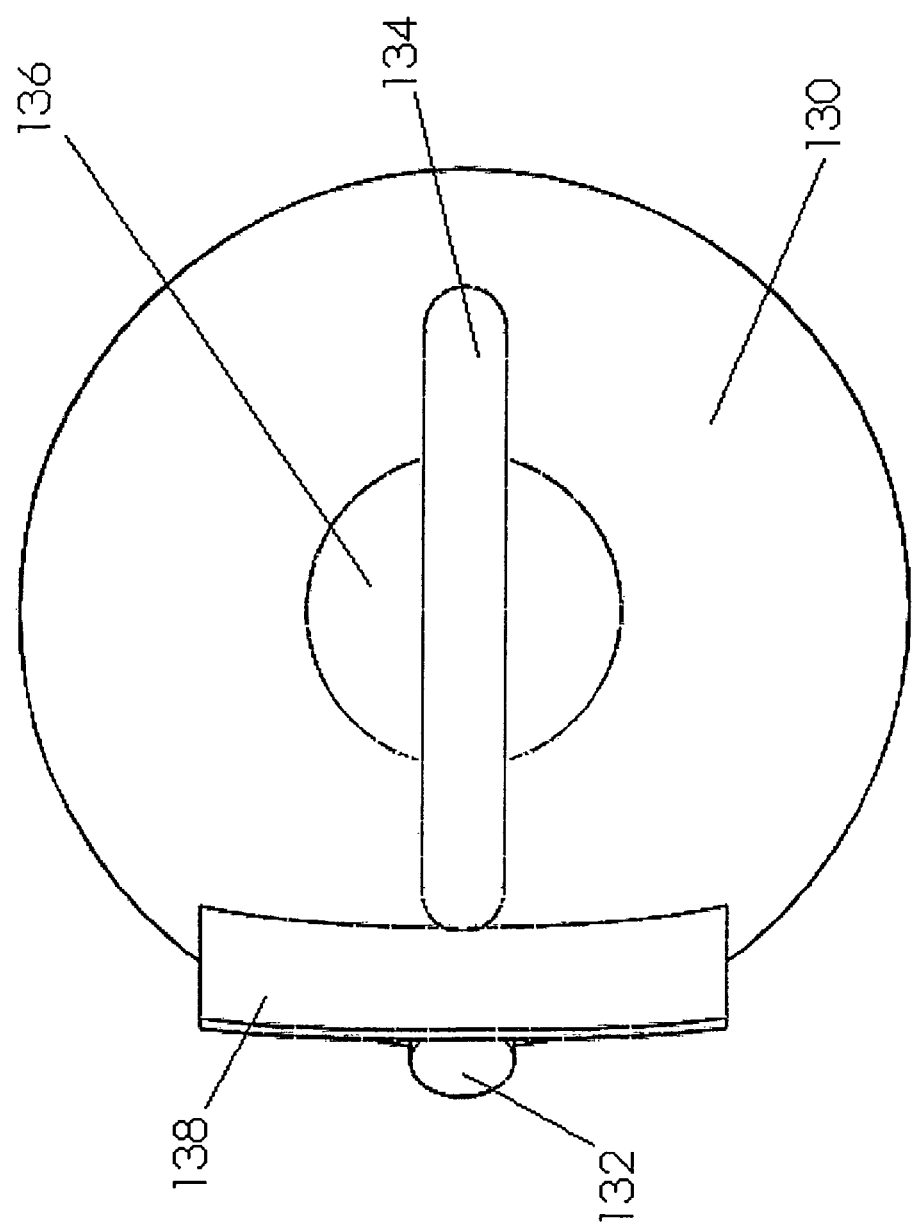
Figure 55:
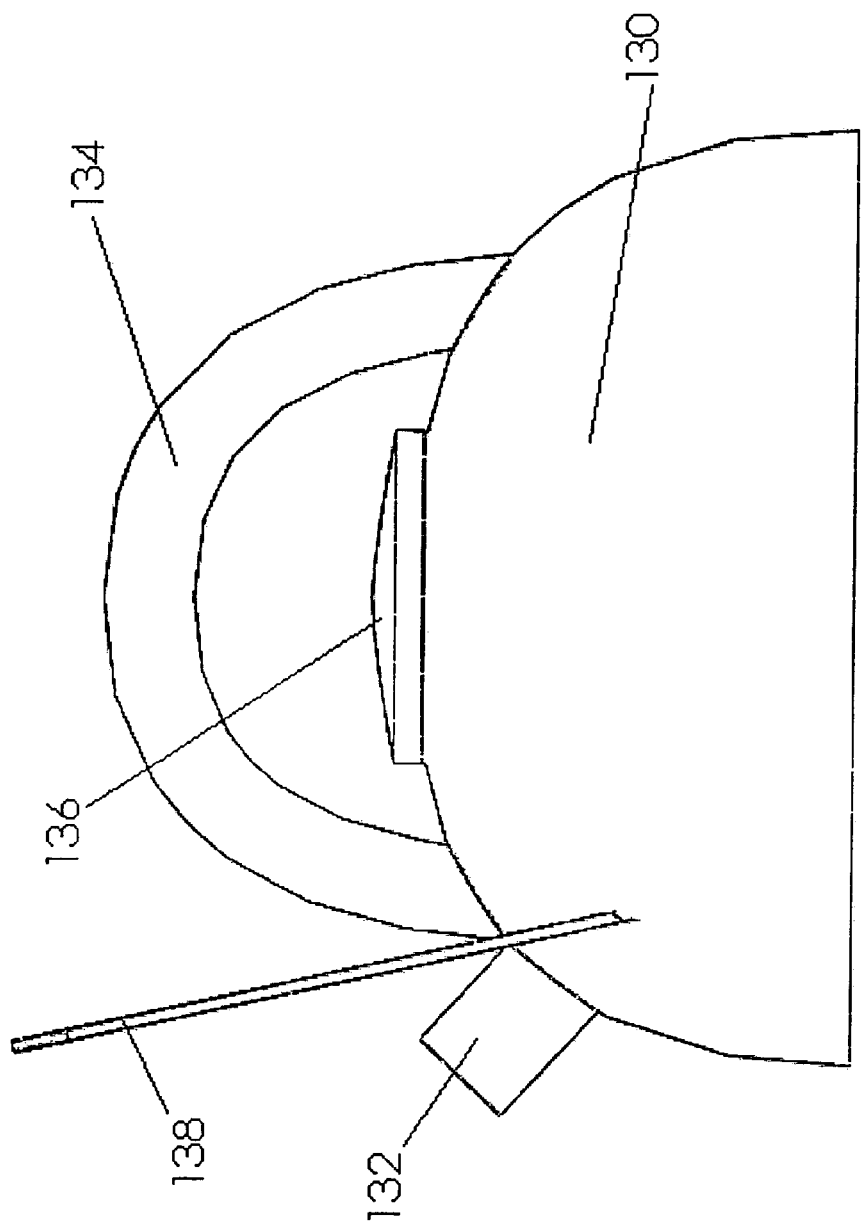
Figure 56:
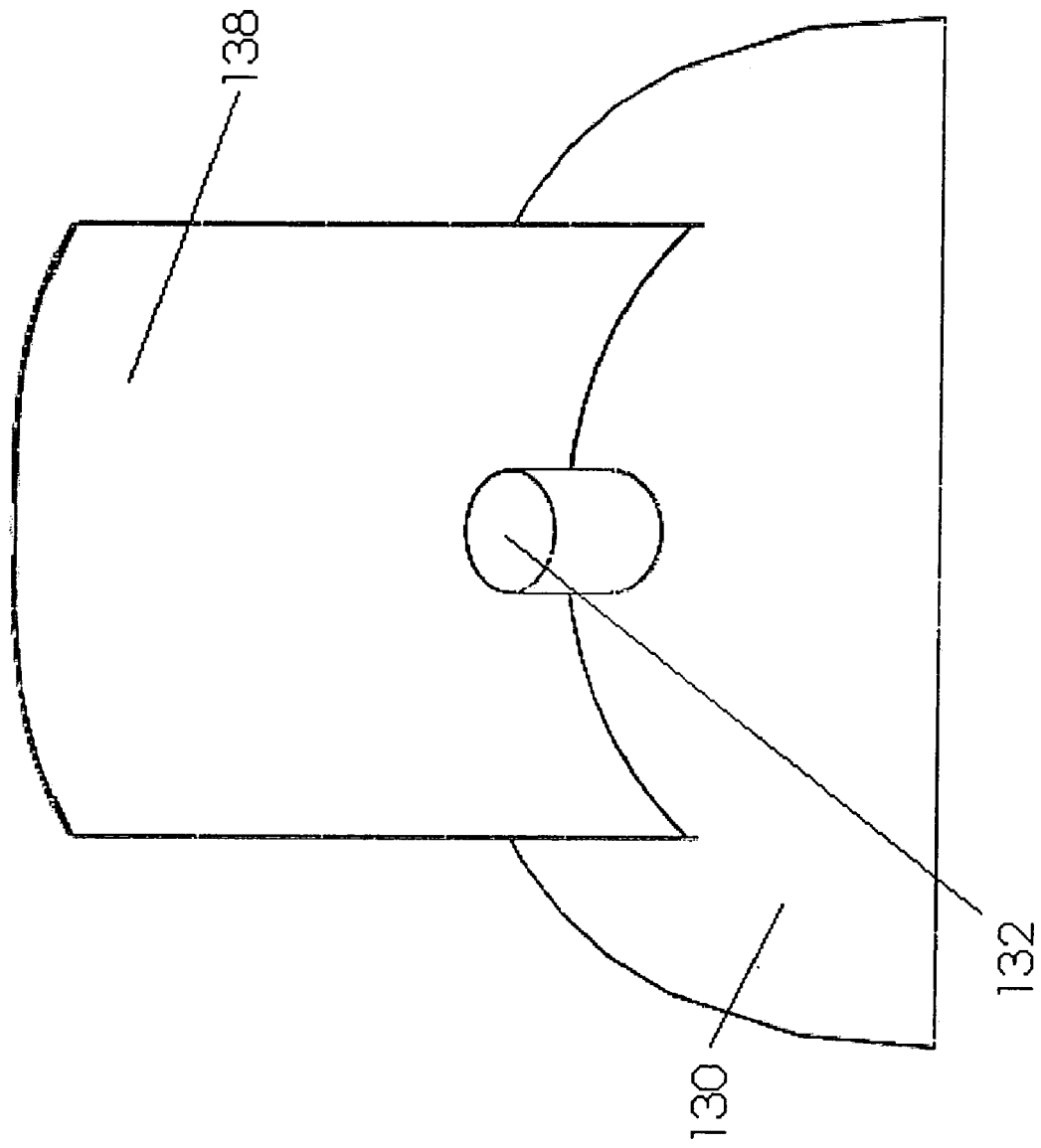
Figure 57:
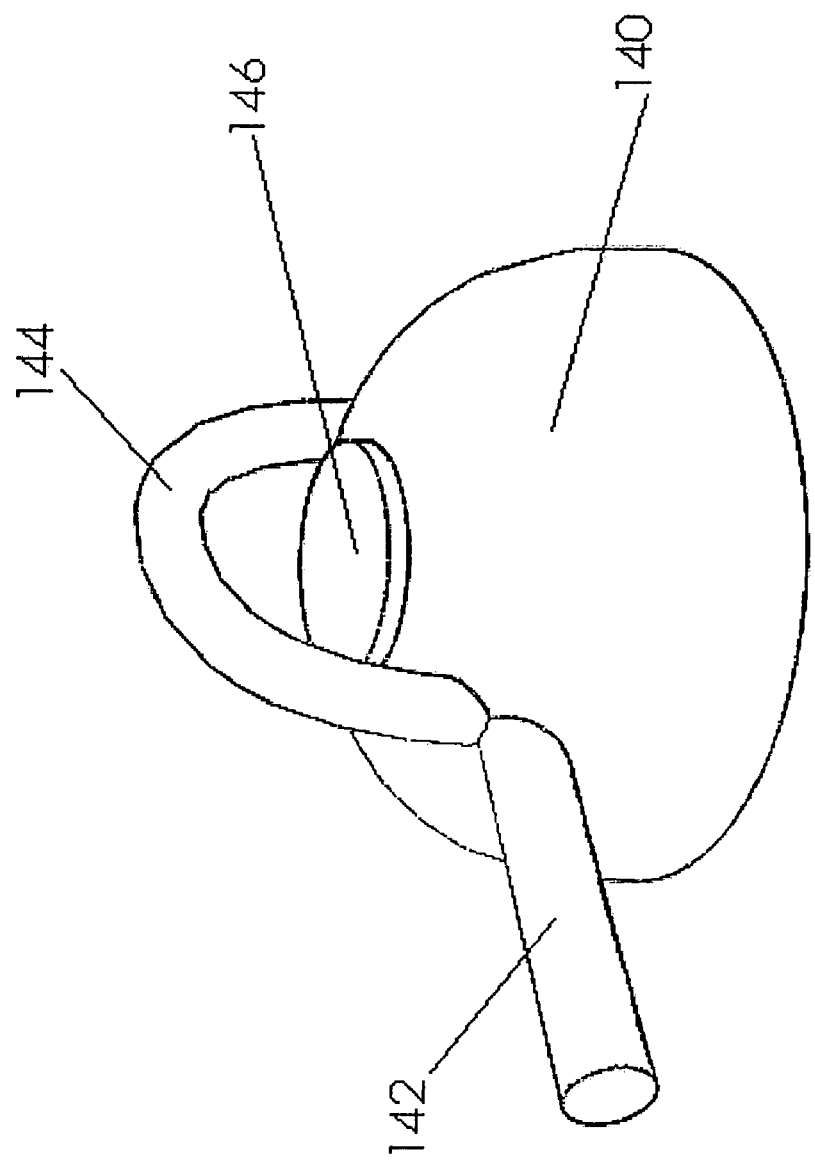
Figure 58:
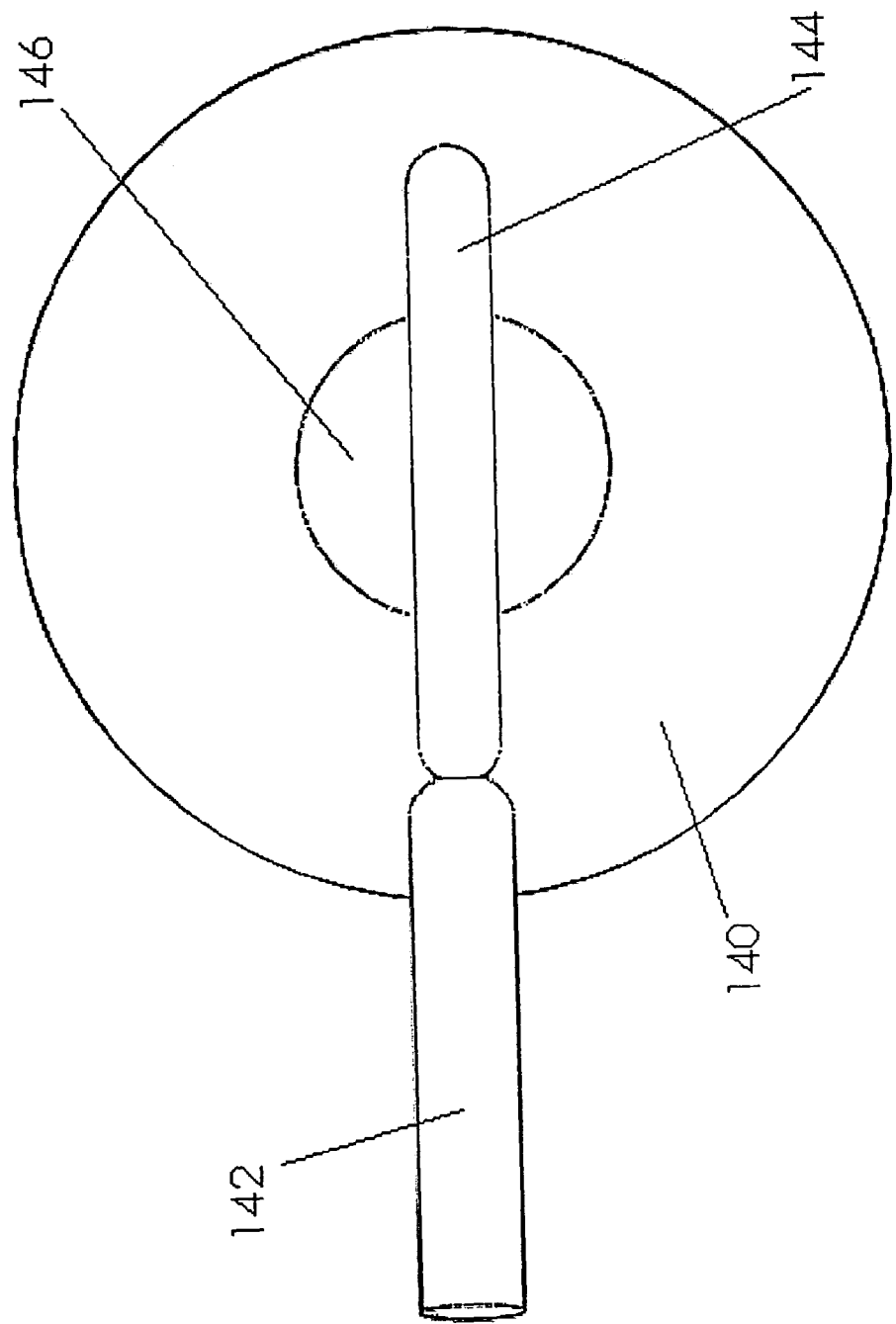
Figure 59:
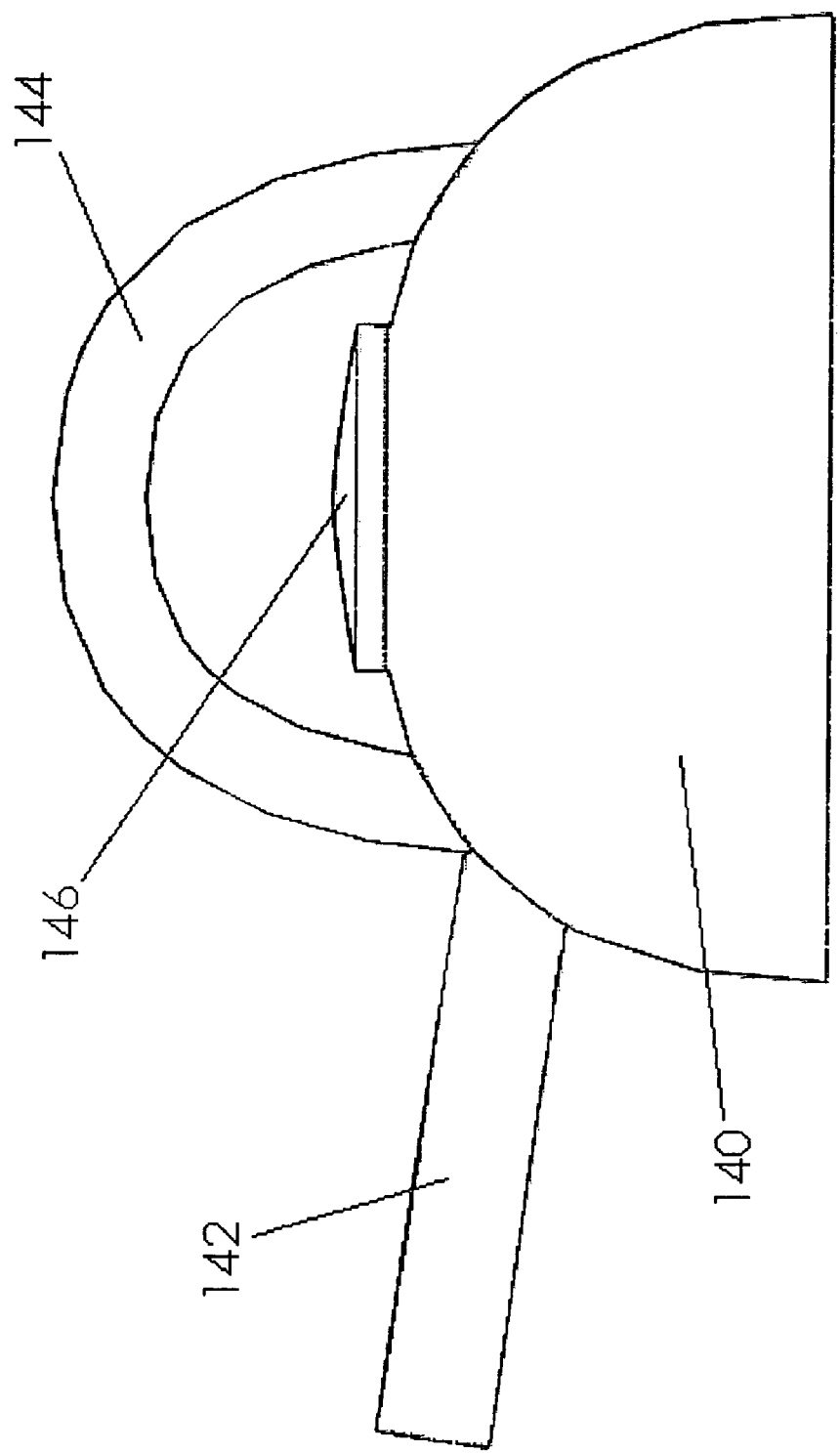
Figure 60:
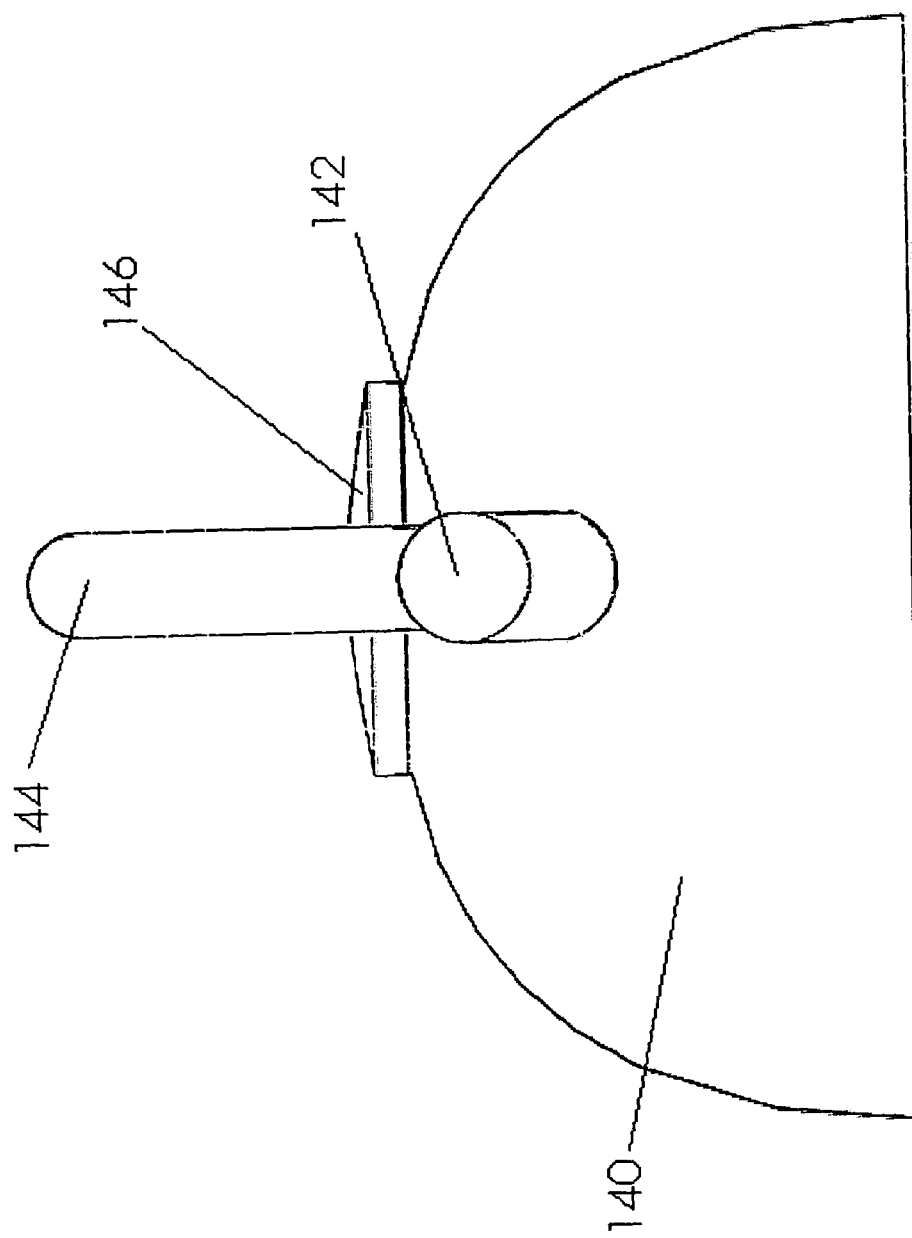
Figure 61:
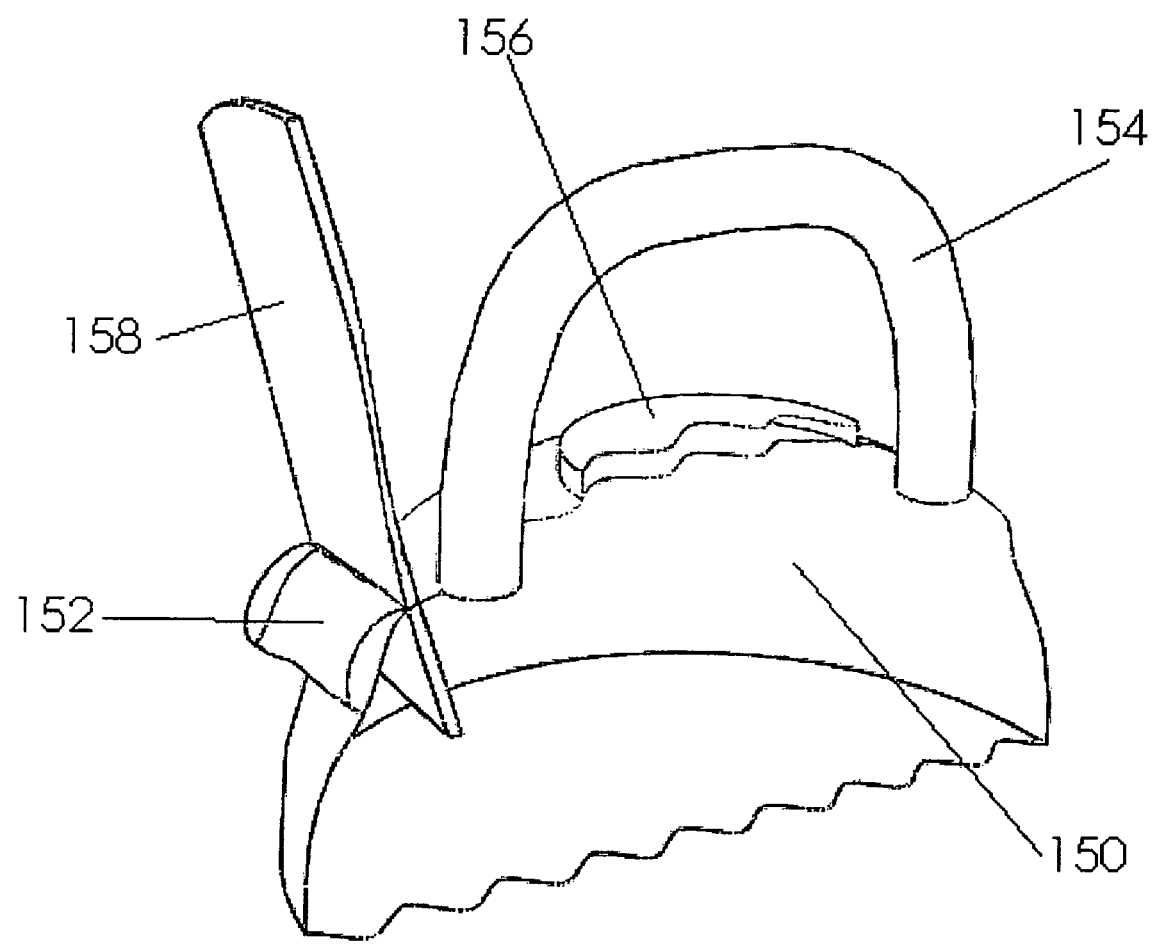
Figure 62:
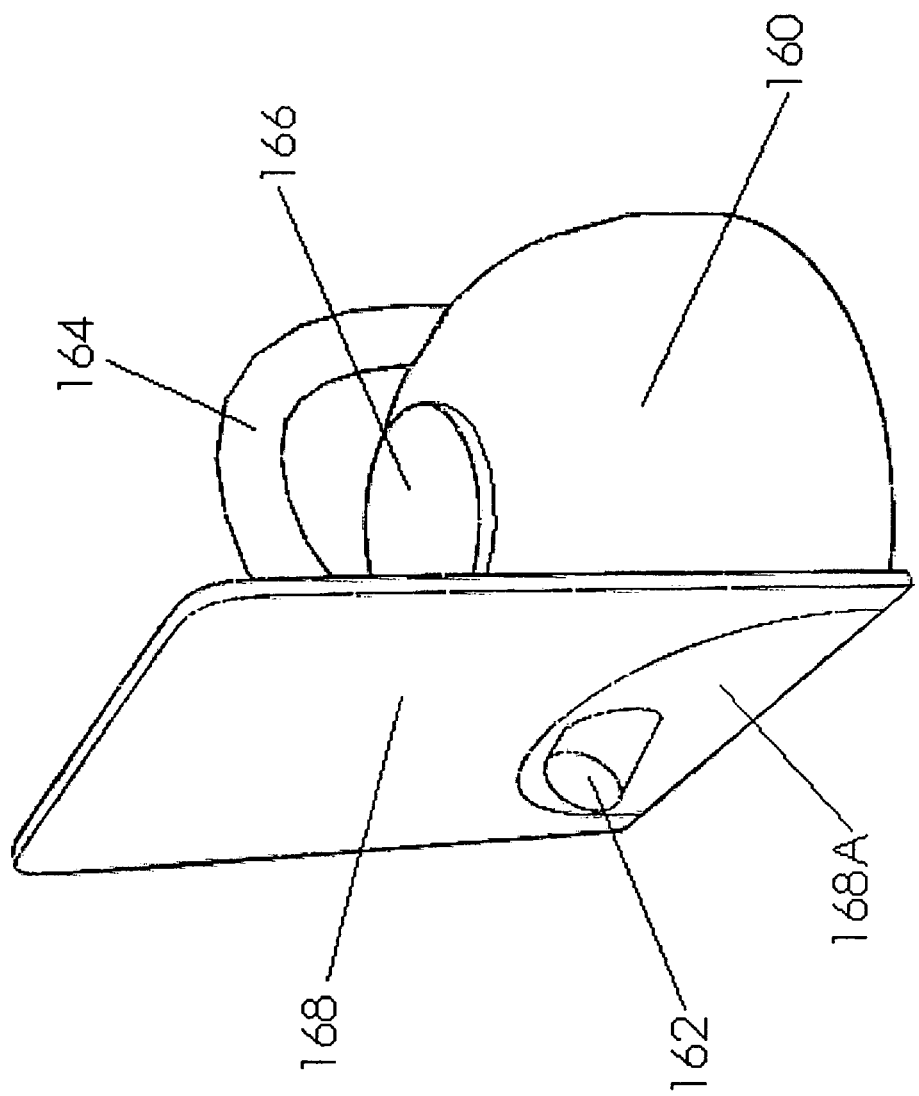
Figure 63:
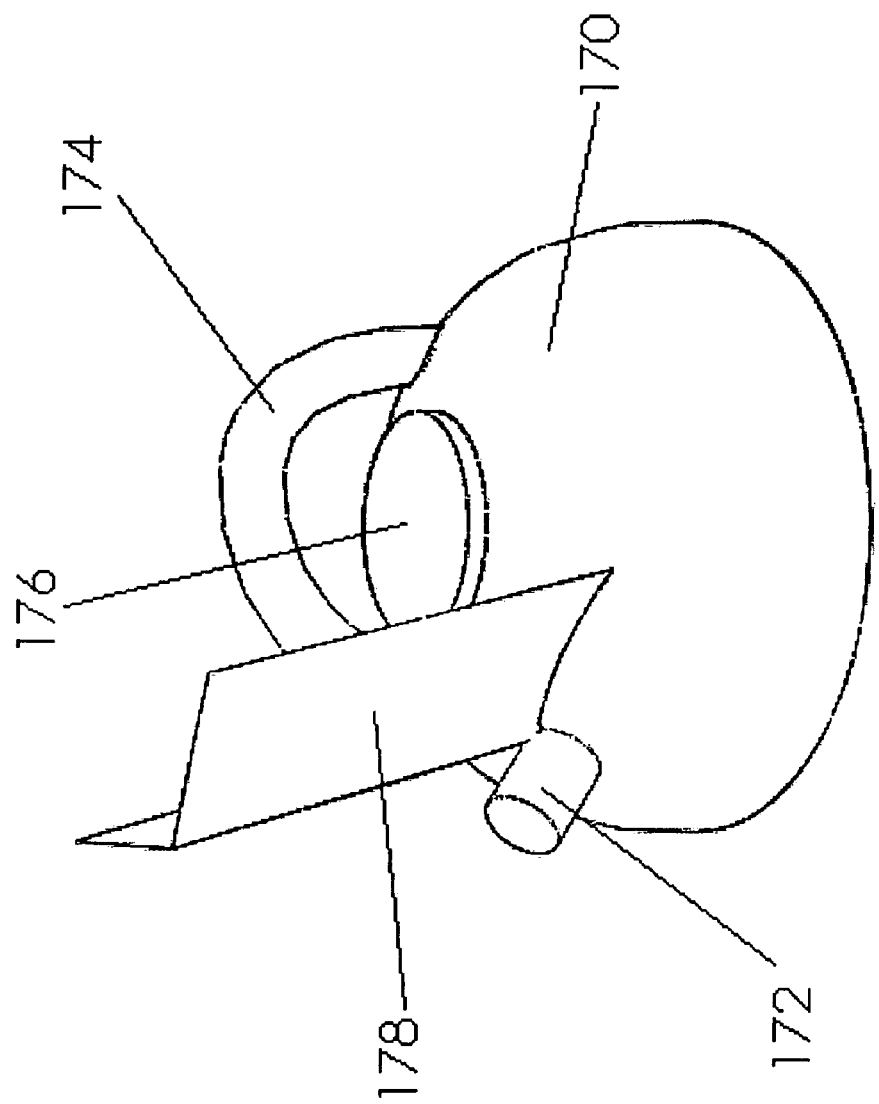
Figure 64:
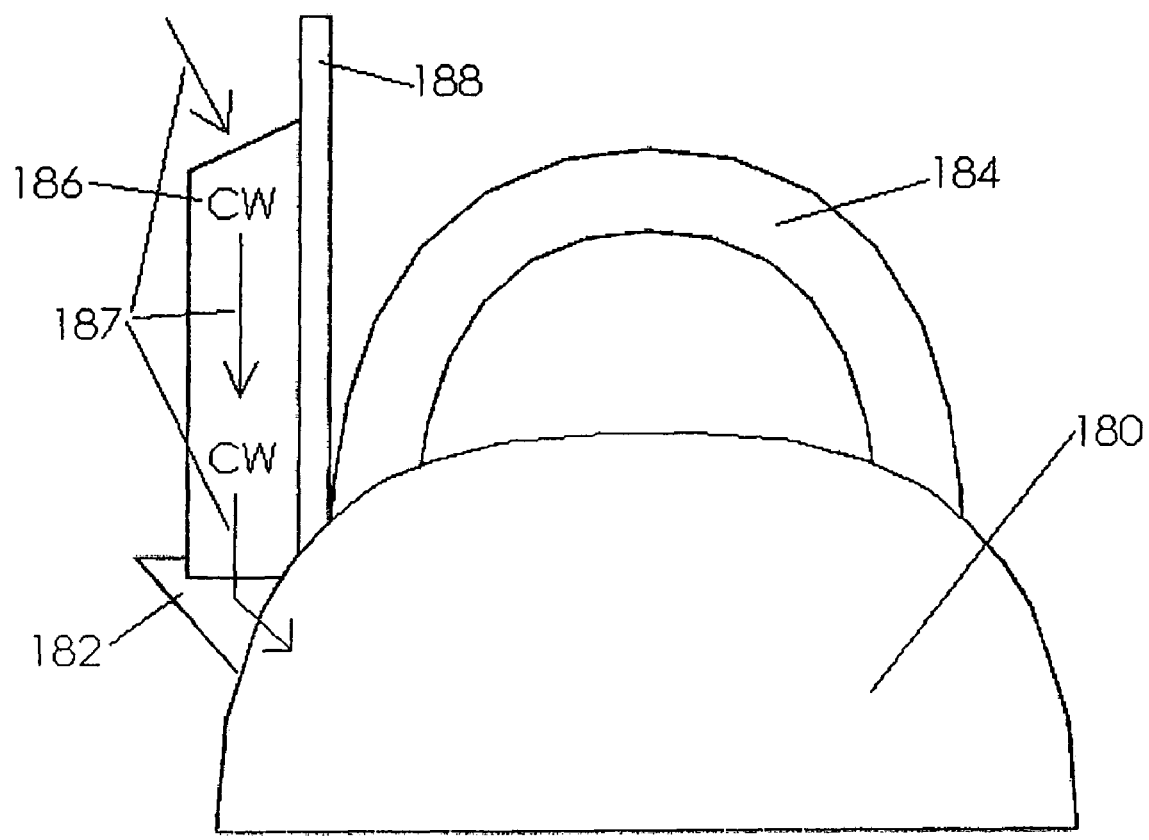
Figure 65:
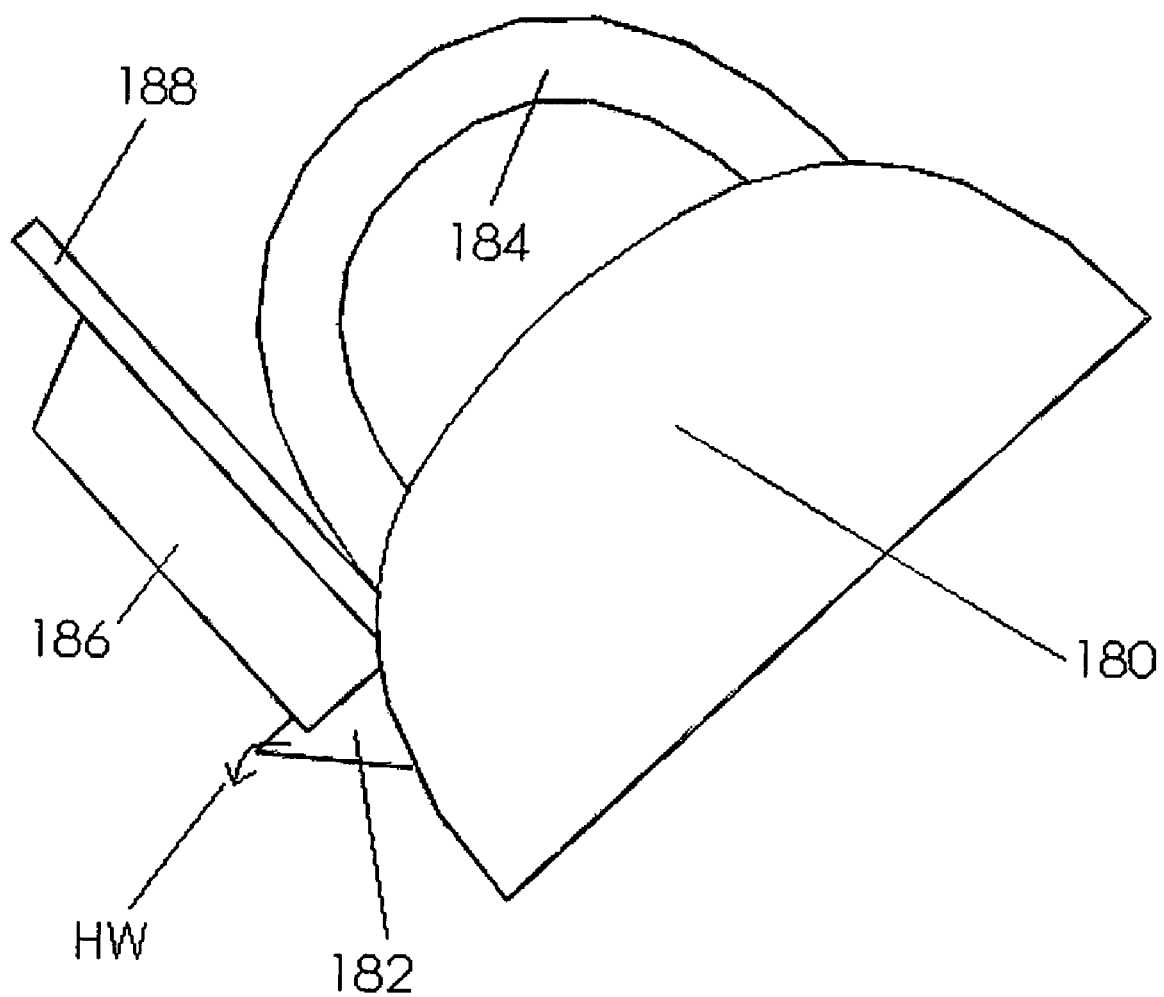
Figure 66:
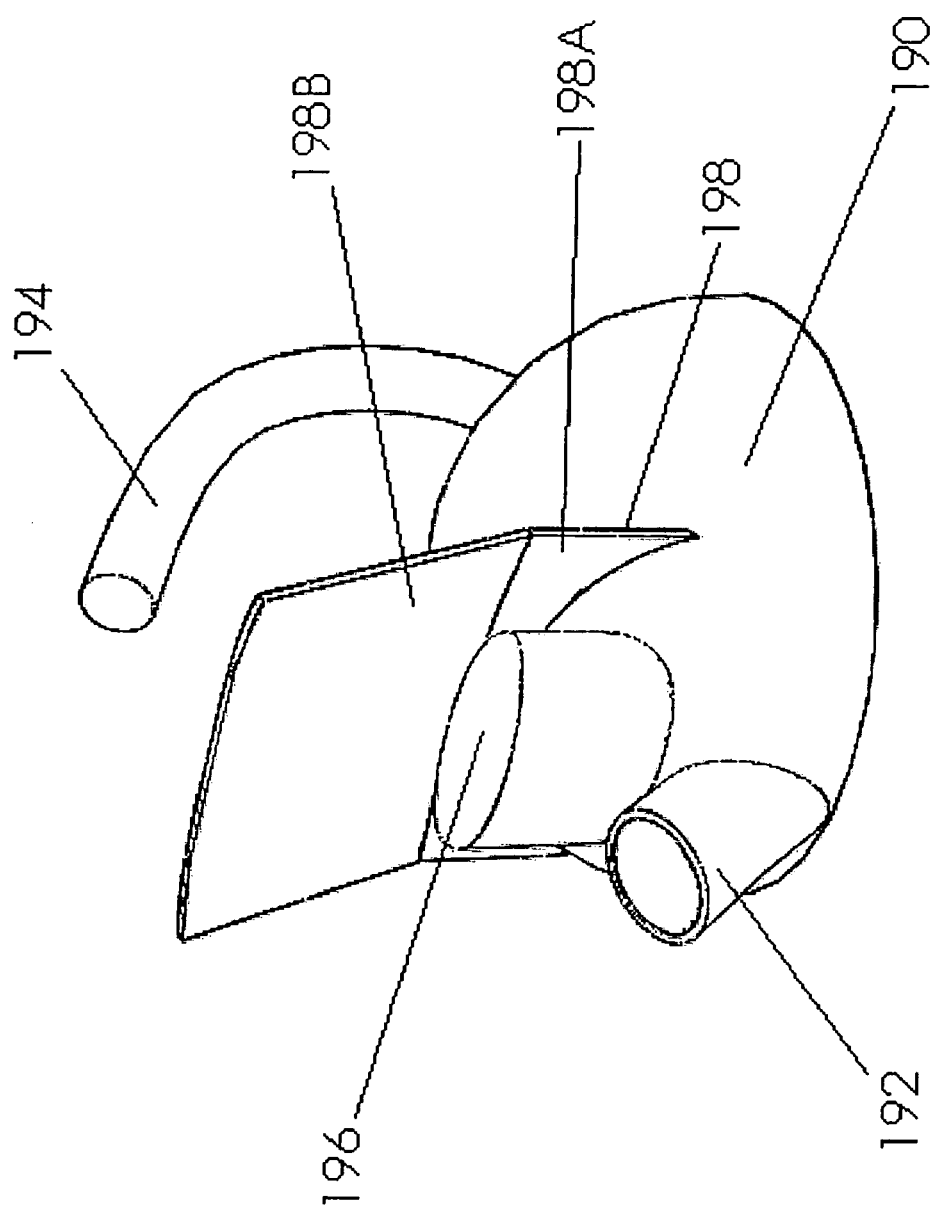
Figure 67:
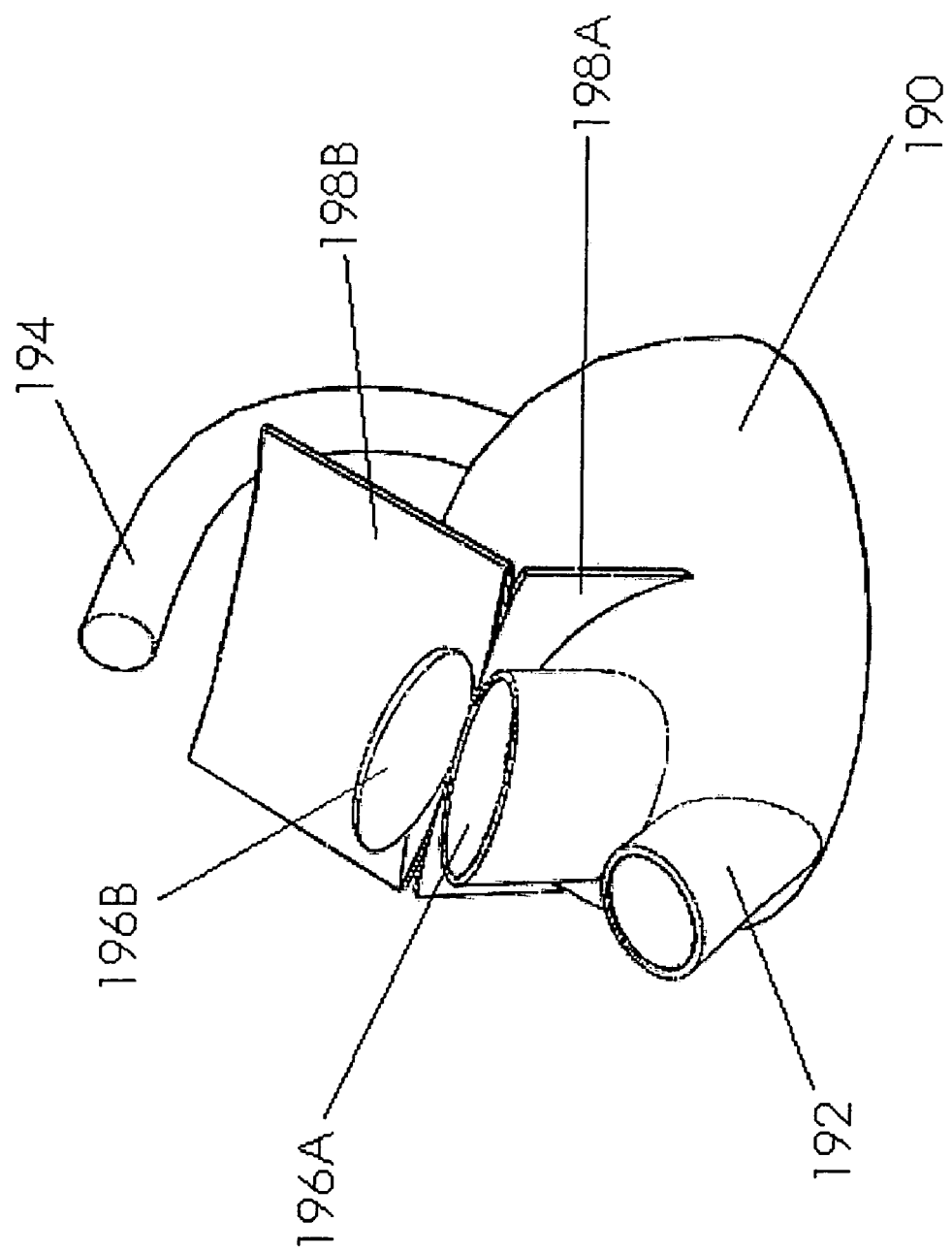
Figure 68:
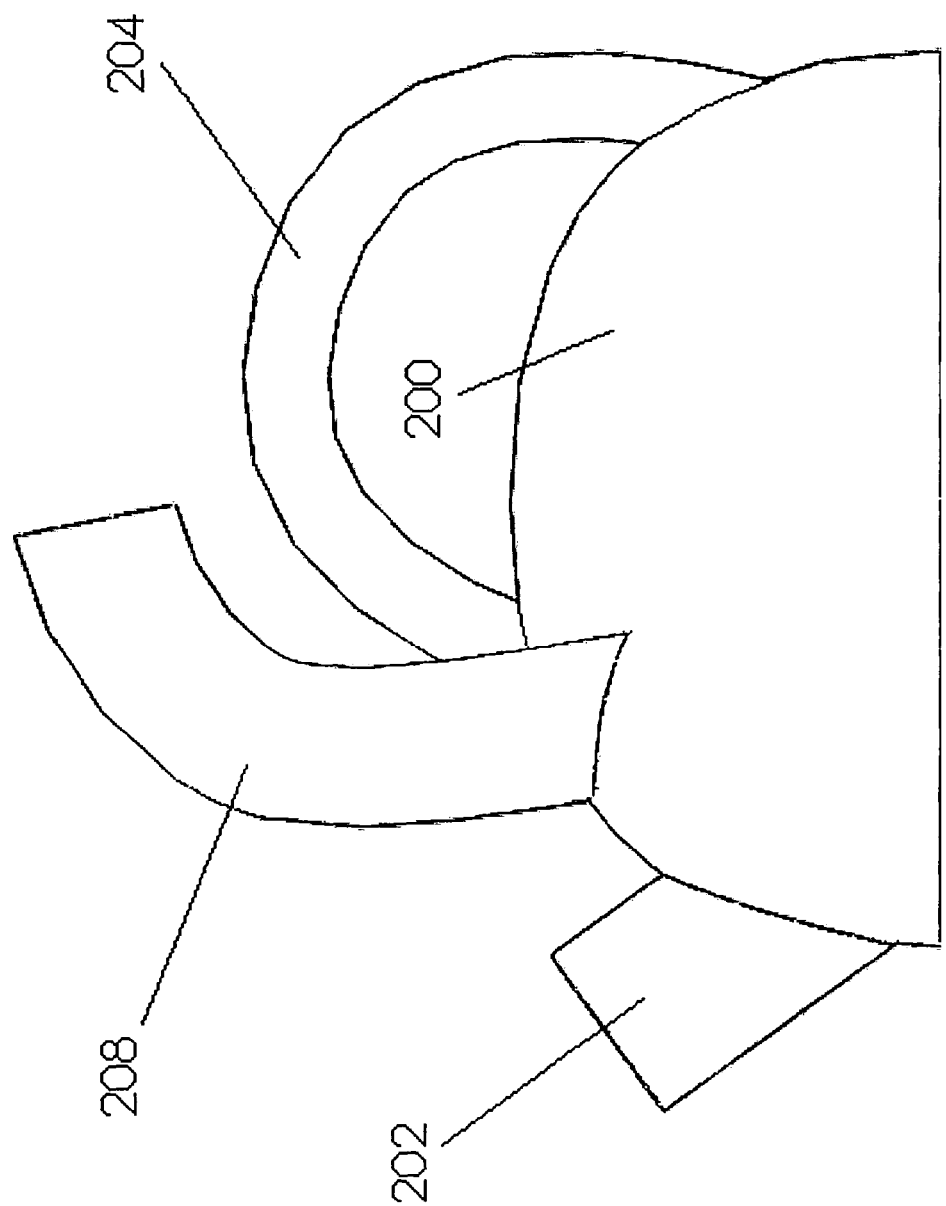
Figure 69:
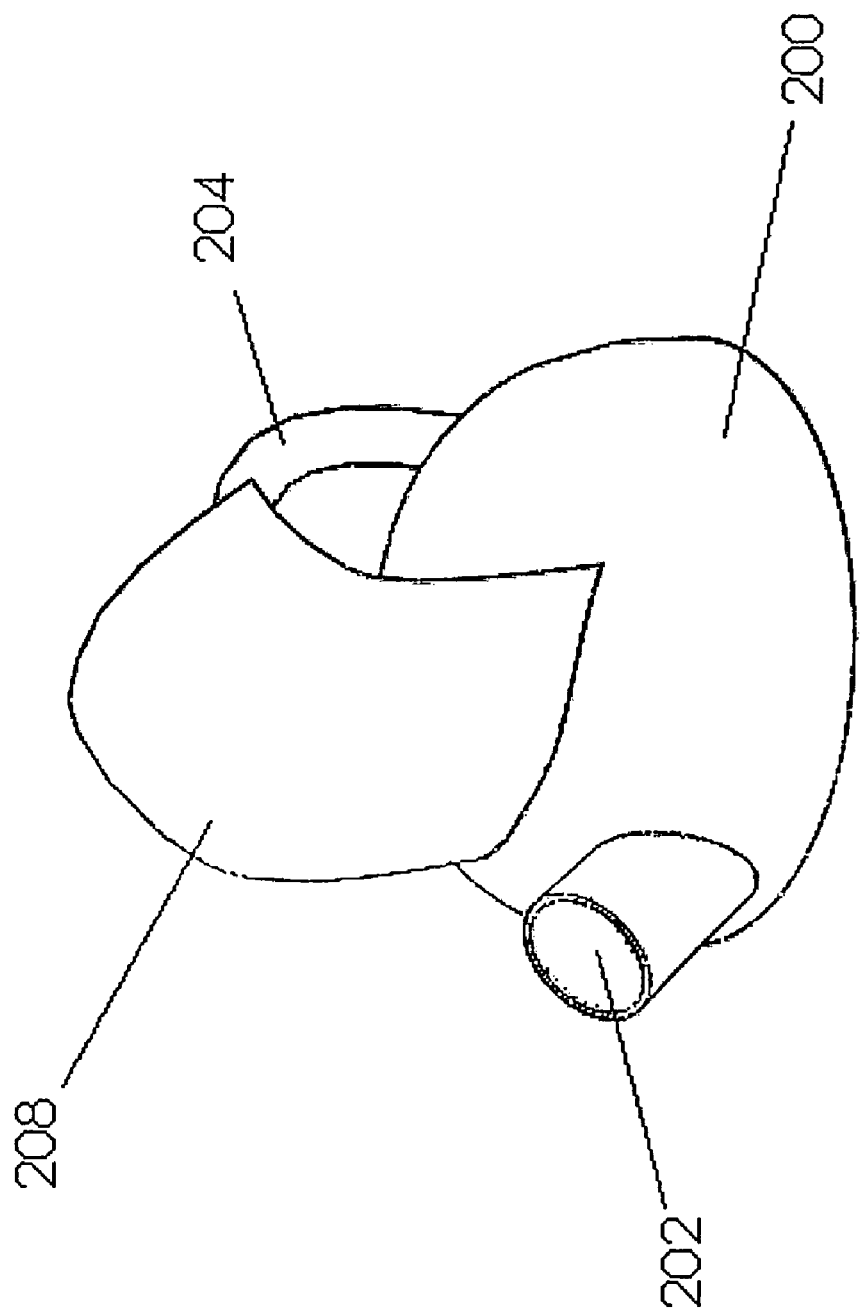

FIG. 1 is an isometric view of a kettle of the prior art.
FIG. 2 is a top view of the prior art kettle of FIG. 1.
FIG. 3 is a side view of the prior art kettle of FIG. 1.
FIG. 4 is an elevation view of the prior art kettle of FIG. 1.
FIG. 5 is an isometric view of a first embodiment of the inventive kettle.
FIG. 6 is a top view of the kettle shown in FIG. 5.
FIG. 7 is a side view of the kettle shown in FIG. 5.
FIG. 8 is an elevation view of the kettle shown in FIG. 5.
FIG. 9 is an isometric view of a second embodiment of the inventive kettle.
FIG. 10 is a top view of the kettle shown in FIG. 9.
FIG. 11 is a side view of the kettle shown in FIG. 9.
FIG. 12 is an elevation view of the kettle shown in FIG. 9.
FIG. 13 is an isometric view of a third embodiment of the inventive kettle.
FIG. 14 is a top view of the kettle shown in FIG. 13.
FIG. 15 is a side view of the kettle shown in FIG. 13.
FIG. 16 is an elevation view of the kettle shown in FIG. 13.
FIG. 17 is an isometric view of a fourth embodiment of the inventive kettle.
FIG. 18 is a top view of the kettle shown in FIG. 17.
FIG. 19 is a side view of the kettle shown in FIG. 17.
FIG. 20 is an elevation view of the kettle shown in FIG. 17.
FIG. 21 is an isometric view of a fifth embodiment of the inventive kettle.
FIG. 22 is a top view of the kettle shown in FIG. 21.
FIG. 23 is a side view of the kettle shown in FIG. 21.
FIG. 24 is an elevation view of the kettle shown in FIG. 21.
FIG. 25 is an isometric view of a sixth embodiment of the inventive kettle.
FIG. 26 is a top view of the kettle shown in FIG. 25.
FIG. 27 is a side view of the kettle shown in FIG. 25.
FIG. 28 is an elevation view of the kettle shown in FIG. 25.
FIG. 29 is an isometric view of a seventh embodiment of the inventive kettle.
FIG. 30 is a top view of the kettle shown in FIG. 29.
FIG. 31 is a side view of the kettle shown in FIG. 29.
FIG. 32 is an elevation view of the kettle shown in FIG. 29.
FIG. 33 is an isometric view of an eighth embodiment of the inventive kettle.
FIG. 34 is a top view of the kettle shown in FIG. 33.
FIG. 35 is a side view of the kettle shown in FIG. 33.
FIG. 36 is an elevation view of the kettle shown in FIG. 33.
FIG. 37 is an isometric view of a ninth embodiment of the inventive kettle.
FIG. 38 is a top view of the kettle shown in FIG. 37.
FIG. 39 is a side view of the kettle shown in FIG. 37.
FIG. 40 is an elevation view of the kettle shown in FIG. 37.
FIG. 41 is an isometric view of a tenth embodiment of the inventive kettle.
FIG. 42 is a top view of the kettle shown in FIG. 41.
FIG. 43 is a side view of the kettle shown in FIG. 41.
FIG. 44 is an elevation view of the kettle shown in FIG. 41.
FIG. 45 is an isometric view of an eleventh embodiment of the inventive kettle.
FIG. 46 is a top view of the kettle shown in FIG. 45.
FIG. 47 is a side view of the kettle shown in FIG. 45.
FIG. 48 is an elevation view of the kettle shown in FIG. 45.
FIG. 49 is an isometric view of a twelfth embodiment of the inventive kettle.
FIG. 50 is a top view of the kettle shown in FIG. 49.
FIG. 51 is a side view of the kettle shown in FIG. 49.
FIG. 52 is an elevation view of the kettle shown in FIG. 49.
FIG. 53 is an isometric view of a thirteenth embodiment of the inventive kettle.
FIG. 54 is a top view of the kettle shown in FIG. 53.
FIG. 55 is a side view of the kettle shown in FIG. 53.
FIG. 56 is an elevation view of the kettle shown in FIG. 53.
FIG. 57 is an isometric view of a fourteenth embodiment of the inventive kettle.
FIG. 58 is a top view of the kettle shown in FIG. 57.
FIG. 59 is a side view of the kettle shown in FIG. 57.
FIG. 60 is an elevation view of the kettle shown in FIG. 57.
FIG. 61 is an isometric cutaway of a fifteenth embodiment of the inventive kettle.
FIG. 62 is an isometric view of a sixteenth embodiment of the inventive kettle.
FIG. 63 is an isometric view of a seventeenth embodiment of the inventive kettle.
FIGS. 64 and 65 are side views of an eighteenth embodiment of the inventive kettle.
FIGS. 66 and 67 are isometric views of a nineteenth embodiment of the inventive kettle.
FIG. 68 is a side elevation view of a twentieth embodiment of the inventive kettle.
FIG. 69 is an isometric view of the kettle shown in FIG. 68.

DETAILED DESCRIPTION OF THE PREFERRED EMBODIMENTS

FIGS. 1-4 show the kettle of the prior art, with its body A, spout B, handle C, and filling opening D. As is readily seen, when pouring a hot liquid through the spout, vapor rises from the spout B over the handle C, which can result in serious scalding. Each of the embodiments described herein addresses this simple problem.

For each of the numbered embodiments that follow, the whole number 0, 2, 4, and 6 will denote the body, spout, handle, and fill opening respectively, while the combination of the tens and hundreds place will denote the embodiment being discussed. For instance, reference 112 is the spout in the 11th embodiment. Other features will be introduced in due course with other references numbers unique to each embodiment.

FIGS. 5-8 show a first embodiment of the invention having the common elements of a body 10, spout 12, handle 14, and fill opening 16. As is best seen in FIG. 6, the body 10 has a symmetrical axis 18, and while the fill opening 16 and spout 12 are located on this axis, the handle 14 is not. The advantage of this is that, during pouring, hot vapor rising from the spout 12 does not pass in substantial amounts, over the handle 14 where the person's hand rests, and thus the hand is at little risk of a burn.

FIGS. 9-12 show a second embodiment of the invention having the common elements of a body 20, spout 22, handle 24, and fill opening 26. As is best seen in FIG. 10, the body 20 has a symmetrical axis 28, and while the spout 22 is located on this axis, the handle 24 and fill opening 26 are not. The advantage of this is similar to the first embodiment.

FIGS. 13-16 show a third embodiment of the invention having the common elements of a body 30, spout 32, handle 34, and fill opening 36. As is best seen in FIG. 14, the body 30 has a symmetrical axis 38, and the spout 32 and handle 34 are located on either side thereof, with the filling opening located on the axis. The advantage of this is similar to the first embodiment.

FIGS. 17-20 show a fourth embodiment of the invention having the common elements of a body 40, spout 42, handle 44, and fill opening 46. This embodiment is similar to the third embodiment except that in this embodiment, the fill opening 46 is also offset from the axis 48.

FIGS. 21-24 show a fifth embodiment of the invention having the common elements of a body 50, spout 52, handle 54, and fill opening 56. As can be readily appreciated from FIG. 22, although the handle 54 is attached within the area most likely to be affected by hot vapor between 59A and 59B, the portion 55 of the handle 54 that a person grasps is safely removed from this more dangerous area.

FIGS. 25-28 show a sixth embodiment of the invention having the common elements of a body 60, spout 62, handle 64, and fill opening 66. This embodiment is similar to the first embodiment, with the exception that there are two handles 64, each extending away from the spout 62.

The above described six embodiments all share a singular feature, mentioned specifically with respect to embodiment five, in that the have a handle that is offset from an area where hot vapor rises from the spout and/or filling opening.

FIGS. 29-32 show a seventh embodiment of the invention having the common elements of a body 70, spout 72, handle 74, and fill opening 76. As can be readily appreciated from FIGS. 30 and 31, although even the gripping portion 75 of the handle 74 is located within the area 79 most likely to be affected by rising hot vapor, the gripping portion 75 is set so far back from the spout 72 that the vapor should travel along the area 79 in FIG. 31, and not contact a hand.

FIGS. 33-56 show several embodiments of the steam-diverting tea kettle in which steam diverting tube, chute, or shield directs steam away from the handle. In these embodiments, the numbering scheme adopted above still applies, with the addition that reference numbers ending with the integer 8 denote the chute.

FIGS. 33-36 show an eighth embodiment of the invention having the common elements of a body 80, spout 82, handle 84, fill opening 86, and steam diverting tube 88. In this embodiment, the tube 88 has an open top 88A and an open bottom 88B. During pouring, the bottom 88B of the tube 88 is placed over a cup or pot, and the liquid inside the body exits the spout 82 and out from the bottom 88B of the tube 88 into the cup. Meanwhile, vapor from the spout 82 rises to exit the top 88A of the tube 88, which is removed from the handle 84 by a distance sufficient to keep a person's hand substantially free from the steam.

FIGS. 37-40 show an ninth embodiment of the invention having the common elements of a body 90, spout 92, handle 94, fill opening 96, and steam diverting tube 98. This ninth embodiment is similar to the eighth embodiment except that the fill opening 96 is actually an elongated fill tube that joins with the tube 98. The fill opening or tube 98 connects with the open cavity inside the body 90, but also allows steam to exit the body 90.

FIGS. 41-44 show a tenth embodiment of the invention having the common elements of a body 100, spout 102, handle 104, fill opening 106, and steam diverting tube 108. This embodiment is similar to that of the ninth embodiment, except that the fill tube or opening 106 does not join with the chute 108.

FIGS. 45-48 show an eleventh embodiment of the invention having the common elements of a body 110, spout 112, handle 114, fill opening 116, and steam diverting tube 118. As is best seen in FIG. 46, this embodiment combines the tube embodiments with the offset embodiments with the six offset embodiments in that the kettle has a chute 118, as well as having the handle 114 offset from the spout 112. In this manner, the likelihood of vapor burning a person's hand is further minimized.

FIGS. 49-52 show a twelfth embodiment of the invention having the common elements of a body 120, spout 122, handle 124, fill opening 126, and steam diverting tube 128. The spout 128 is different in this embodiment than in the others in that rather than having an open top, the top 128A opens into the cavity within the body 120. This allows for vapor to be redirected into the body 120, where it may condense and be reused.

FIGS. 53-56 show a thirteenth embodiment of the invention having the common elements of a body 130, spout 132, handle 134, and fill opening 136. Rather than a steam tube as in embodiments eight through twelve, this tea kettle uses a shield 138 to block the handle from rising vapor released during pouring. The shield 138 is preferably contoured about the spout 132.

FIGS. 53-56 show a fourteenth embodiment of the invention having the common elements of a body 140, spout 142, handle 144, and fill opening 146. The obvious difference in this embodiment is the length of the spout 142. Like the seventh embodiment, the goal of this embodiment is to create enough distance between the spout 142 and the handle 144 to minimize contact between any vapor and the handle during pouring.

FIG. 61 shows a fifteenth embodiment of the invention having the common elements of a body 150, spout 152, handle 154, fill opening 156, and shield 158. As opposed to the thirteenth embodiment, the shield 158 extends through the body 150, which places it in contact with the hot liquids within the body 150. This elevates the temperature of the shield 158, which discourages the formation of condensation on the shield 158 during pouring.

Similarly, FIG. 62 shows a sixteenth embodiment of the invention having the common elements of a body 160, spout 162, handle 164, fill opening 166, and shield 168. In the shield area 168a, the shield 168 is part of the kettle body that contacts the hot liquid inside the body 160, which elevates the shield 168's temperature, and discourages formation of condensation during pouring.

FIG. 63 shows a seventeenth embodiment of the invention having the common elements of a body 170, spout 172, handle 174, fill opening 176, and shield 178. In this embodiment, the shield is shaped like a plow, which better diverts rising steam away from the hand and handle.

FIGS. 64 and 65 show an eighteenth embodiment of the invention having the common elements of a body 180, spout 182, handle 184, fill spout 186, and shield 188. In this embodiment, however, the fill opening 186 comprises an elongated tube 187 located adjacent to the shield 188, that opens at its bottom into the spout 182. Thus, during filling, fill water follows the path CW into the body 180, and the shield 188 discourages steam rising from the fill spout 186 from contacting a person's hand on the handle 184. As shown in FIG. 65, during pouring, the hot water within the body 180 exits the spout 182 following the path HW; steam rising from this hot water is diverted from the handle by the heat shield 188.

FIGS. 66 and 67 show a nineteenth embodiment of the invention having the common elements of a body 190, spout 192, handle 194, fill spout 196, and shield 198. The arrangement of elements in this embodiment places the shield 198 between the handle 194 and both the spout 192 and fill spout 196. In this embodiment, the shield 198 comprises two parts 198a, 198b hinged to one another (hinge not shown). The shield upper part 198b is preferably attached to the fill opening cap 196b that opens, revealing the fill opening 196a, when the shield upper part 198b is rotated about the hinge.

FIGS. 68 and 69 shows a twentieth embodiment of the invention having the common elements of a body 200, spout 202, handle 204, and shield 208. In this embodiment, the shield is contoured to protect a person's hand from steam rising from the spout 202 when the hand is on the handle 204.

The various tubes, shields, spouts etc. could be made from different materials such as metal plastic (solid or clear), and glass. While the shape of the tubes as shown is presently preferred, other shapes could be used.

What is claimed is:

1. A tea kettle comprising:
   a body defining a volume for containing a heated liquid;
   a pour spout for pouring the liquid from the body;
   a substantially horizontally oriented handle located above the pour spout that allows a person to pour the tea kettle; and
   a shield covering at least a portion of the spout and located closer to the pour spout than the handle, the shield having an elongated portion extending upwards and away from an area of the body near the pour spout;
   wherein, during pouring of a hot liquid through the spout, vapor from the liquid is directed by the shield away from the handle;
   wherein the pour spout and the shield each extend independently from the body;
   wherein the shield comprises upper and lower parts hinged together, and further comprises a fill spout with a cap that closes the spout, the cap connected to the shield's upper part, such rotation of the shield upper part rotates the cap to open the fill spout.

2. The tea kettle of claim 1, wherein the shield extends for at least a portion, within the body, and thus raises the temperature of the shield.

* * * * *